United States Patent
Michikawauchi et al.

(10) Patent No.: US 8,904,994 B2
(45) Date of Patent: Dec. 9, 2014

(54) AMMONIA BURNING INTERNAL COMBUSTION ENGINE

(75) Inventors: Ryo Michikawauchi, Susono (JP); Yasushi Ito, Susono (JP); Kazuki Iwatani, Susono (JP); Shiro Tanno, Gotemba (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 1174 days.

(21) Appl. No.: 12/767,304

(22) Filed: Apr. 26, 2010

(65) Prior Publication Data

US 2011/0259290 A1  Oct. 27, 2011

(51) Int. Cl.
| | | |
|---|---|---|
| F02B 47/00 | (2006.01) | |
| F02D 19/06 | (2006.01) | |
| F02M 21/02 | (2006.01) | |
| F02D 19/08 | (2006.01) | |
| F02M 37/00 | (2006.01) | |
| F02M 25/14 | (2006.01) | |
| F02M 25/07 | (2006.01) | |

(52) U.S. Cl.
CPC ........... *F02M 25/14* (2013.01); *F02D 19/0692* (2013.01); *F02M 21/0287* (2013.01); *F02M 25/0727* (2013.01); *Y02T 10/36* (2013.01); *Y02T 10/32* (2013.01); *F02D 19/081* (2013.01); *F02D 19/0665* (2013.01); *F02M 37/0088* (2013.01); *F02D 19/0644* (2013.01); *F02D 19/0689* (2013.01); *F02M 25/0707* (2013.01); *Y02T 10/121* (2013.01)
USPC ............. 123/299; 123/304; 123/1 A; 123/575

(58) Field of Classification Search
USPC .......... 123/1 A, DIG. 12, 48 R, 48 A, 48 AA, 123/48 B, 48 C, 48 D, 78 R, 78 A, 78 AA, 123/78 B, 78 BA, 78 C, 78 D, 78 E, 78 F, 299, 123/304, 90.15–90.18, 90.11, 90.12, 527, 123/575, 578
See application file for complete search history.

(56) References Cited

U.S. PATENT DOCUMENTS 3,455,282 A * 7/1969 Pearsall ........................ 123/1 R
4,478,177 A * 10/1984 Valdespino ...................... 123/3
(Continued)

FOREIGN PATENT DOCUMENTS

| JP | A-05-332152 | 12/1993 |
| JP | A-2008-121569 | 5/2008 |

(Continued)

OTHER PUBLICATIONS

Jul. 19, 2011 International Search Report issued in International Application No. PCT/JP2011/059995 (with translation).

*Primary Examiner* — Erick Solis
(74) *Attorney, Agent, or Firm* — Oliff PLC

(57) ABSTRACT

An ammonia burning internal combustion engine can feed ammonia and a highly combustible substance burning easier than ammonia to a combustion chamber. When the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so the air-fuel mixture fed into the combustion chamber is made easier to burn. As a result, an ammonia burning internal combustion engine designed to suppress a drop in combustibility of auxiliary fuel due to ammonia, can be provided.

13 Claims, 37 Drawing Sheets

(56) References Cited

U.S. PATENT DOCUMENTS

| | | | |
|---|---|---|---|
| 5,419,286 A * | 5/1995 | Edison et al. | 123/1 A |
| 8,025,033 B2 * | 9/2011 | Schiltz et al. | 123/1 A |
| 8,166,926 B2 * | 5/2012 | Sasaki et al. | 123/1 A |
| 8,272,353 B2 * | 9/2012 | Dincer et al. | 123/3 |
| 2008/0308056 A1 | 12/2008 | Schiltz et al. | |
| 2009/0120068 A1 | 5/2009 | Sakimoto et al. | |
| 2010/0288211 A1 * | 11/2010 | Agosta | 123/3 |
| 2011/0265464 A1 * | 11/2011 | Kojima et al. | 60/299 |
| 2011/0283684 A1 * | 11/2011 | Aso et al. | 60/285 |
| 2011/0283959 A1 * | 11/2011 | Aso et al. | 123/3 |

FOREIGN PATENT DOCUMENTS

| | | |
|---|---|---|
| JP | A-2009-85169 | 4/2009 |
| JP | A-2009-138737 | 6/2009 |
| JP | A-2009-180132 | 8/2009 |

* cited by examiner

AMMONIA BURNING INTERNAL COMBUSTION ENGINE

BACKGROUND OF THE INVENTION

1. Field of the Invention

The present invention relates to an ammonia burning internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see the following prior art).

As prior art, there is Japanese Patent Publication (A) No. 5-332152.

SUMMARY OF THE INVENTION

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

By feeding a highly combustible substance, such as hydrogen, burning easier than ammonia to a combustion chamber in addition to ammonia in this way, it is possible to improve the combustion of the ammonia. However, if the air-fuel mixture fed into the combustion chamber contains ammonia, ammonia causes the combustibility of the highly combustible substance to drop. For this reason, when feeding a highly combustible substance in addition to ammonia to a combustion chamber, it is necessary to take suitable measures to facilitate combustion of the highly combustible substance and thus facilitate combustion of the air-fuel mixture. However, Japanese Patent Publication (A) No. 5-332152 does not consider this at all.

Therefore, an object of the present invention is to provide an ammonia burning internal combustion engine designed to suppress a drop in combustibility of a highly combustible substance due to the ammonia.

To achieve this object, in a first aspect of the invention, there is provided an ammonia burning internal combustion engine able to feed ammonia and a highly combustible substance burning easier than ammonia, to a combustion chamber, wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that the air-fuel mixture fed into the combustion chamber is made easier to burn.

In a second aspect of the invention, there is provided the first aspect of the invention wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that the temperature of the intake gas in the combustion chamber when the piston is at compression top dead center becomes higher.

In a third aspect of the invention, there is provided the second aspect of the invention wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that the temperature of the intake gas sucked into the combustion chamber rises.

In a fourth aspect of the invention, there is provided the third aspect of the invention wherein the engine is provided with an EGR mechanism feeding part of the exhaust gas as EGR gas to the combustion chamber again when the amount of ammonia fed into the combustion chamber is increased or when the ratio of the amount of the ammonia to the total amount of the ammonia and the highly combustible substance fed into the combustion chamber is increased, the EGR mechanism is controlled to that the amount of heat given to the intake gas sucked into the combustion chamber by the EGR gas is increased.

In a fifth aspect of the invention, there is provided the second aspect of the invention wherein the engine is provided with an actual compression ratio changing mechanism controlling an actual compression ratio of a volume of the combustion chamber at the time when the piston is at compression top dead center with respect to the volume of the combustion chamber at the time of closing the intake valve and, when the amount of ammonia fed into the combustion chamber is increased or when the ratio of the amount of the ammonia to the total amount of the ammonia and the highly combustible substance fed into the combustion chamber is increased, the actual compression ratio changing mechanism is controlled so that the actual compression ratio becomes higher.

In a sixth aspect of the invention, there is provided the second aspect of the invention wherein when the amount of ammonia fed into the combustion chamber is increased or when the ratio of the amount of the ammonia to the total amount of the ammonia and the highly combustible substance fed into the combustion chamber is increased, at the time of closing the intake valve, the operating parameters of the internal combustion engine are controlled so that the amount of intake gas charged into the combustion chamber is made larger.

In a seventh aspect of the invention, there is provided the sixth aspect of the invention wherein when the amount of ammonia fed into the combustion chamber is increased or when the ratio of the amount of the ammonia to the total amount of the ammonia and the highly combustible substance fed into the combustion chamber is increased, at the time of closing the intake valve, the operating parameters of the internal combustion engine are controlled so that the amount of air charged into the combustion chamber is made larger.

In an eighth aspect of the invention, there is provided the sixth aspect of the invention wherein the engine is provided with an EGR mechanism feeding part of the exhaust gas as EGR gas to the combustion chamber again, and, when the amount of ammonia fed into the combustion chamber is increased or when the ratio of the amount of the ammonia to the total amount of the ammonia and the highly combustible substance fed into the combustion chamber is increased, at the time of closing the intake valve, the operating parameters of the internal combustion engine are controlled so that the amount of EGR gas charged into the combustion chamber is made larger.

In a ninth aspect of the invention, there is provided the second aspect of the invention wherein the engine is provided with an impulse valve provided in an intake tube or intake port, the impulse valve being made to open after an intake valve is opened so as to generate negative pressure at an intake port at a downstream side of the impulse valve, and, when the amount of ammonia fed into the combustion chamber is increased or when the ratio of the amount of the ammonia to the total amount of the ammonia and the highly combustible substance fed into the combustion chamber is increased, the opening timing of the impulse valve is made to be retarded.

In a 10th aspect of the invention, there is provided the first aspect of the invention wherein the engine is provided with an EGR mechanism feeding part of the exhaust gas as EGR gas to the combustion chamber again and, when the amount of ammonia fed into the combustion chamber is increased or when the ratio of the amount of the ammonia to the total amount of the ammonia and the highly combustible substance fed into the combustion chamber is increased, the EGR mechanism is controlled so that the ratio of the EGR gas in the intake gas fed into the combustion chamber is decreased.

In an 11th aspect of the invention, there is provided the first aspect of the invention wherein the engine is provided with an air flow control system controlling turbulence of the air flow in the combustion chamber and, when the amount of ammonia fed into the combustion chamber is increased or when the ratio of the amount of the ammonia to the total amount of the ammonia and the highly combustible substance fed into the combustion chamber is increased, the air flow control system is controlled so that the turbulence of the air flow occurring in the air-fuel mixture in the combustion chamber is made greater.

In a 12th aspect of the invention, there is provided the first aspect of the invention wherein when the amount of ammonia fed into the combustion chamber is increased, the amount of feed of the highly combustible substance into the combustion chamber is also made to increase.

In a 13th aspect of the invention, there is provided the first aspect of the invention wherein the engine is provided with a highly combustible substance injector injecting the highly combustible substance directly into the combustion chamber and, when the amount of ammonia fed into the combustion chamber is increased or when the ratio of the amount of the ammonia to the total amount of the ammonia and the highly combustible substance fed into the combustion chamber is increased, the injection pressure of the highly combustible substance from the highly combustible substance injector is made higher.

In a 14th aspect of the invention, there is provided the first aspect of the invention wherein at the time of normal operation of the engine, the air-fuel ratio of the air-fuel mixture fed into the combustion chamber is made lean and, when the amount of ammonia fed into the combustion chamber is increased or when the ratio of the amount of the ammonia to the total amount of the ammonia and the highly combustible substance fed into the combustion chamber is increased, the air amount fed into the combustion chamber is controlled so that the air-fuel ratio of the air-fuel mixture fed into the combustion chamber is made to approach the stoichiometric air-fuel ratio.

To achieve this object, in a 15th aspect of the invention, there is provided a compression ignition type ammonia burning internal combustion engine able to feed ammonia and a highly combustible substance burning easier than ammonia to a combustion chamber, wherein the engine is provided with an ammonia injector directly injecting ammonia into the combustion chamber and a highly combustible substance injector directly injecting the highly combustible substance into the combustion chamber, the highly combustible substance is injected before the ammonia, and the ammonia is injected after the highly combustible substance self ignites.

To achieve this object, in a 16th aspect of the invention, there is provided a compression ignition type ammonia burning internal combustion engine able to feed ammonia and a highly combustible substance burning easier than ammonia to a combustion chamber, wherein the engine is provided with an ammonia injector directly injecting ammonia into the combustion chamber and a cylinder temperature estimating means for estimating a temperature of the intake gas in the combustion chamber changing during a compression stroke based on the amount and temperature of the intake gas fed into the combustion chamber, and a timing of ammonia injection from the ammonia injector is made a timing later than a timing at which the temperature of the intake gas in the combustion chamber estimated by the cylinder temperature estimating means reaches a self ignition temperature.

To achieve this object, in a 17th aspect of the invention, there is provided a spark ignition type ammonia burning internal combustion engine able to feed ammonia and a highly combustible substance burning easier than ammonia to a combustion chamber, wherein the engine is provided with an ammonia injector directly injecting liquid ammonia to a combustion chamber, and a timing of injection of ammonia from the ammonia injector is made a timing earlier than a timing at which a temperature of the intake gas fed into the combustion chamber becomes equal to a wall surface temperature of the combustion chamber along with the rise of a piston.

To achieve this object, in an 18th aspect of the invention, there is provided a spark ignition type ammonia burning internal combustion engine able to feed ammonia and a highly combustible substance burning easier than ammonia to a combustion chamber, wherein the engine is provided with a fuel injector directly injecting the ammonia or highly combustible substance into the combustion chamber and an ignition device igniting the air-fuel mixture in the combustion chamber, and the fuel injector performs, in addition to a main injection where the fuel injector or another fuel injector injects fuel before a first half of the compression stroke, a secondary injection injecting a smaller amount of ammonia or highly combustible substance than the main injection in the latter half of the compression stroke before ignition by a ignition device.

To achieve this object, in a 19th aspect of the invention, there is provided a spark ignition type ammonia burning internal combustion engine able to feed ammonia and a highly combustible substance burning easier than ammonia to a combustion chamber where the engine is provided with a fuel injector directly injecting the liquid ammonia or highly combustible substance to the combustion chamber, and the fuel injector can inject the ammonia or highly combustible substance so that the atomized fuel strikes a top surface of the piston and injects the ammonia or the highly combustible substance so that the atomized fuel strikes the top surface of the piston according to the engine operating state.

In a 20th aspect of the invention, there is provided the 19th aspect of the invention wherein the engine is further provided with a piston temperature estimating means for detecting or estimating a temperature of a piston, and the fuel injector injects the ammonia or highly combustible substance so that the atomized fuel strikes the top surface of the piston when the temperature of the piston detected or estimated by the piston temperature estimating means becomes higher than a minimum reference temperature.

To achieve this object, in a 21st aspect of the invention, there is provided an ammonia burning internal combustion engine able to feed ammonia and a highly combustible substance burning easier than ammonia to a combustion chamber wherein the engine is provided with an ammonia feed system feeding ammonia in a gaseous and liquid state to the combustion chamber or to the intake port, and the ammonia feed system changes the ratio of the liquid ammonia and gaseous ammonia fed from the ammonia feed system in accordance with the engine operating state.

In a 22nd aspect of the invention, there is provided the 21st aspect of the invention wherein the ammonia feed system feeds gaseous ammonia to the combustion chamber or to the intake port at the time of start of the internal combustion engine or at the time of a cold state and feeds liquid ammonia to the combustion chamber or the intake port after the end of warmup of the internal combustion engine.

In a 23rd aspect of the invention, there is provided the 21st aspect of the invention wherein the fuel feed system is provided with a liquid ammonia injector injecting liquid ammonia into the combustion chamber and a gaseous ammonia injector injecting gaseous ammonia into the intake port.

To achieve this object, in a 24th aspect of the invention, there is provided an ammonia burning internal combustion engine able to feed ammonia and a highly combustible substance burning easier than ammonia to a combustion chamber, wherein the engine is provided with an ammonia injector injecting ammonia into a combustion chamber or into an intake port and a heating system heating the ammonia injected from the ammonia injector before injection and the heating system heats the ammonia when the internal combustion engine is cold.

To achieve this object, in a 25th aspect of the invention, there is provided an ammonia burning internal combustion engine able to feed ammonia and a highly combustible substance burning easier than ammonia to a combustion chamber, wherein the feed of ammonia is prohibited when the target total amount of feed of the ammonia and the highly combustible substance to the combustion chamber becomes smaller than a predetermined minimum amount of feed.

To achieve this object, in a 26th aspect of the invention, there is provided an ammonia burning internal combustion engine able to feed ammonia and a highly combustible substance burning easier than ammonia to a combustion chamber, wherein the engine is provided with an intake gas temperature estimating system estimating the temperature of the intake gas in the combustion chamber when the piston is at compression top dead center, and the feed of ammonia is prohibited when the temperature of the intake gas estimated by the intake gas temperature estimating system is lower than a minimum reference temperature.

To achieve this object, in a 27th aspect of the invention, there is provided an ammonia burning internal combustion engine able to feed ammonia and a highly combustible substance burning easier than ammonia to a combustion chamber, wherein feed of ammonia is prohibited when the internal combustion engine is cold.

To achieve this object, in a 28th aspect of the invention, there is provided an ammonia burning internal combustion engine able to feed ammonia and a highly combustible substance burning easier than ammonia to a combustion chamber, wherein as the highly combustible substance, at least one of a GTL diesel oil, a dimethyl ether, a sulfate cetane value modifier, a nitro compound, acetone, ethylene, an organic hydride, hydrazine, and acetylene is used.

In a 29th aspect of the invention, there is provided the 28th aspect of the invention wherein the highly combustible substance is mixed with the ammonia in the fuel tank and is fed into the combustion chamber in a state mixed with ammonia.

In a 30th aspect of the invention, there is provided the 28th aspect of the invention wherein as the highly combustible substance, hydrazine is used, the engine is provided with an ammonia tank storing ammonia and a hydrazine tank storing hydrazine, and the hydrazine tank houses a polymer having carbonyl groups so that the hydrazine fed into the hydrazine tank bonds with the polymer having the carbonyl groups and is stored in the form of hydrazone.

In a 31st aspect of the invention, there is provided the 28th aspect of the invention wherein as the highly combustible substance, hydrazine is used, the engine is provided with an ammonia tank storing ammonia, a hydrazine tank storing hydrazine, and a hydrazine generating system generating hydrazine from the ammonia, hydrazine is generated by the hydrazine generating system from part of the ammonia stored in the ammonia tank, and the generated hydrazine is stored in the hydrazine tank.

In a 32nd aspect of the invention, there is provided the 28th aspect of the invention wherein as the highly combustible substance, hydrazine and hydrogen are used, the engine is provided with a hydrazine tank storing hydrazine, a hydrogen tank storing hydrogen, and a hydrogen generating system generating hydrogen from hydrazine, hydrogen is generated by the hydrogen generating system from part of the hydrazine stored in the hydrazine tank, and the generated hydrogen is stored in the hydrogen tank.

In a 33rd aspect of the invention, there is provided the 28th aspect of the invention wherein as the highly combustible substance, acetylene is used, the engine is provided with a calcium carbide holder holding calcium carbide, a communicating passage branched from an engine exhaust passage and communicating with the calcium carbide holder, and a control valve able to control moisture in the exhaust gas flowing into the communicating passage, and acetylene fed into the combustion chamber is generated by making the moisture in the exhaust gas react with the calcium carbide in the calcium carbide holder.

To achieve this object, in a 34th aspect of the invention, there is provided an ammonia burning internal combustion engine able to feed ammonia and a highly combustible substance burning easier than ammonia to a combustion chamber, wherein as the highly combustible substance, a ignition modifier with an ignitability higher than ammonia and a flame propagation speed modifier with a flame propagation speed faster than ammonia are both used.

To achieve this object, in a 35th aspect of the invention, there is provided an ammonia burning internal combustion engine able to feed ammonia and a non-ammonia substance not able to mix with ammonia to a combustion chamber, wherein the engine is provided with a fuel mixer mixing the ammonia and non-ammonia substance, and the fuel mixer has an orifice provided in the middle of an ammonia feed path and a passage feeding the non-ammonia substance to a restrictor of the orifice.

To achieve this object, in a 36th aspect of the invention, there is provided an ammonia burning internal combustion engine able to feed ammonia and a non-ammonia substance not being able to mix with ammonia to a combustion chamber, wherein the engine is provided with a single fuel tank in which the ammonia and non-ammonia substance are stored together, a liquid surface fuel feeding system feeding the liquid near the liquid surface of the fuel tank in the ammonia and non-ammonia substance stored in the fuel tank to the combustion chamber, and a bottom fuel feed system, separate from the liquid surface fuel feeding system, feeding liquid near the bottom of the fuel tank to the combustion chamber.

To achieve this object, in a 37th aspect of the invention, there is provided an ammonia burning internal combustion engine able to feed ammonia and a non-ammonia fuel not being able to mix with ammonia to a combustion chamber, wherein the engine is provided with a single fuel tank in which the ammonia and non-ammonia fuel are together stored, a mixer mixing the fuel, a liquid surface fuel conveyance system feeding the liquid near the liquid surface of the fuel tank in the ammonia and non-ammonia substance stored in the fuel tank to the mixer, a bottom fuel conveyance system feeding liquid near the bottom of the fuel tank to the mixer, and a fuel feed system feeding fuel mixed by the mixer to the combustion chamber, and the mixer mixes fuel near the liquid surface fed by the liquid surface fuel conveyance system and fuel near the bottom fed by the bottom fuel conveyance system.

In a 38th aspect of the invention, there is provided the 37th aspect of the invention wherein the fuel feed system is provided with a mixed state detection system detecting a mixed state of a mixture of ammonia and a non-ammonia substance flowing out from the mixer and a return system feeding the mixture flowing out from the mixer to the fuel mixer again, and when the mixed state of the mixture detected by the mixed state detection system is poorer than a predetermined reference mixed state, at least part of the mixture flowing out from the fuel mixer is fed by the return system to the fuel mixer again.

To achieve this object, in a 39th aspect of the invention, there is provided an ammonia burning internal combustion engine able to feed ammonia and a non-ammonia substance not being able to mix with ammonia to a combustion chamber, wherein the engine is provided with a single fuel tank in which the ammonia and the non-ammonia substance are stored together with a surfactant and a fuel feed system feeding liquid in the fuel tank to the combustion chamber.

In a 40th aspect of the invention, there is provided the 39th aspect of the invention wherein the engine is further provided with a fuel agitation system for agitating the liquid in the fuel tank.

To achieve this object, in a 41st aspect of the invention, there is provided a spark ignition type ammonia burning internal combustion engine able to feed ammonia and a highly combustible substance having a combustibility higher than ammonia to a combustion chamber, wherein the engine is provided with a knocking strength detecting means for detecting or estimating a strength of knocking, and when the strength of knocking detected or estimated by the knocking strength detecting means becomes higher than a predetermined limit knocking strength, the ratio of the amount of the ammonia to the total amount of the ammonia and the highly combustible substance fed to the combustion chamber is made to increase.

Summarizing the advantageous effects of the invention, according to the present invention, it is possible to suppress a drop in combustibility of a highly combustible substance due to ammonia.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
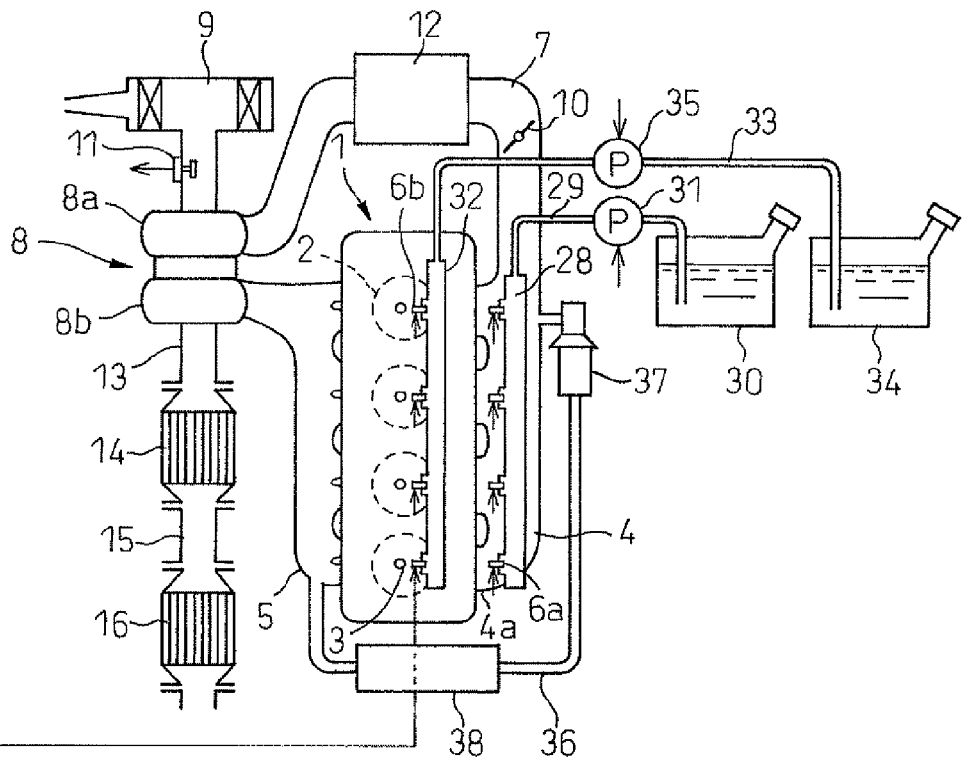
FIG. 1 is an overview of an internal combustion engine of a first aspect.
Figure 1:
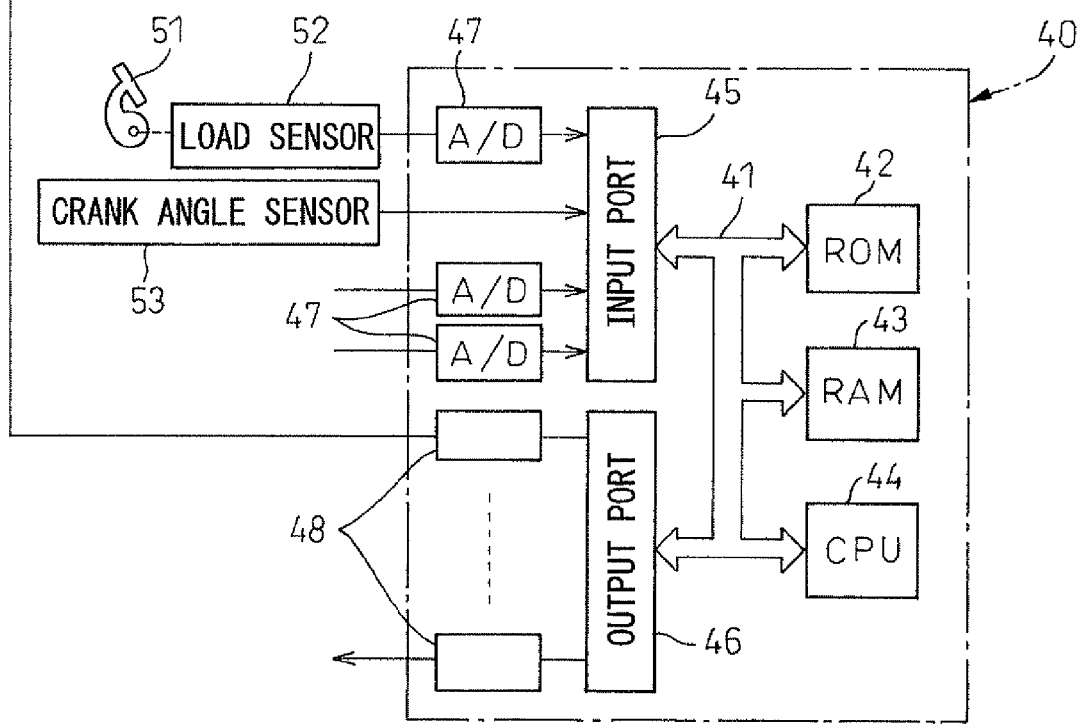

Below, referring to the drawings, aspects of the present invention will be explained in detail. Note that, in the following explanation, similar components are assigned the same reference numerals.

First, referring to FIG. 1, an ammonia burning internal combustion engine of a first aspect of the present invention will be explained. Referring to FIG. 1, 1 indicates an engine body, 2 a combustion chamber of each cylinder, 3 an ignition device, 4 an intake manifold, and 5 an exhaust manifold. At each intake branch pipe 4a of the intake manifold 4, an ammonia injector 6a for injecting liquid ammonia toward a corresponding intake port is arranged. Further, at the top surface of the combustion chamber 2 of each cylinder, a highly combustible substance injector 6b for injecting a highly combustible substance toward the inside of the combustion chamber 2 is arranged. As the highly combustible substance, a fuel easier to burn than ammonia or an auxiliary fuel assisting combustion of the ammonia, for example, gasoline, diesel oil, liquefied natural gas, hydrogen, etc., may be used.

The intake manifold 4 is coupled through an intake duct 7 to an outlet of the compressor 8a of the exhaust turbocharger 8, while the inlet of the compressor 8a is coupled to an air cleaner 9. Inside the intake duct 7, a throttle valve 10 driven by a step motor and an intake air detector 11 using for example a hot wire are arranged. Furthermore, around the intake duct 7, a cooling system 12 for cooling the intake air flowing inside the intake duct 7 is arranged. In the aspect shown in FIG. 1, the engine cooling water is guided to the cooling system 12 where the engine cooling water cools the intake air.

On the other hand, the exhaust manifold 5 is connected to an inlet of an exhaust turbine 8b of an exhaust turbocharger 8, while the outlet of the exhaust turbine 8b is connected through an exhaust pipe 13 to an upstream side exhaust purification system 14. In the aspect shown in FIG. 1, this upstream side exhaust purification system 14 is made an ammonia adsorbent able to adsorb ammonia in the exhaust gas or an $NO_X$ adsorbent able to adsorb $NO_X$ in the exhaust gas, etc. The upstream side exhaust purification system 14 is connected through an exhaust pipe 15 to a downstream side exhaust purification system 16. In the aspect shown in FIG. 1, this downstream side exhaust purification system 16 is made an oxidation catalyst, an $NO_X$ storage reduction catalyst or an $NO_X$ selective reduction catalyst, etc., able to purify ammonia or $NO_X$ contained in the exhaust gas.

Figure 2:
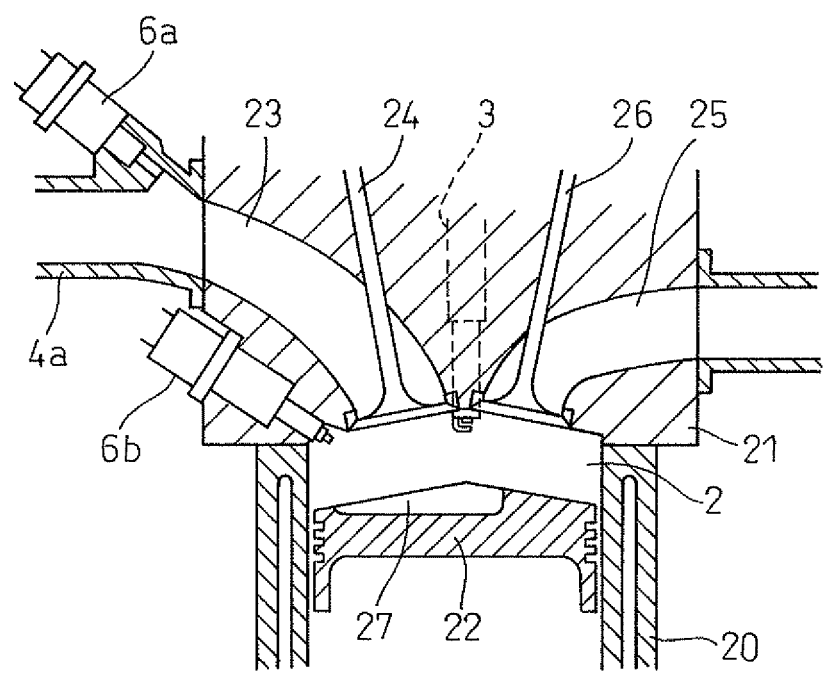
FIG. 2 is a cross-sectional view of an engine body.

Referring to FIG. 2 showing in detail each cylinder, 20 indicates a cylinder block, 21 a cylinder head fixed on the cylinder block 20, 22 a piston reciprocating inside the cylinder block 20, 2 a combustion chamber formed between the piston 22 and the cylinder head 21, 23 an intake port, 24 an intake valve, 25 an exhaust port, and 26 an exhaust valve. At an intake branch pipe 4a of the intake manifold 4, an ammonia injector 6a is arranged, while at the outer circumference of the inside wall surface of the cylinder head 21, a highly combustible substance injector 6b is arranged. At the top surface of the piston 22, a cavity 27 is provided.

Again referring to FIG. 1, each ammonia injector 6a is connected to an ammonia reservoir 28. This ammonia reservoir 28 is connected through an ammonia feed pipe 29 to an ammonia tank 30. At the ammonia feed pipe 29, an electronic control type variable discharge ammonia feed pump 31 is arranged. By this ammonia feed pump 31, ammonia inside the ammonia tank 30 is fed to the ammonia reservoir 28. On the other hand, each highly combustible substance injector 6b is coupled to a highly combustible substance reservoir 32. This highly combustible substance reservoir 32 is connected through a highly combustible substance feed pipe 33 to a highly combustible substance tank 34. At the highly combustible substance feed pipe 33, an electronic control type variable discharge highly combustible substance feed pump 35 is arranged. By this highly combustible substance feed pump 35, the highly combustible substance in the highly combustible substance tank 34 is fed to the highly combustible substance reservoir 32.

Further, the exhaust manifold 5 and the intake manifold 4 are connected with each other through an exhaust gas recirculation (hereinafter, referred to as "EGR") passage 36. Inside the EGR passage 36, an electronic control type EGR control valve 37 is arranged. Further, around the EGR passage 36, a cooling system 38 for cooling the EGR gas flowing through the inside of the EGR passage 36 is arranged. In the aspect shown in FIG. 1, the engine cooling water is guided to the cooling system 38 where the engine cooling water cools the EGR gas.

The electronic control unit 40 is comprised of a digital computer provided with a ROM (read only memory) 42, RAM (random access memory) 43, CPU (microprocessor) 44, input port 45, and output port 46 all connected to each other by a bi-directional bus 41. An output signal of the intake air detector 11 is input through a corresponding AD converter 37 to the input port 45. An accelerator pedal 51 is connected to a load sensor 52 generating an output voltage proportional to the amount of depression of the accelerator pedal 51. The output voltage of the load sensor 52 is input through a corresponding AD converter 47 to the input port 45. Further, the input port 45 is connected to a crank angle sensor 53 generating an output pulse each time the crankshaft rotates by for example 10°. On the other hand, the output port 46 is connected through the corresponding drive circuits 48 to the ignition device 3, ammonia injector 6a, highly combustible substance injector 6b, actuator for driving the throttle valve 10, ammonia feed pump 31, highly combustible substance feed pump 35, and EGR control valve 37.

In the thus configured ammonia burning internal combustion engine, during the operation of the engine, liquid ammonia is injected from each ammonia injector 6a to the intake port 23 of each cylinder and the highly combustible substance is injected from each highly combustible substance injector 6b to the combustion chamber 2 of each cylinder. The liquid ammonia injected into the intake port 23 and the highly combustible substance injected into the combustion chamber 2 in this way are mixed with the air flowing into the combustion chamber 2 to form the air-fuel mixture.

The air-fuel mixture flowing into the combustion chamber 2 is ignited in the latter half of the compression stroke by the ignition device 3. If the ammonia is made to completely burn, theoretically it becomes $N_2$ and $H_2O$ and no $CO_2$ is generated at all. However, in practice, even if the ammonia burns, unburned ammonia will remain and $NO_X$ will be generated by combustion of the air-fuel mixture in the combustion chamber 2. Further, the air-fuel mixture contains the highly combustible substance in addition to ammonia, so depending on the properties of this highly combustible substance, even if the air-fuel mixture is burned in the combustion chamber 2, the unburned highly combustible substance will remain or $NO_X$ will be generated. For this reason, from the combustion chamber 2, unburned ammonia, $NO_X$, unburned highly combustible substance, etc., are discharged. Therefore, inside the engine exhaust passage, a downstream side exhaust purification system 16 able to purify the unburned ammonia, $NO_X$, unburned highly combustible substance, etc., contained in the exhaust gas is arranged.

However, at the time of cold start, etc., the temperature of the downstream side exhaust purification catalyst 16 is low, so the downstream side purification catalyst 16 is not activated and therefore cannot purify the unburned ammonia exhausted from the engine body. Therefore, in the present aspect, an upstream side exhaust purification system 14 able to adsorb ammonia, $NO_X$, or an unburned highly combustible substance contained in exhaust gas and releasing the adsorbed ammonia, $NO_X$, or unburned highly combustible substance when the temperature rises, is arranged in the engine exhaust passage upstream of the downstream side exhaust purification system 16.

Figure 3:
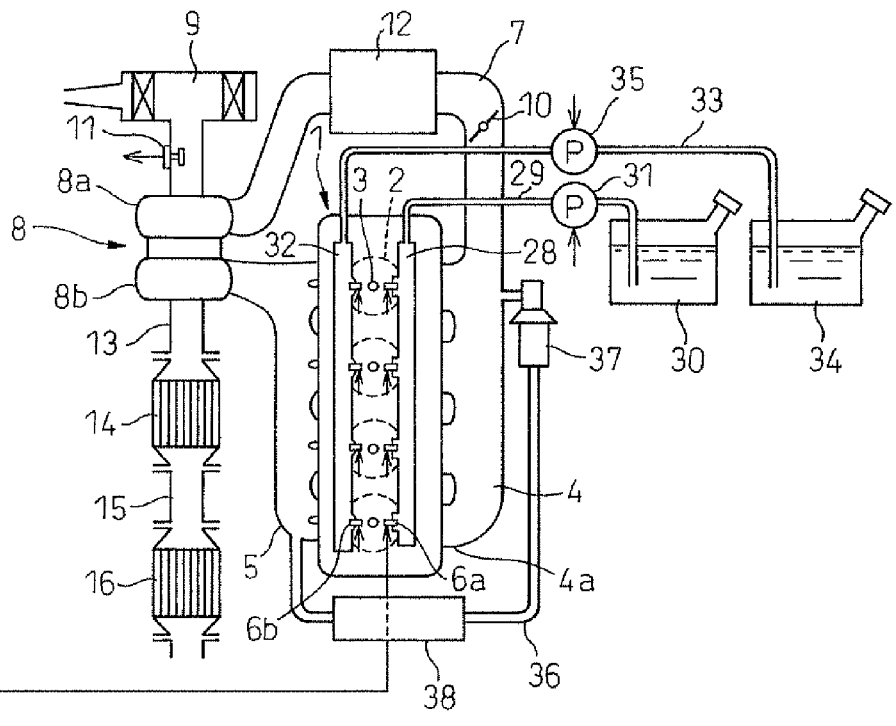
FIG. 3 is another overview of an internal combustion engine of the first aspect.
Figure 3:
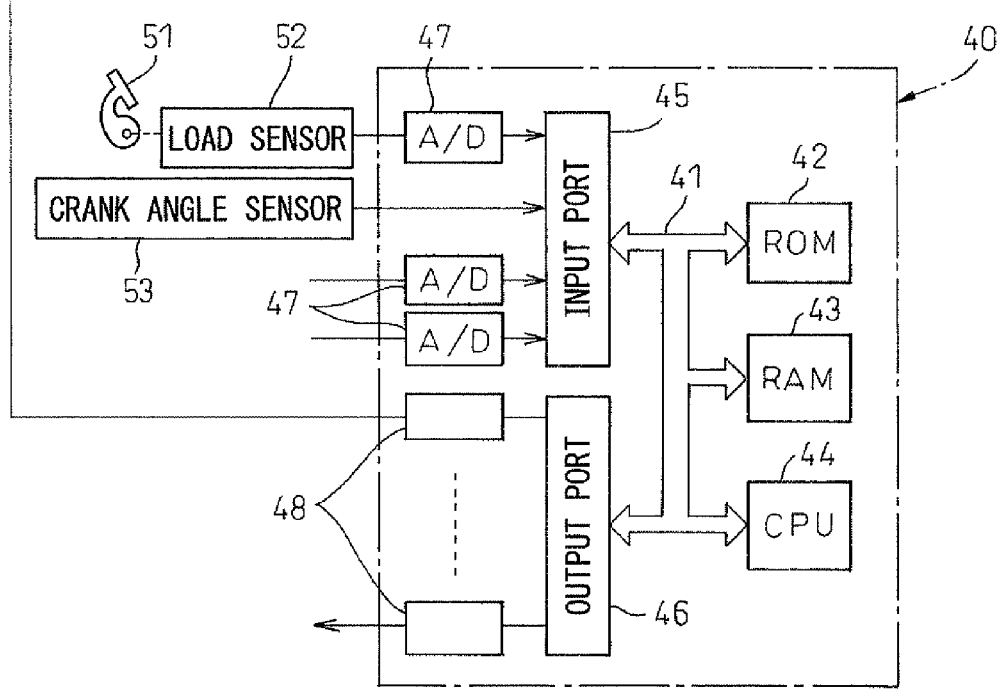

Note that, in the present aspect, the ammonia injector 6a is arranged at an intake branch pipe 4a and configured to inject liquid ammonia toward an intake port 23, while the highly combustible substance injector 6b is arranged at the cylinder head 21 and is configured to inject a highly combustible substance toward the inside of the combustion chamber 2. However, for example, as shown in FIG. 3, it is also possible to arrange the ammonia injector 6a and the highly combustible substance injector 6b at the cylinder head 21 and configure them to inject liquid ammonia and the highly combustible substance toward the combustion chamber 2. Alternatively, it is possible to arrange the ammonia injector 6a and highly combustible substance injector 6b at an intake branch pipe 4a and configure them to inject liquid ammonia and the highly combustible substance toward the intake port 23. Further, it is possible to arrange the ammonia injector 6a at the cylinder head 21 and configure it to inject liquid ammonia toward the inside of the combustion chamber 2 and to arrange the highly combustible substance injector 6b at the cylinder head 21 and configure it to inject the highly combustible substance toward the inside of the intake port 23.

Further, in the present aspect, as the internal combustion engine, a spark ignition type internal combustion engine using an ignition device 3 to ignite the air-fuel mixture is used. However, as the internal combustion engine, it is also possible to use a compression ignition type internal combustion engine not using an ignition device 3. In this case, the ammonia injector and highly combustible substance injector (below, these together called the "fuel injectors") are configured to directly inject liquid ammonia and the highly combustible substance into a combustion chamber 2. Further, in this case, no ignition device 3 is provided.

Further, in the present aspect, the ammonia injector 6a is fed with ammonia in the liquid state and injects the liquid ammonia. However, by arranging a vaporizer (not shown) at the ammonia feed pipe 29 or arranging a heater, etc., at the ammonia injector 6a, the liquid ammonia may be vaporized before injecting ammonia from the ammonia injector 6a, and a gaseous ammonia may be injected from the ammonia injector 13a as well.

Figure 4:
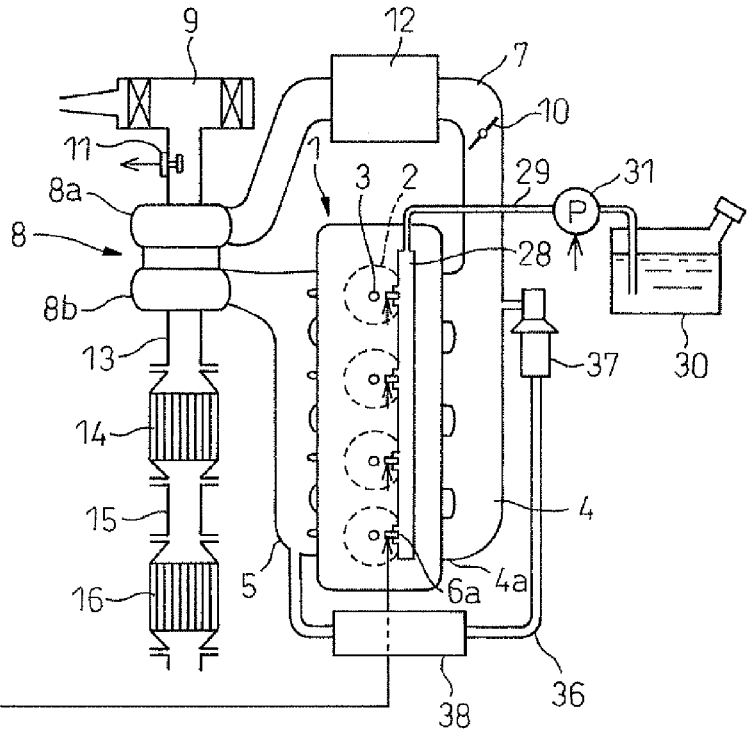
FIG. 4 is another overview of an internal combustion engine of the first aspect.
Figure 4:
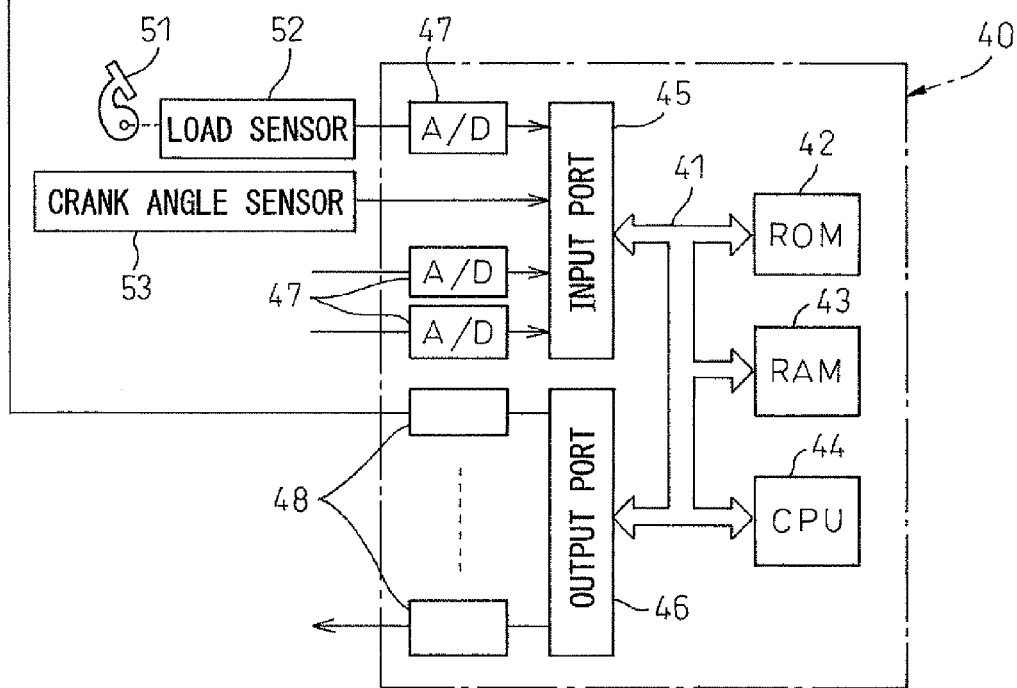

Furthermore, in the above aspect, the highly combustible substance is fed into the combustion chamber 2 in addition to the ammonia. However, the highly combustible substance is not necessarily fed. For example, as shown in FIG. 4, only ammonia may be fed into the combustion chamber 2 without providing the highly combustible substance injector 6b, etc., as well.

Note that, in the later explained aspects, embodiments, and modifications, except in particularly necessary cases, an internal combustion engine wherein liquid ammonia is injected toward the inside of the combustion chamber 2 and the air-fuel mixture is ignited by the ignition device 3, in which the liquid ammonia and a highly combustible substance are injected as fuels will be used. However, in the later explained aspects, embodiments, and modifications, a variety of changers are possible in the same way as the present aspect.

In this regard, ammonia is harder to burn compared with fossil fuels. Therefore, when using ammonia as fuel, some sort of measure is required for making the ammonia easier to burn. For this reason, in the internal combustion engine disclosed in the above prior art, by feeding hydrogen into the combustion chamber in addition to ammonia as the highly combustible substance assisting combustion of the ammonia, even in the case where ammonia is used, easy combustion of the air-fuel mixture in the combustion chamber is enabled.

In this way, by feeding the highly combustible substance in addition to ammonia to the combustion chamber, combustion of the ammonia can be improved. However, if the air-fuel mixture fed into the combustion chamber contains ammonia, ammonia causes a drop in the combustibility of the highly combustible substance. In particular, if the amount of ammonia fed into the combustion chamber increases or the ratio of the amount of the ammonia to the total amount of the ammonia and the highly combustible substance fed into the combustion chamber increases, the drop in the combustibility of the highly combustible substance becomes larger. For this reason, an ammonia burning internal combustion engine in which an air-fuel mixture containing ammonia suitably burns even if the amount of ammonia fed into the combustion chamber and the ratio of the amount of the ammonia to the total amount of the ammonia and the highly combustible substance fed into the combustion chamber increases has been considered to be necessary.

Therefore, in the ammonia burning internal combustion engine of the present aspect, when the amount of ammonia fed into the combustion chamber 2 increases or the ratio of the amount of the ammonia to the total amount of the ammonia and the highly combustible substance fed into the combustion chamber 2 increases, the ammonia and the highly combustible substance (hereinafter, these ammonia and highly combustible substance are together referred to as the "fuel") fed to the combustion chamber 2 are made easier to burn by controlling the operating parameters of the internal combustion engine. Below, various embodiments of control of operating parameters of the internal combustion engine so that the ammonia and the highly combustible substance fed to the combustion chamber 2 become easier to burn when the amount of ammonia fed into the combustion chamber 2 increases will be explained.

First, a first embodiment of the first aspect will be explained. In general, the higher the temperature of the air-fuel mixture in the combustion chamber 2 when the piston is located near the compression top dead center (hereinafter, referred to as the "compression end temperature"), the easier the combustion of the air-fuel mixture in the combustion chamber 5 becomes. Further, one method for making the compression end temperature rise, is to make the temperature of the intake gas fed into the combustion chamber 2 rise. Therefore, in the present embodiment, when the amount of ammonia fed into the combustion chamber 2 increases, the temperature of the intake gas fed into the combustion chamber 2 is made to rise.

Figure 5:
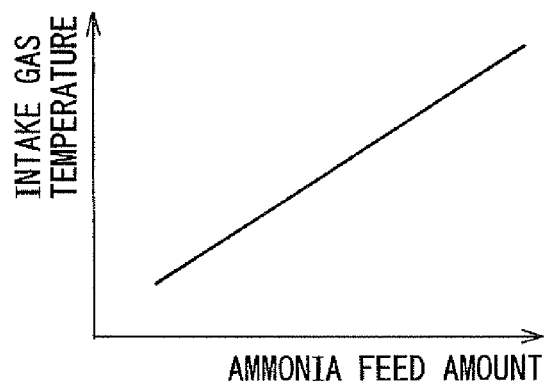
FIG. 5 is a view of a relationship of an amount of ammonia fed into the combustion chamber and a temperature of intake gas fed into a combustion chamber.

FIG. 5 shows the relationship between the amount of ammonia fed into the combustion chamber 2 and the temperature of the intake gas fed into the combustion chamber 2. As shown in FIG. 5, in the present embodiment, as the amount of ammonia fed into the combustion chamber 2 increases, the temperature of the intake gas fed into the combustion chamber 2 is made higher. By controlling the temperature of the intake gas fed into the combustion chamber 2 in this way, when the amount of ammonia fed into the combustion chamber 2 increases, the compression end temperature can be made higher. Due to this, it is possible to suppress deterioration of combustion of the highly combustible substance along with the increase of ammonia and therefore possible to suppress deterioration of the combustion of the air-fuel mixture. In particular, the octane number of ammonia is extremely high, i.e. 110 to 130, so knocking becomes harder to occur along with the increase of ammonia, so it is possible to raise the compression end temperature without causing knocking.

Here, a method of raising the temperature of the intake gas fed into the combustion chamber 2 includes the following methods. A first method is to provide, inside the intake passage (for example, intake duct 7, intake manifold 4) of the internal combustion engine, a heating system (heater etc.) for raising the temperature of the intake gas flowing in the intake passage and to raise the temperature of the intake gas by this heating system. In this case, by suitably controlling the amount of heating by the heating system, the temperature of the intake gas fed into the combustion chamber 2 can be easily controlled to any temperature.

A second method is to bypass the cooling system 12 provided in the intake duct 7. That is, by providing, in the engine intake system, a bypass pipe (not shown) bypassing the cooling system 12 and a flow rate control valve (not shown) controlling the flow rate of the intake gas flowing into this bypass pipe and cooling system 12, and making the ratio of the intake gas flowing into the bypass pipe increase, the temperature of the intake gas fed into the combustion chamber 2 can be raised. Conversely, by making the ratio of the intake gas flowing into the cooling system 12 increase, the temperature of the intake gas fed into the combustion chamber 2 can be made to drop. In this case, it is not necessary to provide a heating system as explained above, therefore consumption of electric power or other energy when raising the temperature of the intake gas fed into the combustion chamber 2 is suppressed.

A third method is to increase the amount of heat given to the intake gas sucked into the combustion chamber 2 by the EGR gas. For example, as in the present aspect, in the case of an internal combustion engine having an external EGR mechanism (EGR passage 36, EGR control valve 37, and cooling system 38), by providing, in the external EGR mechanism, a bypass pipe (not shown) bypassing the cooling system 38 and a flow rate control valve (not shown) controlling the flow rate of the EGR gas flowing into this bypass pipe and cooling system 38, and increasing the ratio of the EGR gas flowing into the bypass pipe, the temperature of the intake gas fed into the combustion chamber 2 can be raised.

Alternatively, in the case of an internal combustion engine having an external EGR mechanism and able to control the intake valve 24 and exhaust valve 26, etc., so that part of the exhaust gas discharged from a combustion chamber 2 into an exhaust port 25 can be fed into the combustion chamber 2 again as the EGR gas (internal EGR) in the next cycle, by raising the ratio of the EGR gas fed into the combustion chamber 2 by the internal EGR with respect to the EGR gas fed into the combustion chamber 2 by the external EGR, the temperature of the intake gas fed into the combustion chamber 2 can be raised. This is because the temperature of the internal EGR gas is higher than the external EGR gas.

Furthermore, in the case of an internal combustion engine having, in addition to the external EGR mechanism shown in FIG. 1, an LPL-EGR mechanism provided with an EGR passage (not shown) communicating the exhaust passage at a downstream side from the exhaust purification systems 14 and 16 and the intake passage at an upstream side from the compressor 8a of the exhaust turbocharger 8 with each other, by raising the ratio of the EGR gas fed into the combustion chamber 2 by the LPL-EGR mechanism with respect to the EGR gas fed into the combustion chamber 2 by the external EGR mechanism shown in FIG. 1, the temperature of the intake gas fed into the combustion chamber 2 can be raised. This is because, in the external EGR mechanism shown in FIG. 1, the high temperature EGR gas is fed to the air raised in temperature by the compressor 8a, while in the LPL-EGR mechanism, the high temperature EGR gas is fed to the low temperature air before temperature elevation by the compressor 8a, so the ratio of temperature rise of air is higher in the case where the EGR gas is fed by the LPL-EGR mechanism.

Note that, when raising the temperature of the intake gas fed into the combustion chamber 2, the first to third methods may be combined for use as well. Further, in the above embodiment, the amount of heating, etc., by the heating system is continuously changed in accordance with the feed amount of ammonia into the combustion chamber 2. However, it is also possible to perform heating by the heating system if the amount of feed of the ammonia into the combustion chamber 2 becomes the predetermined reference feed amount or more as well and not perform heating by the heating system if the former is smaller than the predetermined reference feed amount. In the same way, it is also possible to make the total amount of the intake gas and EGR gas flow into the bypass pipe if the feed amount of the ammonia into the combustion chamber 2 becomes the predetermined reference feed amount or more as well and not make it flow into the bypass pipe if the former is smaller than the predetermined reference feed amount.

Figure 6:
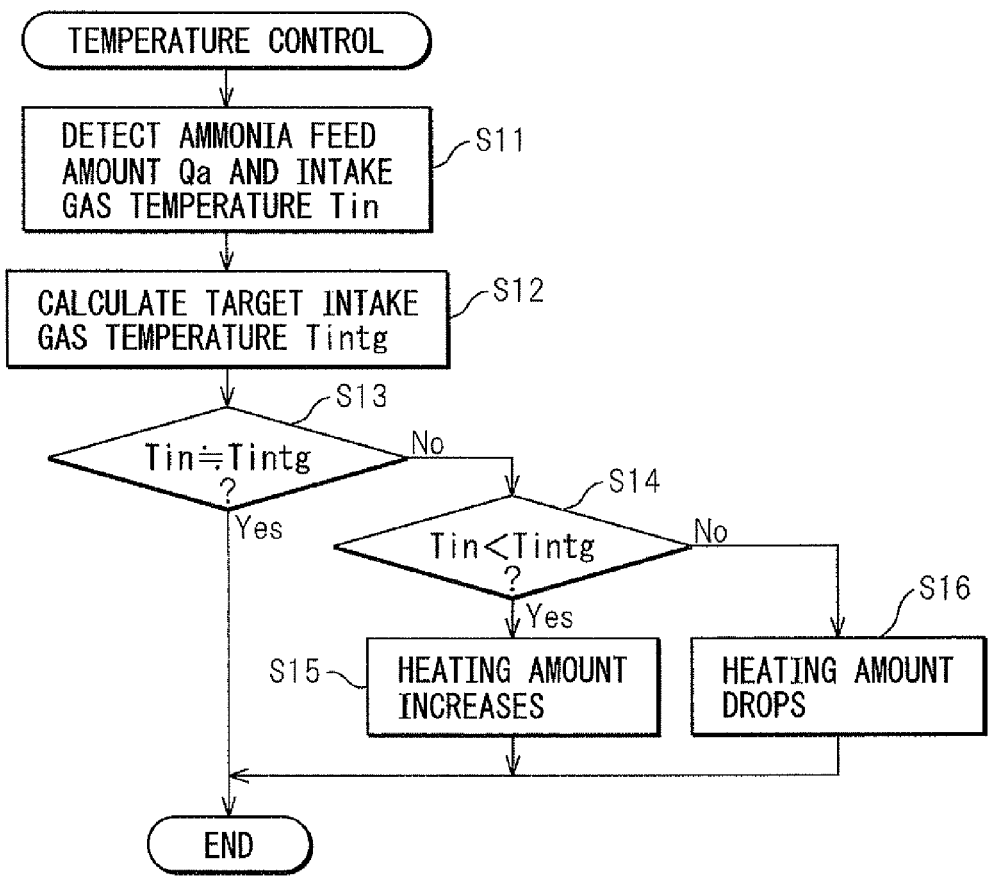
FIG. 6 is a flowchart showing a control routine of control of a temperature of intake gas in accordance with an amount of ammonia fed into a combustion chamber.

FIG. 6 is a flow chart showing a control routine of control of the temperature of the intake gas fed into the combustion chamber 2 in accordance with the feed amount of the ammonia into the combustion chamber 2. The flow chart shown in FIG. 6 shows a case where the method of raising the temperature of the intake gas by a heating system (the first method) is employed as the method of raising the temperature of the intake gas fed into combustion chamber 2.

As shown in FIG. 6, first, at step S11, the feed amount Qa of ammonia into the combustion chamber 2, that is, the injection amount of ammonia from the ammonia injector 6a, and a temperature Tin of the intake gas flowing into the combustion chamber 2 are detected. The intake gas temperature Tin may be detected by a temperature sensor (not shown) provided in the intake port 23 or may be estimated based on the outside air temperature or speed of the exhaust turbocharger 8, etc. Next, at step S12, based on the feed amount Qa of the ammonia into the combustion chamber 2 detected at step S11, a target intake gas temperature Tintg is calculated by using a map as shown in FIG. 5. Note that, the map as shown in FIG. 5 may be prepared for each engine operating state (for example, each engine load, engine speed, etc.) as well. In this case, at step S12, in addition to the feed amount Qa of the ammonia, the target intake gas temperature Tintg is calculated based on the engine load and engine speed.

Next, at steps S13 and S14, it is determined whether the intake gas temperature Tin detected at step S11 is substantially the same as the target intake gas temperature Tintg calculated at step S12 and is lower than the target intake gas temperature Tintg. When it is determined that they are substantially the same, the control routine is ended. On the other hand, when it is determined at steps S13 and S14 that the intake gas temperature Tin is lower than the target intake gas temperature Tintg, the amount of heating by the heating system is increased. Due to this, the temperature of the intake gas fed into the combustion chamber 5 is raised. Further, when it is determined at steps S13 and S14 that the intake gas temperature Tin is higher than the target intake gas temperature Tintg, the amount of heating by the heating system is decreased. Due to this, the temperature of the intake gas fed into the combustion chamber 5 is made to drop.

Figures 7A, 7B:
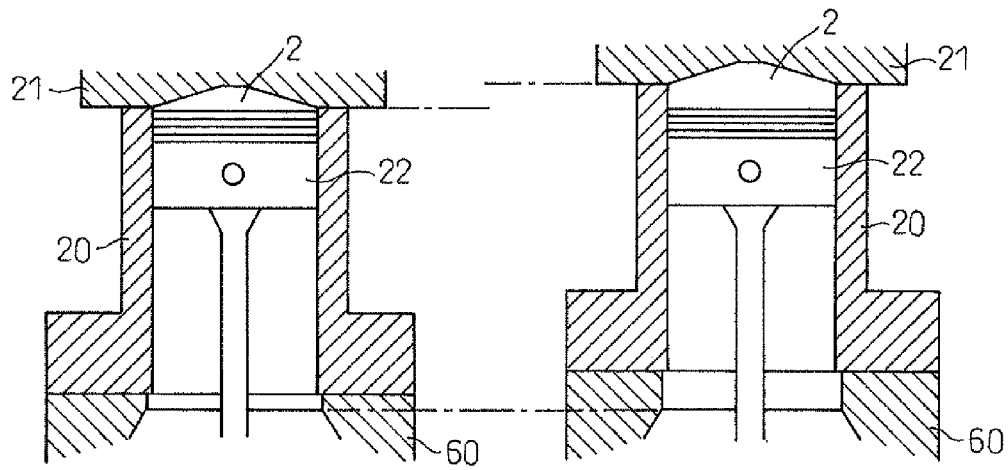
FIGS. 7A and 7B are views schematically showing a compression ratio changing mechanism.

Next, a second embodiment of the first aspect will be explained. The ammonia burning internal combustion engine of the second embodiment is provided with a compression ratio changing mechanism able to change the mechanical compression ratio. This compression ratio changing mechanism, as shown in FIGS. 7A and 7B, can change a relative position of a cylinder block 20 with respect to a crank case 60 in the direction in which a piston 22 reciprocally moves. In the state shown in FIG. 7A, the cylinder block 20 is moved so as to approach the crank case 60. In this case, the volume of the combustion chamber 2 when the piston 22 is located at the compression top dead center is small. On the other hand, in the state shown in FIG. 7B, the cylinder block 20 is moved so as to be moved away from the crank case 60. In this case, the volume of the combustion chamber 2 when the piston 22 is located at the compression top dead center is large. On the other hand, the volume of a portion wherein the piston 22 passes from the intake bottom dead center to the compression top dead center (stroke volume) is constant irrespective of a relative position between the crank case 60 and the cylinder block 20. For this reason, the mechanical compression ratio in the state shown in FIG. 7A is higher than the mechanical compression ratio shown in FIG. 7B. In this way, in the compression ratio changing mechanism, by changing the relative position of the cylinder block 20 with respect to the crank case 6, the mechanical compression ratio can be changed. Note that, the compression ratio changing mechanism shown in FIGS. 7A and 7B is one example. It is also possible to use various other compression ratio changing mechanisms.

Further, in the ammonia burning internal combustion engine of the second embodiment, the closing timing of the intake valve 24 can be changed by the variable valve timing mechanism. By changing the closing timing of this intake valve 24, the de facto compression ratio can be changed. That is, when the closing timing of the intake valve 24 is near the intake bottom dead center, the ratio of the volume of the combustion chamber when the piston is located at the compression top dead center with respect to the volume of the combustion chamber at the time of closing of the intake valve 24 is large. Conversely, when the closing timing of the intake valve 24 is a timing other than the intake bottom dead center, the ratio of the volume of the combustion chamber when the piston is located at the compression top dead center with respect to the volume of the combustion chamber at the time of closing of the intake valve 24 is small.

Here, if the ratio of the volume of the combustion chamber at the time when the piston is located at compression top dead center with respect to the volume of the combustion chamber at the closing timing of the intake valve 24 is defined as the actual compression ratio, the actual compression ratio becomes higher the higher the mechanical compression ratio and the nearer the closing timing of the intake valve 24 to intake bottom dead center. On the other hand, here, if the actual compression ratio is high, the degree by which the intake gas fed into the combustion chamber 2 is compressed is large and therefore the compression end temperature also rises. Therefore, in the present embodiment, when the amount of ammonia fed into the combustion chamber 2 is increased, the variable compression ratio mechanism and variable valve timing mechanism are controlled so that the actual compression ratio becomes larger.

Figure 8:
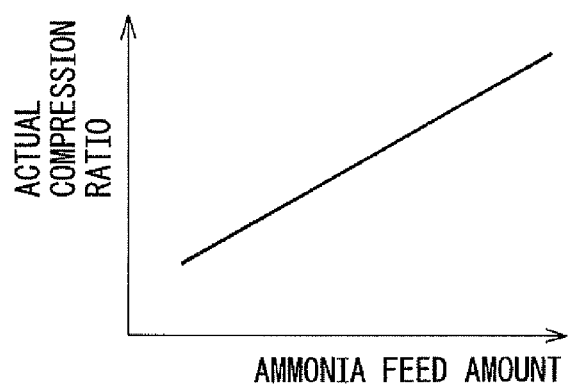
FIG. 8 is a view showing a relationship of an amount of ammonia fed into a combustion chamber and an actual compression ratio.

FIG. 8 is a view showing the relationship between the amount of ammonia fed into the combustion chamber 2 and the actual compression ratio. As shown in FIG. 8, in the present embodiment, as the amount of ammonia fed into the combustion chamber 2 increases, the actual compression ratio is made higher. By controlling the actual compression ratio in this way, it is possible to suppress deterioration of the combustion of the air-fuel mixture accompanying an increase of ammonia.

Figure 9:
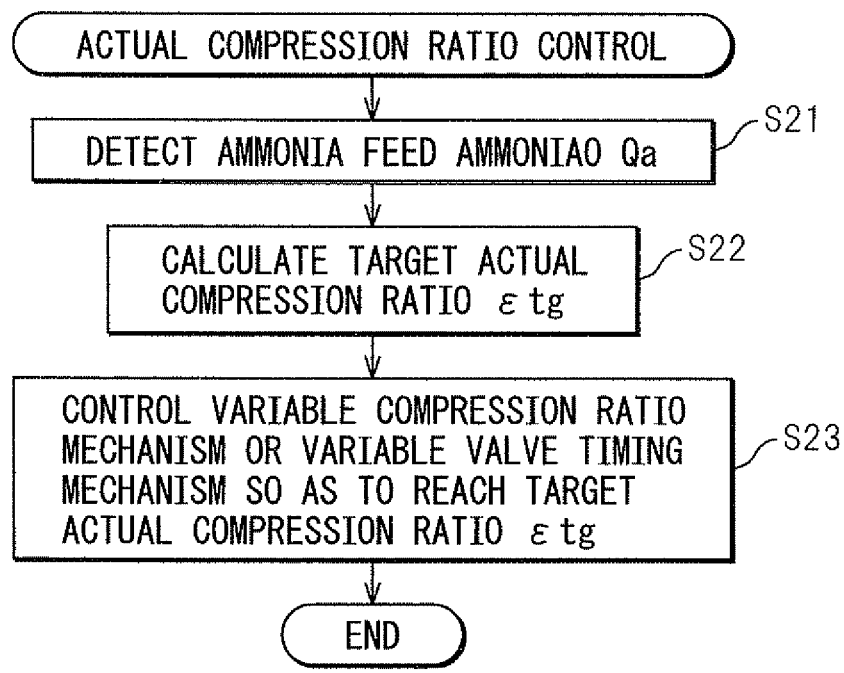
FIG. 9 is a flowchart showing a control routine of control of an actual compression ratio in accordance with an amount of ammonia fed into a combustion chamber.

FIG. 9 is a flow chart showing a control routine of the control of the actual compression ratio in accordance with the amount of ammonia fed into the combustion chamber 2. As shown in FIG. 9, first, at step S21, the feed amount Qa of the ammonia into the combustion chamber 2 is detected. Next, at step S22, a target actual compression ratio Etg is calculated based on the ammonia feed amount Qa into the combustion chamber 2 detected at step S21, by using a map as shown in FIG. 8. Note that, the map as shown in FIG. 8 is prepared for each engine operating state (for example, each engine load, engine speed, etc.). Next, at step S23, the compression ratio changing mechanism or variable valve timing mechanism is controlled so that the actual compression ratio becomes the target actual compression ratio $\epsilon$tg.

Next, a third embodiment of the first aspect will be explained. As explained above, the higher the compression end temperature, the easier the air-fuel mixture in the combustion chamber 5 becomes to burn. One method of making such compression end temperature rise is to increase the amount of the intake gas (hereinafter, referred to as the "amount of filled intake gas") filled in the combustion chamber 2 at the time of closing of the intake valve 24. Therefore, in the present aspect, when the amount of ammonia fed into the combustion chamber 2 increases or when the ratio of the amount of the ammonia to the total feed amount of the ammonia and highly combustible substance into the combustion chamber 2 increases, the amount of filled intake gas is made larger.

Figure 10:
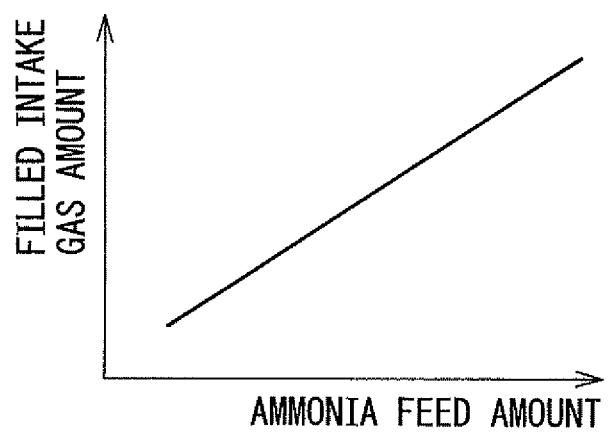
FIG. 10 is a view showing a relationship of an amount of ammonia fed into a combustion chamber and an amount of suction intake gas.

FIG. 10 shows the relationship between the amount of ammonia fed into the combustion chamber 2 and the amount of filled intake gas. As shown in FIG. 10, in the present embodiment, the larger the amount of ammonia fed into the combustion chamber 2, the larger the amount of filled intake gas is made. By controlling the amount of filled intake gas in this way, the compression end temperature can be made high when the amount of ammonia fed into the combustion chamber 2 is increased. Due to this, deterioration of the combustion of the air-fuel mixture accompanying the increase of ammonia can be suppressed.

The method of increasing the amount of suction intake gas includes, in addition to enlargement of the opening degree of the throttle valve 10, the following methods. A first method is to raise the supercharging pressure by the exhaust turbocharger 8. When the supercharging pressure by the exhaust turbocharger 8 is raised, the pressure of the intake gas fed into the combustion chamber 2 is raised and thereby the amount of filled intake gas is made to increase.

A second method is to change the closing timing of the intake valve 24 to the intake bottom dead center side. The piston 22 is located at the lowermost position at the intake bottom dead center, therefore the volume in the combustion chamber 2 at the intake bottom dead center becomes the maximum. For this reason, when the closing timing of the intake valve 24 is made near the intake bottom dead center, a large amount of intake gas is filled in the combustion chamber 2 at the time of closing of the intake valve 24. On the other hand, at a timing away from the intake bottom dead center, the volume in the combustion chamber 2 becomes smaller than the volume in the combustion chamber 2 at intake bottom dead center. For this reason, if the closing timing of the intake valve 24 is made a timing away from intake bottom dead center, the amount of the filled intake gas is decreased.

Note that, in the above first and second methods, by increasing the air amount filled in the combustion chamber 2 at the time of closing of the intake valve 24, the amount of filled intake gas is increased. In this way, when the amount of air filled in the combustion chamber 2 is increased, the air-fuel ratio of the air-fuel mixture in the combustion chamber 2 ends up changing. Therefore, the above first and second methods are preferably applied to an internal combustion engine in which the air-fuel ratio of the air-fuel mixture becomes lean at the time of normal operation of the internal combustion engine. Such an internal combustion engine includes, for example, a compression ignition type internal combustion engine and a spark ignition type internal combustion engine performing stratified charge combustion. In these internal combustion engines, even when the air-fuel ratio slightly fluctuates, that is, even when the amount of air filled in the combustion chamber 2 changes at the time of closing of the intake valve 24, a large torque fluctuation is hard to occur.

A third method is to increase the filled intake gas amount by increasing the amount of the EGR gas filled in the combustion chamber 2 at the time of closing of the intake valve 24. That is, the throttle valve 10 and EGR control valve 37 are controlled so that only the amount of the EGR gas filled into the combustion chamber 2 increases without a change of the amount of air filled into the combustion chamber 2. By increasing only the amount of filling of the EGR gas in this way, the amount of filled intake gas can be increased with almost no change of the air-fuel ratio of the air-fuel mixture filled into the combustion chamber 2. Note that, in increasing the amount of the intake gas filled in the combustion chamber 2 at the time of closing of the intake valve 24, the first to third methods may be combined for use as well.

Figure 11:
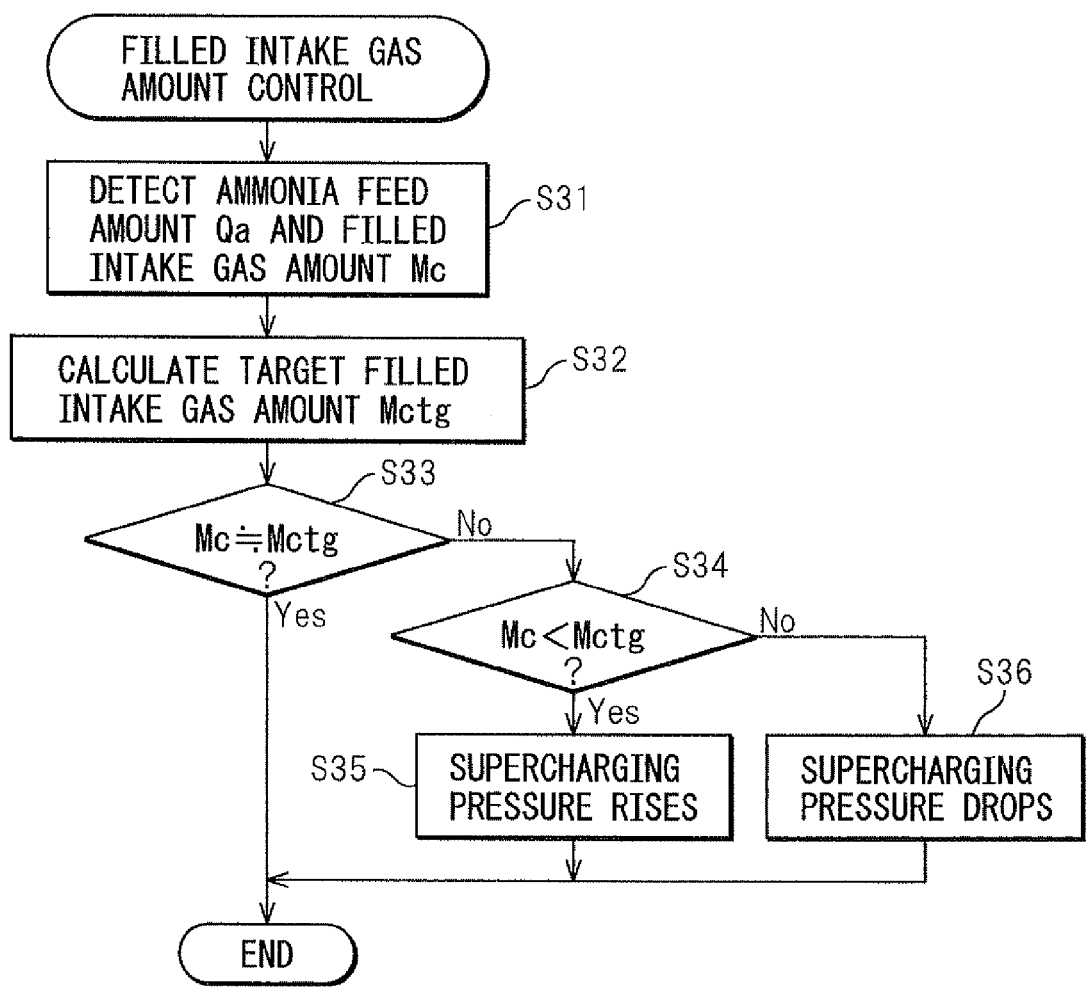
FIG. 11 is a flowchart showing a control routine of control of an amount of suction intake gas in accordance with an amount of ammonia fed into a combustion chamber.

FIG. 11 is a flow chart showing a control routine of the control of the filled intake gas amount in accordance with the amount of ammonia fed into the combustion chamber 2. In the flow chart shown in FIG. 11, a case employing the method of raising the supercharging pressure as the method of increasing the filled intake gas amount is shown.

As shown in FIG. 11, first, at step S31, the feed amount Qa of the ammonia into the combustion chamber 2 and the present filled intake gas amount Mc are detected. The filled intake gas amount Mc is calculated based on for example the output of the intake air amount detector 11. Next, at step S32, a target filled intake gas amount Mctg is calculated based on the feed amount Qa of the ammonia into the combustion chamber 2 detected at step S31, by using a map as shown in FIG. 10. Note that, the map as shown in FIG. 10 is prepared for each engine operating state (for example, each engine load, engine speed, etc.)

Next, at steps S33 and 34, the relative magnitude between the present filled intake gas amount Mc and the target filled intake gas amount Mctg is determined. When it is determined that the present filled intake gas amount Mc and the target filled intake gas amount Mctg are substantially the same, the control routine is ended. On the other hand, when it is determined that the present filled intake gas amount Mc is smaller than the target filled intake gas amount Mctg, the routine proceeds to step S35 where the supercharging pressure is raised. Conversely, when it is determined that the present filled intake gas amount Mc is larger than the target filled intake gas amount Mctg, the routine proceeds to step S36 where the supercharging pressure is made to drop.

Figure 12:
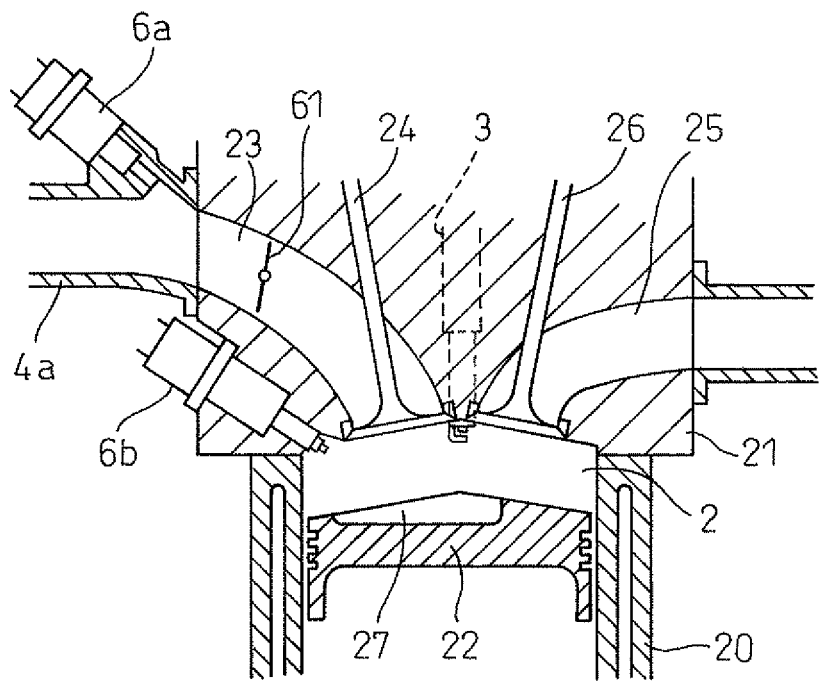
FIG. 12 is a cross-sectional view of an engine body in a third embodiment of the first aspect.

Next, a fourth embodiment of the first aspect will be explained. In the ammonia burning internal combustion engine of the fourth embodiment, as shown in FIG. 12, an impulse valve 61 for performing impulse supercharging is provided. In the present embodiment, the impulse valve 61 is provided in the intake port 23, but it may be arranged in the intake branch pipe 4a as well. The impulse valve 61 is opened after opening of the intake valve 24 when performing impulse supercharging. During a period from when the intake valve 24 is opened to when the impulse valve 61 is opened, along with the downward movement of the piston 22, a large negative pressure is generated in the combustion chamber 2 and in the intake port 23 at a downstream side of the impulse valve 61. After that, if the impulse valve 61 is opened when the piston 22 is located near the intake bottom dead center, a pressure wave occurs in the intake port 23, etc. Due to this, a supercharging effect is obtained. On the other hand, the impulse valve 61 is kept opened wide as is when not performing impulse supercharging.

Figure 13:
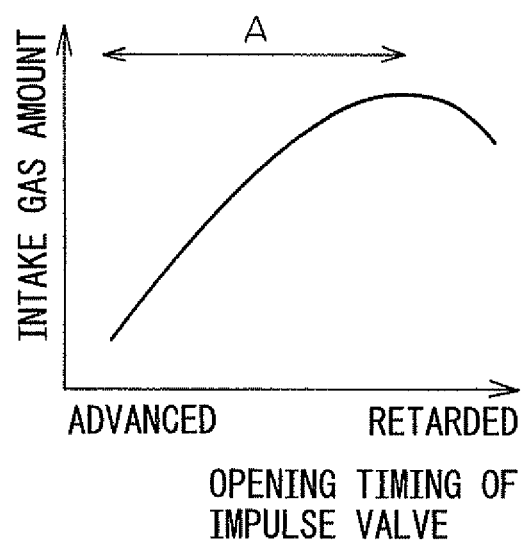
FIG. 13 is a view showing a relationship between an opening timing of the impulse valve and an amount of intake gas fed into a combustion chamber.

FIG. 13 shows the relationship between the opening timing of the impulse valve 61 and the amount of the intake gas fed into the combustion chamber 2 when the opening timing and closing timing of the intake valve 24 and the engine speed, etc., are made constant. As seen from FIG. 13, in a region advanced from a certain constant timing (region A in FIG. 13), the more the opening timing of the impulse valve 61 is retarded, the greater amount of the intake gas fed into the combustion chamber 2.

Further, the turbulence of the intake gas occurring in the combustion chamber 2 becomes larger along with the increase of the intake gas amount. In this way, the larger the turbulence of the intake gas occurring in the combustion chamber 2, the more the mixing of the ammonia and highly combustible substance fed into the combustion chamber 2 with the intake gas and the mixing of the ammonia and the highly combustible substance are promoted, therefore the easier the air-fuel mixture becomes to burn. Further, the larger the turbulence of the intake gas, the greater the area of the interface of the ammonia and the highly combustible substance, therefore the higher the flame propagation rate, so a heat efficiency and a combustion efficiency are improved.

Figure 14:
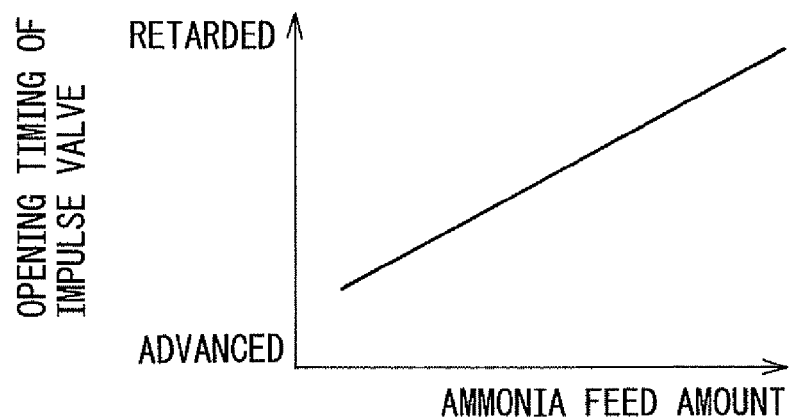
FIG. 14 is a view showing a relationship between an amount of ammonia fed into a combustion chamber and an opening timing of an impulse valve.

Therefore, in the ammonia burning internal combustion engine of the present embodiment, when the amount of ammonia fed into the combustion chamber 2 is increased, the opening timing of the impulse valve 61 is retarded within the region A in FIG. 13. FIG. 14 shows the relationship between the amount of ammonia fed into the combustion chamber 2 and the opening timing of the impulse valve 61. As shown in FIG. 14, in the present embodiment, the larger the amount of ammonia fed into the combustion chamber 2, the more the opening timing of the impulse valve 61 is retarded. By controlling the impulse valve 61 in this way, even when the amount of ammonia fed into the combustion chamber 2 is increased, the compression end temperature can be made higher and the turbulence of the intake gas can be made larger by the increase of the amount of the intake gas fed into the combustion chamber 2. Due to this, deterioration of the combustion of the air-fuel mixture accompanying the increase of the ammonia can be suppressed.

Figure 15:
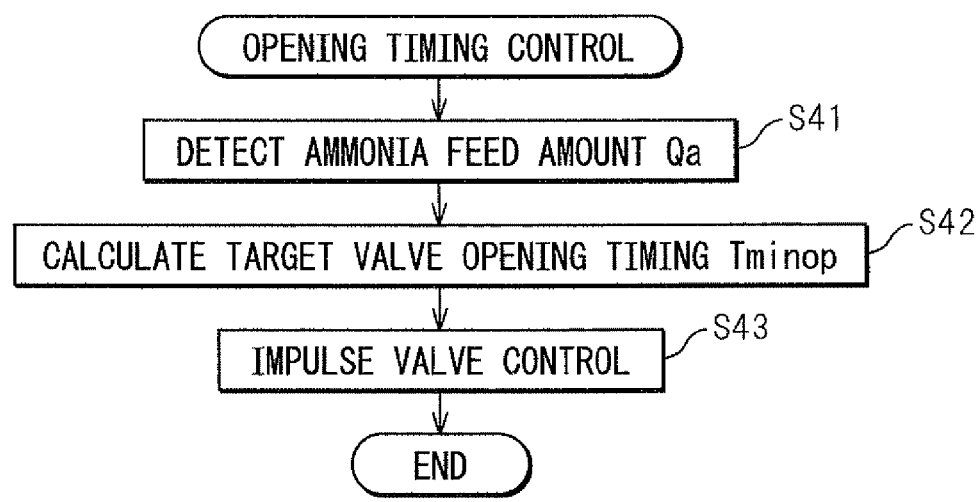
FIG. 15 is a flowchart showing a control routine of control of an opening timing of an impulse valve in accordance with an amount of ammonia fed into a combustion chamber.

FIG. 15 is a flow chart showing a control routine of the control of the opening timing of the impulse valve 61 in accordance with the amount of ammonia fed into the combustion chamber 2. As shown in FIG. 15, first, at step S41, the feed amount Qa of the ammonia into the combustion chamber 2 is detected. Next, at step S42, a target opening timing Tminop of the impulse valve 61 is calculated based on the ammonia feed amount Qa detected at step S41, by using a map as shown in FIG. 14. Note that, the map as shown in FIG. 14 is prepared for each engine operating state (for example, each engine load, engine speed, etc.). Next, at step S43, the impulse valve 61 is controlled so that the impulse valve 61 becomes open at the target opening timing Tminop.

Next, a fifth embodiment of the first aspect will be explained. In this regard, the EGR gas is an inert gas. Therefore, when the ratio of the EGR gas in the intake gas fed into the combustion chamber 2 (that is, the EGR rate) becomes smaller, the air-fuel mixture becomes easier to burn. Further, air has a higher ratio of specific heat compared with the EGR gas. Therefore, if the temperature and compression ratio of the intake gas fed into the combustion chamber 2 are the same, the smaller the amount of EGR gas fed into the combustion chamber 2, the higher the compression end temperature becomes. As explained above, the higher the compression end temperature, the easier the combustion of the air-fuel mixture in the combustion chamber 2 becomes. Therefore, from such a viewpoint as well, when the ratio of the EGR gas in the intake gas fed into the combustion chamber 2 becomes smaller, the air-fuel mixture becomes easier to burn.

Therefore, in the ammonia burning internal combustion engine of the present embodiment, when the amount of ammonia fed into the combustion chamber 2 increases, the throttle valve 10 and EGR control valve 37 are controlled so that the EGR gas rate becomes smaller.

Figure 16:
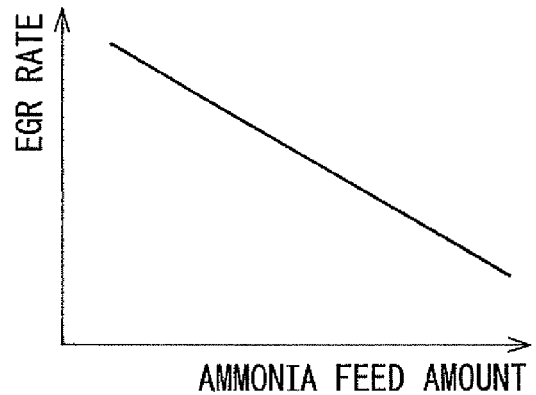
FIG. 16 is a view showing a relationship of an amount of ammonia fed into a combustion chamber and an EGR rate.

FIG. 16 shows the relationship between the amount of ammonia fed into the combustion chamber 2 and the EGR rate. As shown in FIG. 16, in the present embodiment, the larger the amount of ammonia fed into the combustion chamber 2, the smaller the EGR rate is made. By controlling the EGR rate in this way, even at the time when the amount of ammonia fed into the combustion chamber 2 increases, deterioration of the combustion of the air-fuel mixture accompanying the increase of the ammonia can be suppressed.

Figure 17:
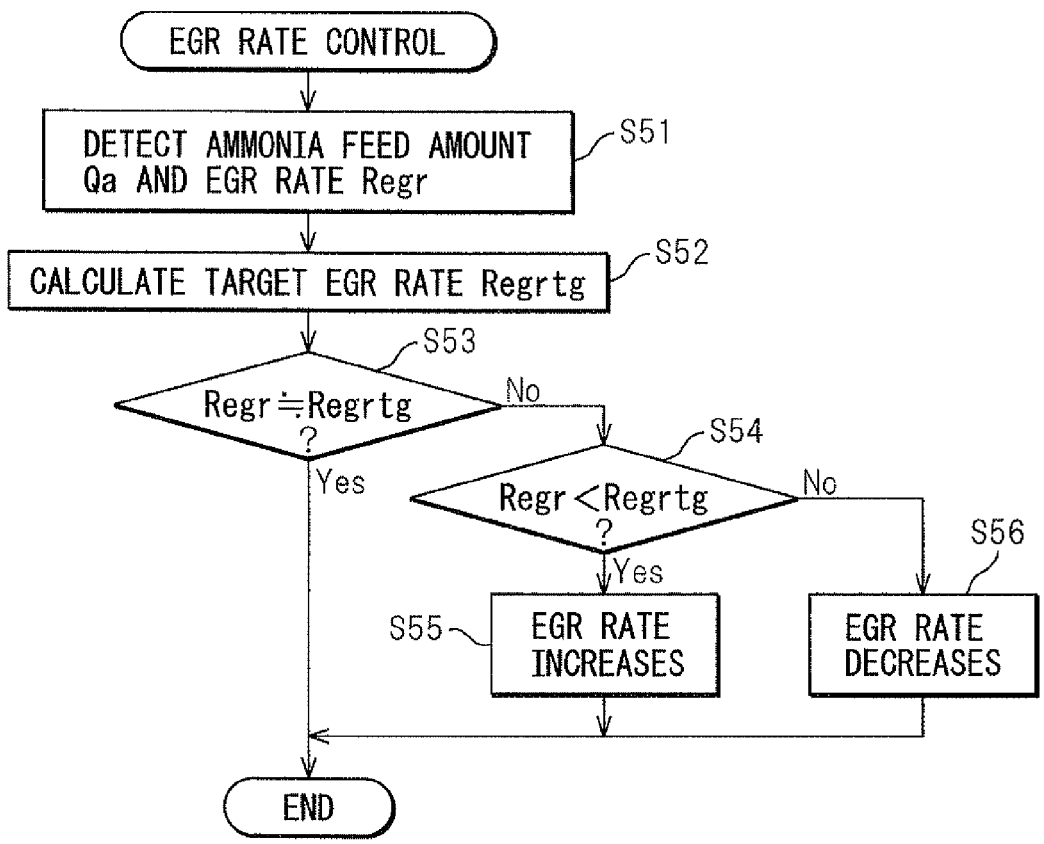
FIG. 17 is a flowchart showing a control routine of control of an EGR rate in accordance with an amount of ammonia fed into a combustion chamber.

FIG. 17 is a flow chart showing a control routine of the control of the EGR rate in accordance with the amount of ammonia fed into the combustion chamber 2. As shown in FIG. 17, first, at step S51, the feed amount Qa of the ammonia into the combustion chamber 2 and the present EGR rate Regr are detected. The present EGR rate Regr is calculated based on for example the engine speed, opening degree of the throttle valve 10, opening degree of the EGR control valve 37, etc. Next, at step S52, a target EGR rate Regrtg is calculated based on the ammonia feed amount Qa into the combustion chamber 2, by using a map as shown in FIG. 16. Note that, the map as shown in FIG. 16 is prepared for each engine operating state (for example, each engine load, engine speed, etc.)

Next, at steps S53 and S54, it is determined whether the present EGR rate Regr detected at step S51 is substantially the same as the target EGR rate Regrtg and lower than the target EGR rate Regrtg. In the case where these are determined to be substantially the same, the control routine is ended. On the other hand, when it is determined at steps S53 and S54 that the present EGR rate Regr is lower than the target EGR rate Regrtg, the routine proceeds to step S55 where the opening degree of the throttle valve 10 and the opening degree of the EGR control valve 37 are controlled so that the EGR rate increases. On the other hand, when it is determined at steps S53 and S54 that the present EGR rate Regr is higher than the target EGR rate Regrtg, the routine proceeds to step S56 where the opening degree of the throttle valve 10 and the opening degree of the EGR control valve 37 are controlled so that the EGR rate decreases.

Figure 18:
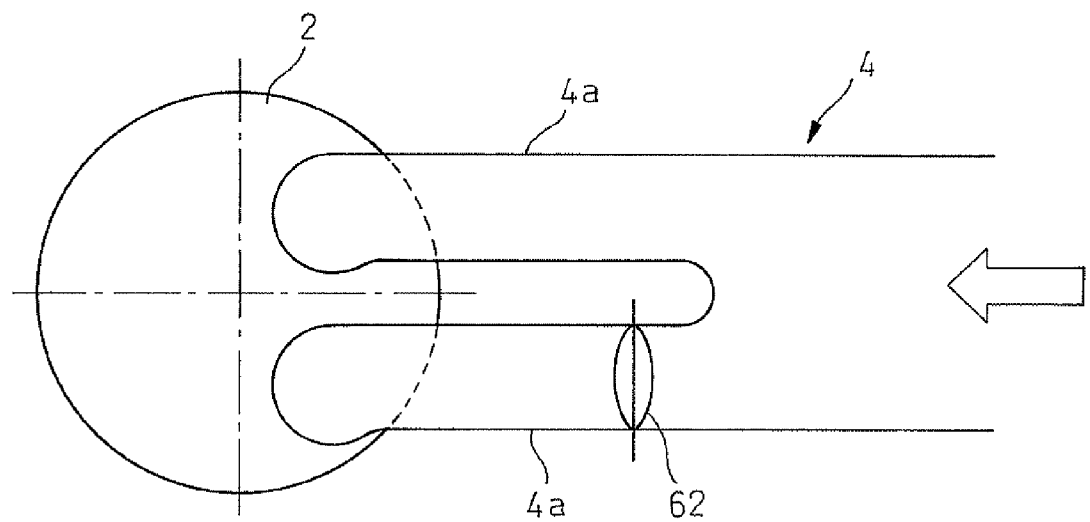
FIG. 18 is a view schematically showing an intake manifold in a sixth embodiment of the first aspect.

Next, a sixth embodiment of the first aspect will be explained. In the ammonia burning internal combustion engine of the sixth embodiment, as shown in FIG. 18, a swirl control valve 62 is provided in one intake branch pipe of two intake branch pipes 4a communicating with each cylinder. The swirl control valve 62 causes swirl (turbulence of the air-fuel mixture) in the combustion chamber 2 in accordance with the opening degree thereof. That is, when the swirl control valve 62 is fully closed, a large swirl occurs in the combustion chamber 2. The swirl occurring in the combustion chamber 2 becomes smaller along with the decrease of the opening degree of the swirl control valve 62. Almost no swirl occurs in the combustion chamber 2 when the swirl control valve 62 is fully opened. As explained above, the larger the swirl fed into the combustion chamber 2, the easier the air-fuel mixture becomes to burn, and the more the heat efficiency and combustion efficiency are improved.

Therefore, in the ammonia burning internal combustion engine of the present embodiment, when the amount of ammonia fed into the combustion chamber 2 is increased, the opening degree of the swirl control valve 62 is made smaller and the turbulence (swirl) of the air-fuel mixture occurring in the combustion chamber 2 is made larger.

Figure 19:
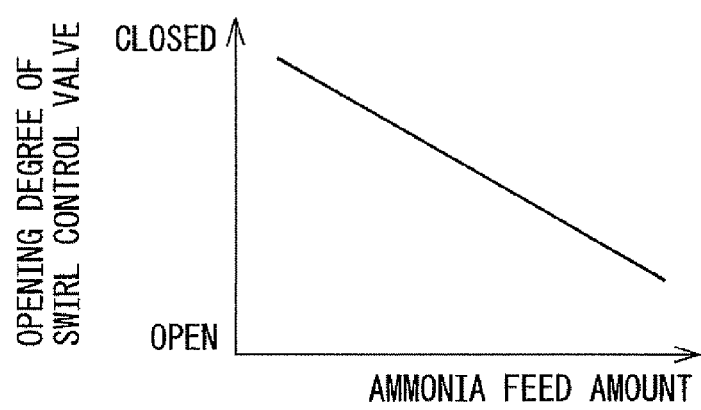
FIG. 19 is a view showing a relationship of an amount of ammonia fed into a combustion chamber and an opening degree of a swirl control valve.

FIG. 19 shows the relationship between the amount of ammonia fed into the combustion chamber 2 and the opening degree of the swirl control valve 62. As shown in FIG. 19, in the present embodiment, the larger the amount of ammonia fed into the combustion chamber 2, the smaller the opening degree of the swirl control valve 62 is made, therefore the larger the turbulence (swirl) of the air-fuel mixture fed into the combustion chamber 2 is made. By controlling the turbulence of the air-fuel mixture fed into the combustion chamber 2 in this way, even at the time when the amount of ammonia fed into the combustion chamber 2 increases, deterioration of the combustion of the air-fuel mixture accompanying the increase of ammonia can be suppressed.

Note that, in the above embodiment, the swirl control valve 62 is used as the means for causing turbulence in the air-fuel mixture fed into the combustion chamber 2. However, so far as the turbulence of the air flow in the combustion chamber can be controlled, a tumble control valve causing tumble in the air-fuel mixture fed into the combustion chamber 2 or other air flow control system may be used as well. Therefore, when expressing these together, in the present embodiment, when the amount of ammonia fed into the combustion chamber 2 increases, or when the ratio of the amount of the ammonia to the total amount of the ammonia and the highly combustible substance into the combustion chamber 2 increases, the air flow control system may be controlled so that the turbulence of the air flow occurring in the air-fuel mixture in the combustion chamber 2 becomes large.

Next, a seventh embodiment of the first aspect will be explained. In this regard, as explained above, a substance which is easier to burn than ammonia is used as the highly combustible substance. Therefore, when the amount of the highly combustible substance fed into the combustion chamber 2 is increased, the combustibility of the air-fuel mixture can be improved. Therefore, in the seventh embodiment, when the amount of ammonia fed into the combustion chamber 2 increases, the amount of the highly combustible substance fed into the combustion chamber 2 is increased accordingly. Due to this, degradation of combustibility of the air-fuel mixture due to the increase of the feed amount of ammonia can be suppressed.

Further, at the time of the combustion of the air-fuel mixture, the highly combustible substance is ignited earlier than ammonia, and the ammonia burns using this as an ignition source. For this reason, by increasing the feed amount of the highly combustible substance, the energy of the ignition source can be increased. Due to this, the combustion efficiency of the ammonia is improved, and the heat efficiency is improved by shortening of the combustion period.

Further, in the present embodiment, in a case where a compression ignition type internal combustion engine is used as the internal combustion engine, when the amount of ammonia fed into the combustion chamber 2 increases, the injection pressure of the highly combustible substance from the highly combustible substance injector 6b is raised. If the injection pressure of the highly combustible substance from the highly combustible substance injector 6b is raised in this way, the injection rate is raised and penetrating force is raised. When the injection rate of the highly combustible substance is raised, a large amount of the highly combustible substance is injected in a short time, therefore combustion of the highly combustible substance spreads into the combustion chamber 2 in a short time. Due to this, the instantaneous energy of the ignition source can be made larger, therefore combustion of the ammonia is promoted. Further, when the penetrating force is raised, the highly combustible substance is widely distributed in the combustion chamber 2, therefore the ignition source is dispersed in the combustion chamber 2, so the combustion of the ammonia is promoted accordingly.

Figure 20A:
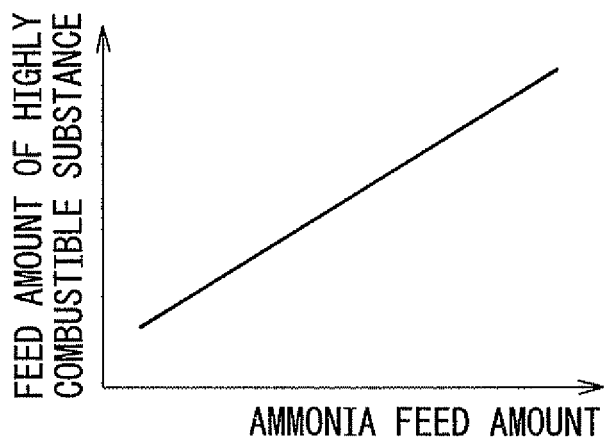
FIGS. 20A and 20B are views showing relationships of an amount of ammonia fed into a combustion chamber, and an amount of feed and injection pressure of a highly combustible substance.
Figure 20B:
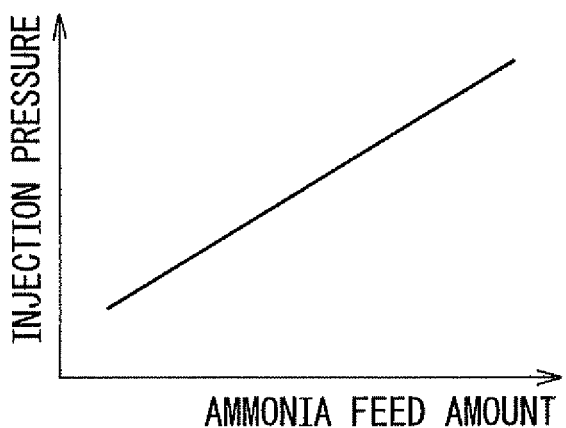

FIGS. 20A and 20B are views showing the relationship between the amount of ammonia fed into the combustion chamber 2, and the feed amount of the highly combustible substance and the injection pressure of the highly combustible substance. As shown in FIG. 20A, in the present embodiment, the larger the amount of ammonia fed into the combustion chamber 2, the more the amount of the highly combustible substance fed into the combustion chamber 2 is made to increase. Further, as shown in FIG. 20B, the larger the amount of ammonia fed into the combustion chamber 2, the more the injection pressure of the highly combustible substance from the highly combustible substance injector 6b is made to rise. By controlling the feed amount and injection pressure of the highly combustible substance in this way, deterioration of combustibility of the air-fuel mixture accompanying the increase of the ammonia can be suppressed.

Figure 21:
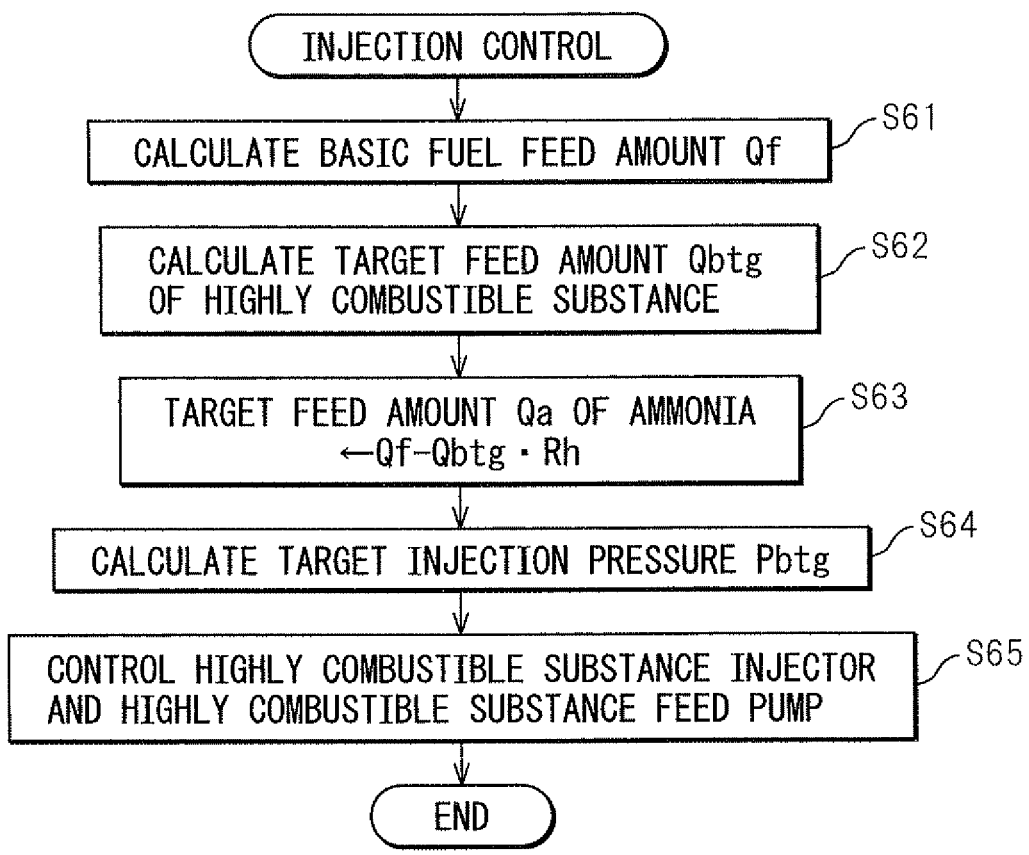
FIG. 21 is a flowchart showing a control routine of control of injection from a highly combustible substance injector in accordance with an amount of ammonia fed into a combustion chamber.

FIG. 21 is a flow chart showing a control routine of the control of the injection from the highly combustible substance injector 6b in accordance with the amount of ammonia fed into the combustion chamber 2. As shown in FIG. 21, first, at step S61, basic fuel feed amount Qf into the combustion chamber 2 is calculated based on the engine operating state (engine load, engine speed, etc.). This basic fuel feed amount Qf is the fuel feed amount in a case where only ammonia is fed into the combustion chamber 2 and is determined in accordance with the engine operating state. Next, at step S62, based on the basic fuel feed amount Qf, a target feed amount Qbtg of the highly combustible substance into the combustion chamber 2 is calculated by using a map as shown in FIG. 20A (one replacing the ammonia feed amount in the map of FIG. 20A by the basic fuel feed amount).

Next, at step S63, a value obtained by multiplying the target feed amount Qbtg of the highly combustible substance by a heat generation ratio Rh of ammonia and highly combustible substance is subtracted from the basic fuel feed amount Qf to calculate the target feed amount Qa of ammonia (Qa=Qf−Qbtg·Rh). Next, at step S64, based on the amount Qa of ammonia fed into the combustion chamber 2, by using the map as shown in FIG. 20B, a target injection pressure Pbtg of the highly combustible substance injector 6b is calculated. Next, at step S65, the highly combustible substance injector 6b is controlled so that the feed amount of the highly combustible substance becomes the target feed amount Qbtg, and a highly combustible substance feed pump 35 is controlled so that the pressure of injection from the highly combustible substance injector 6b becomes the target injection pressure Pbtg.

Next, an eighth embodiment of the first aspect will be explained. In this regard, by feeding the highly combustible substance, the ignition of the air-fuel mixture is suitably carried out. However, even when the air-fuel mixture is once ignited, due to the presence of ammonia having a low combustibility, the combustion sometimes does not suitably spread to the entire interior of the combustion chamber 2. Such a tendency is stronger the higher the degree of leanness of the air-fuel ratio of the air-fuel mixture. This is because, when the degree of leanness of the air-fuel ratio of the air-fuel mixture becomes high, the amount of excess air which does not contribute to the combustion becomes larger in the combustion chamber 2, and the temperature of the air-fuel mixture in the combustion chamber 2 becomes to hard to rise by this.

Therefore, in the present embodiment, in an ammonia burning internal combustion engine operated with a lean air-fuel ratio during normal operation mode, in an operation region where the air-fuel mixture is reliably ignited due to the feed, etc., of the highly combustible substance, irrespective of the feed amount of ammonia, when the amount of ammonia fed into the combustion chamber 2 increases, the amount of air fed into the combustion chamber 2 is controlled so that the air-fuel ratio of the air-fuel mixture fed into the combustion chamber 2 approaches the stoichiometric air-fuel ratio.

Figure 22:
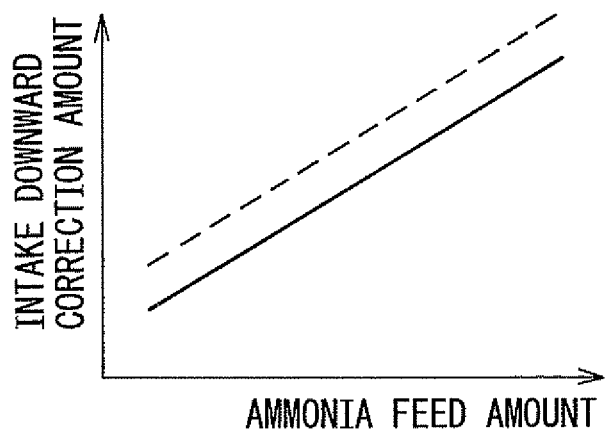
FIG. 22 is a view showing a relationship of an amount of ammonia fed into a combustion chamber and a downward correction amount of intake gas.

FIG. 22 is a view showing the relationship between the amount of ammonia fed into the combustion chamber 2 and the downward correction amount of the intake gas fed into the combustion chamber 2. As shown in FIG. 22, in the present embodiment, the larger the amount of ammonia fed into the combustion chamber 2, the more the downward correction amount of the intake gas is increased, therefore the more the amount of the intake gas fed into the combustion chamber 2 is decreased. As a result, the air-fuel ratio of the air-fuel mixture fed into the combustion chamber 2 is made to approach the stoichiometric air-fuel ratio. Due to this, the temperature of the air-fuel mixture becomes easier to rise after the ignition of the air-fuel mixture, therefore combustion becomes easier to spread to the entire combustion chamber.

Note that, in the present embodiment, the downward correction amount of the intake gas is made larger the higher the engine speed. Therefore, the downward correction amount of the intake gas is set as indicated by a solid line in FIG. 22 when the engine speed is low, while the downward correction amount of the intake gas is set as indicated by a broken line in FIG. 22 when the engine speed is high. In general, when the engine speed is high, it is necessary to burn the air-fuel mixture in a short time. However, by making the downward correction amount of the intake gas larger the higher the speed in this way, the combustion period can be made shorter when the engine speed is high.

In the same way, in the present embodiment, the downward correction amount of the intake gas is made larger the lower the engine load and the lower the temperature of the intake gas and the lower the engine cooling water temperature. In general, when the engine load is low, the combustion speed tends to drop. However, by making the downward correction amount of the intake gas larger the lower the engine load, the combustion speed can be made higher even when the engine load is low. Further, at the time when the temperature of the intake gas and the temperature of the engine cooling water are low, the combustion speed tends to drop. However, by making the downward correction amount of the intake gas larger the lower the engine load, the combustion speed can be made higher even when the temperature of the intake gas and the temperature of the engine cooling water are low.

Figure 23:
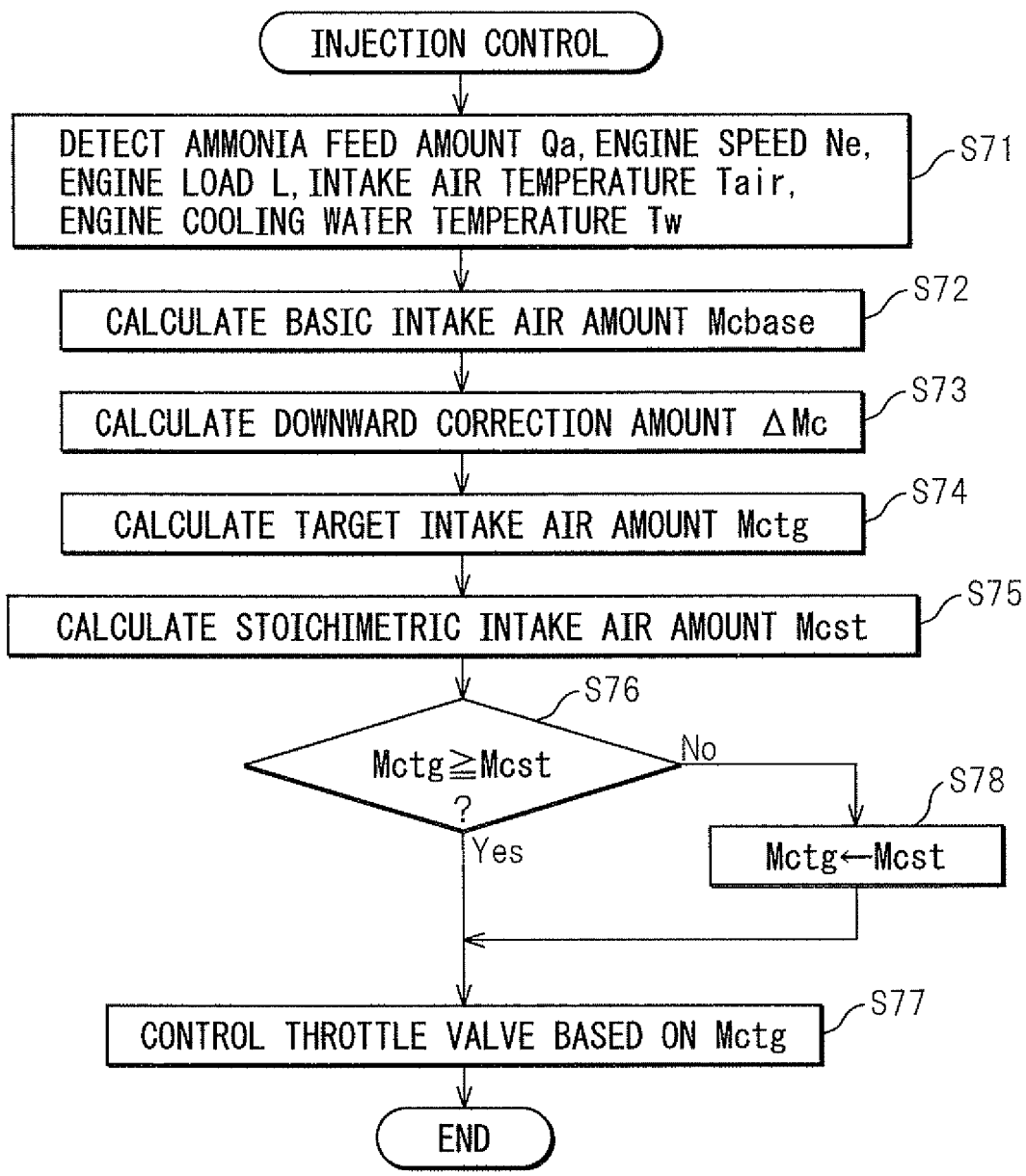
FIG. 23 is a flowchart showing a control routine of control of an air-fuel ratio in accordance with an amount of ammonia fed into a combustion chamber.

FIG. 23 is a flow chart showing a control routine of the air-fuel ratio control in accordance with the amount of ammonia fed into the combustion chamber 2. As shown in FIG. 23, first, at step S71, the ammonia feed amount Qa, engine speed Ne, engine load L, intake air temperature Tair, and engine cooling water temperature Tw are detected. Next, at step S72, based on the engine speed Ne and engine load L, etc., the basic intake air amount Mcbase not considering the ammonia feed amount Qa is calculated. Next, at step S73, based on, in addition to the ammonia feed amount Qa, the engine speed Ne, engine load L, intake air temperature Tair, and engine cooling water temperature Tw, a downward correction amount ΔMc is calculated by using the map as shown in FIG. 22. Next, at step S74, by subtracting the downward correction amount ΔMc from the basic suction air amount Mcbase, the target intake air amount Mctg is calculated (Mctg=Mcbase−ΔMc).

Next, at step S75, a intake air amount Mcst required for making the air-fuel ratio of the air-fuel mixture the stoichiometric air-fuel ratio is calculated based on the ammonia feed amount Qa and the feed amount of the highly combustible substance. Next, at step S76, it is determined whether the target intake air amount Mctg is Mcst or more. When it is determined that Mctg is Mcst or more, that is, when the air-fuel ratio of the air-fuel mixture becomes the stoichiometric air-fuel ratio or lean, the routine proceeds to step S77. On the other hand, when it is determined that Mctg is smaller than Mcst, that is, when the air-fuel ratio of the air-fuel mixture becomes rich, the routine proceeds to step S78. At step S78, the target suction air amount Mctg is made Mcst, and the routine proceeds to step S77. At step S77, the opening degree of throttle valve 10, etc., is controlled so that the intake air amount becomes the target intake air amount Mctg.

Next, an ammonia burning internal combustion engine of a second aspect of the present invention will be explained. The configuration of the ammonia burning internal combustion engine of the present aspect is basically the same as the configuration of the ammonia burning internal combustion engine of the first aspect. However, in the present aspect, unlike the first aspect, by suitably controlling the mode of injection of the ammonia and highly combustible substance, a drop of the combustibility of the highly combustible substance due to the presence of ammonia is suppressed, and thus the air-fuel mixture containing ammonia is made to suitably burn. Below, various examples of control of the mode of injection of the ammonia and the highly combustible substance will be explained.

Figure 24:
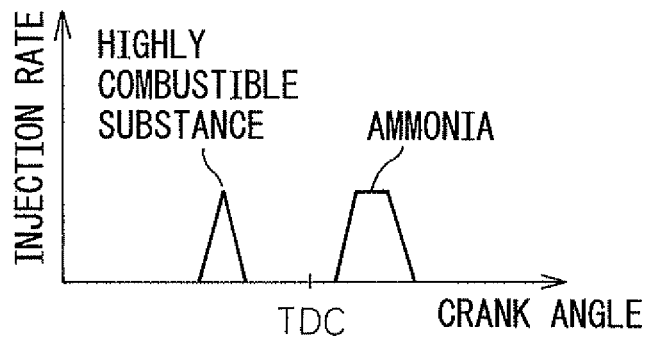
FIG. 24 is a view of an injection timing of ammonia and a highly combustible substance.

First, a first embodiment of the second aspect will be explained. In the first embodiment, the ammonia burning internal combustion engine is a compression ignition type, and the ammonia injector 6a and highly combustible substance injector 6b are both configured so as to directly inject the ammonia and the highly combustible substance into a combustion chamber 2. Further, in the first embodiment, as shown in FIG. 24, near the compression top dead center, first, the highly combustible substance is injected from the highly combustible substance injector 6b into the combustion chamber 2, and then, after the already injected highly combustible substance is self ignited, the ammonia is injected from the ammonia injector 6a into the combustion chamber 2.

By injecting the highly combustible substance into the combustion chamber 2 first in this way, the highly combustible substance is ignited first. At this time, the ammonia is not injected into the combustion chamber 2. The ammonia has a high latent heat of vaporization. Therefore, when ammonia is injected, the temperature of the air-fuel mixture in the combustion chamber 2 drops. However, where only the highly combustible substance is injected first, a drop of temperature of the air-fuel mixture along with vaporization of ammonia does not occur, therefore the highly combustible substance is easily self ignited. Further, when a large amount of ammonia exists as explained above, combustibility and ignitability of the highly combustible substance are degraded. However, if only the highly combustible substance is injected first, at the time of injection of the highly combustible substance, ammonia does not exist in the combustion chamber 2, therefore the highly combustible substance is easily self ignited. Due to this, self ignition of the highly combustible substance can be promoted.

After that, when ammonia is injected from the ammonia injector 6a, the highly combustible substance has been already self ignited in the combustion chamber 2, therefore ammonia is easily made to burn using this as the ignition source. In this way, in the ammonia burning internal combustion engine of the present embodiment, the highly combustible substance is reliably self ignited, and ammonia can be certainly made to burn.

Note that, in the present embodiment, the ammonia is injected after the self ignition of the highly combustible substance in the combustion chamber 2 is detected by for example a pressure sensor (not shown) which detects the pressure in the combustion chamber 2, or the like. Alternatively, an ignition delay (ignition lag) period of the highly combustible substance may be calculated in advance by experiments, etc., and the injection of the ammonia may be carried out after elapse of the delay period corresponding to this ignition delay period after when the highly combustible substance is injected.

Next, a second embodiment of the second aspect will be explained. In the second embodiment as well, the ammonia burning internal combustion engine is a compression ignition type, and the ammonia injector 6a and the highly combustible substance injector 6b are configured so as to directly inject the ammonia and the highly combustible substance into the combustion chamber 2.

In this regard, in general, in a compression ignition type internal combustion engine, considering the ignition delay period and the premixed combustion period, etc., the fuel injection is commenced at a timing earlier to a certain extent than the compression top dead center so that the output obtained by the combustion of the fuel becomes the maximum. However, when a fossil fuel or other highly combustible fuel is used, even when the fuel injection is commenced at a timing earlier to a certain extent before the temperature of the intake gas in the combustion chamber reaches a high temperature, the air-fuel mixture is self ignited. However, when ammonia with a low combustibility is used, if the fuel injection is commenced at a timing earlier to a certain extent than the compression top dead center, the temperature of the air-fuel mixture in the combustion chamber is sometimes lower than the self ignition temperature. In this case, the air-fuel mixture cannot be self ignited well.

Therefore, in the second embodiment, the timing when the temperature of the intake gas in the combustion chamber 2 reaches the self ignition temperature is estimated, and injection of the ammonia from the ammonia injector 6a is carried out at a timing later than the timing when the temperature of the intake gas in the combustion chamber 2 reaches the self ignition temperature. Due to this, it becomes possible to reliably self ignite the ammonia.

Figure 25:
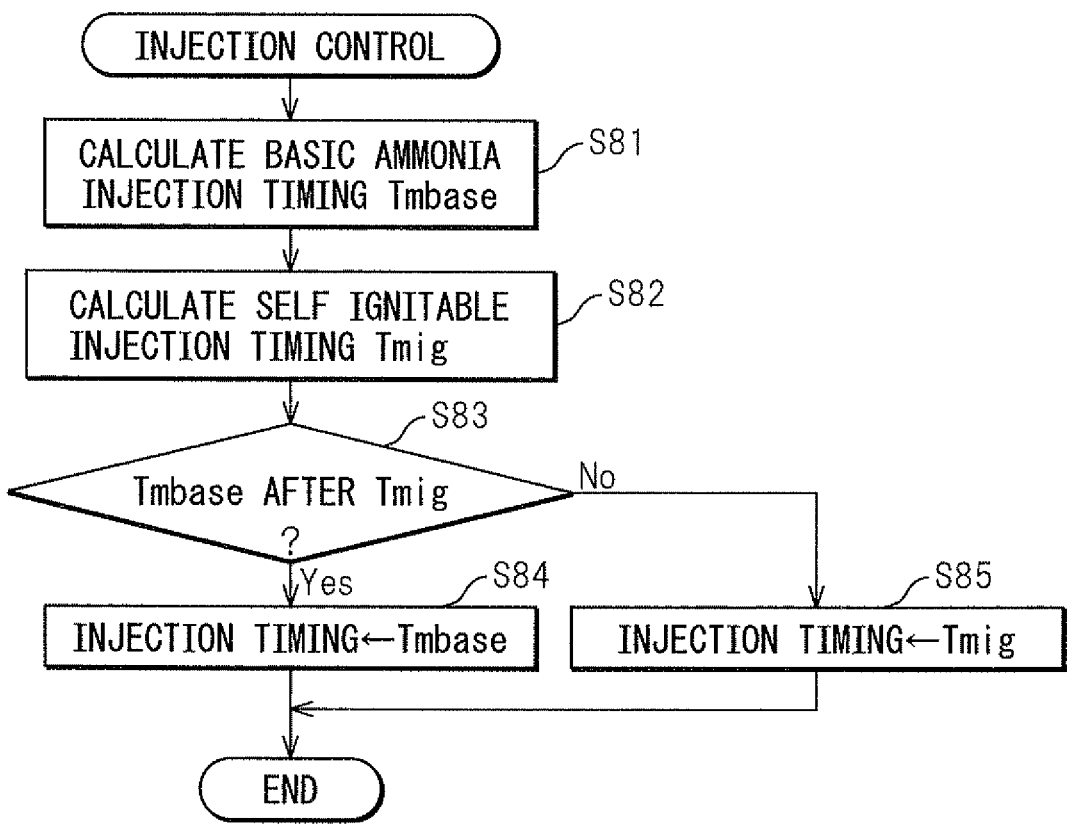
FIG. 25 is a flowchart showing a control routine of control of an injection timing of ammonia from an ammonia injector.

FIG. 25 is a flow chart showing a control routine of the control of the injection timing of the ammonia from the ammonia injector 6a. As shown in FIG. 25, first, at step S81, based on the engine load and engine speed, etc., a basic ammonia injection timing Tmbase is calculated. This basic ammonia injection timing is set without considering the self ignition temperature of the intake gas, but considering the ignition delay period and premixed combustion period, etc., so that the engine output, fuel consumption, and exhaust emission become the optimum. Next, at step S82, the timing (self ignitable injection timing) Tmig when the temperature of the intake gas in the combustion chamber 2 reaches the self ignition temperature is calculated. This self ignitable injection timing Tmig is calculated based on the detected or calculated amount, temperature, and composition of the intake gas fed into the combustion chamber 2, the wall temperature of the combustion chamber 2, the actual compression ratio, etc.

Next, at step S83, it is determined whether the basic ammonia injection timing Tmbase is the self ignitable injection timing Tmig or later. When the basic ammonia injection timing Tmbase is the self ignitable injection timing Tmig or later, the routine proceeds to step S84 where the injection timing of the ammonia from the ammonia injector 6a is made the basic ammonia injection timing Tmbase. On the other hand, when the basic ammonia injection timing Tmbase is earlier than the self ignitable injection timing Tmig, the routine proceeds to step S85 where the injection timing of the ammonia from the ammonia injector 6a is made the self ignitable injection timing Tmig.

Next, a third embodiment of the second aspect will be explained. In the third embodiment, the ammonia burning internal combustion engine is a spark ignition type, and the ammonia injector 6a is configured to directly inject the ammonia into the combustion chamber 2.

In this regard, when injecting the liquid ammonia into the combustion chamber 2, the injected ammonia robs it of the latent heat of vaporization and is vaporized. At this time, when the temperature of the intake gas in the combustion chamber 2 is higher than the wall surface temperature of the combustion chamber 2 (wall surface temperature of the cylinder), even when the temperature of the intake gas in the combustion chamber 2 drops due to the latent heat of vaporization of the ammonia, heat is not transferred from the wall surface of the combustion chamber 2 to the intake gas. As opposed to this, when the temperature of the intake gas in the combustion chamber 2 is lower than the wall surface temperature of the combustion chamber 2, if the temperature of the intake gas in the combustion chamber 2 drops due to the latent heat of vaporization of ammonia, heat transfer from the wall surface of the combustion chamber 2 to the intake gas is promoted. For this reason, the temperature drop of the intake gas in the combustion chamber 2 accompanying injection of ammonia can be suppressed.

Therefore, in the third embodiment, when performing homogeneous combustion, the ammonia injection timing from the ammonia injector 6a is set to a timing earlier than the timing when the temperature of the intake gas fed into the combustion chamber 2 becomes equal to the wall surface temperature of the combustion chamber 2 along with the upward movement of the piston 22, for example, during a intake stroke or the first half of a compression stroke. This injection timing may be set to a predetermined fixed timing or may be set so as to change in accordance with the engine operating state as well.

Next, a fourth embodiment of the second aspect will be explained. In the fourth embodiment as well, the ammonia burning internal combustion engine is a spark ignition type, and the ammonia injector 6a is configured so as to directly inject the ammonia into the combustion chamber 2.

Figure 26A:
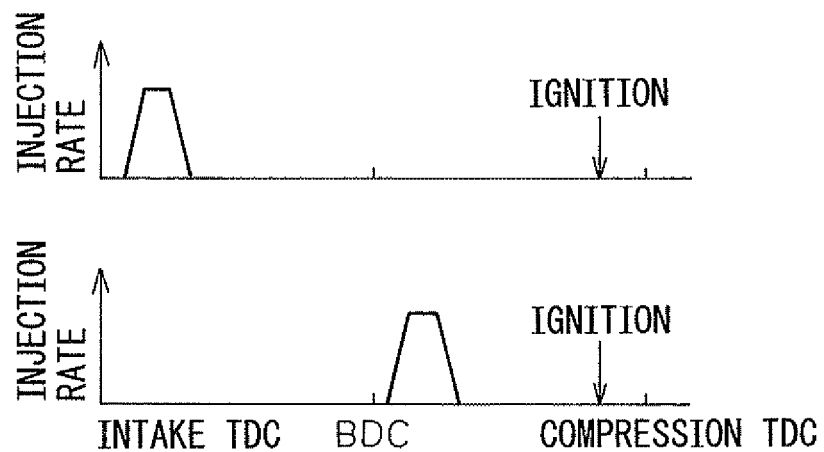
FIGS. 26A and 26B are views of an injection timing of ammonia and a highly combustible substance.

In this regard, in general, when homogeneous combustion is carried out in the spark ignition type internal combustion engine, it is necessary to mix air and fuel in advance. Therefore, as shown in FIG. 26A, the fuel injection from the fuel injector is carried out during the intake stroke or in the first half of the compression stroke. Here, when the fuel is directly injected into the combustion chamber 2, due to the fuel injected at a high pressure, turbulence of the air-fuel mixture occurs in the combustion chamber 2. However, when the fuel injection from the fuel injector is carried out during the intake stroke or in the first half of the compression stroke, turbulence of the air-fuel mixture occurring in the combustion chamber 2 settles down at the time when ignition of the air-fuel mixture is carried out by the ignition device 3. For this reason, when the fuel injection from the fuel injector is carried out during the suction stroke or in the first half of the compression stroke, the effect of improvement of the combustion speed along with the turbulence of the air-fuel mixture in the combustion chamber 2 cannot be obtained.

When a fossil fuel or other highly combustible fuel was used as the fuel, even when the effect of improvement of the combustion speed along with the turbulence of the air-fuel mixture in the combustion chamber 2 could not be obtained, a sufficient combustion speed could be obtained. However, when ammonia with a low combustibility is contained in the fuel, if the turbulence of the air-fuel mixture in the combustion chamber 2 settles down, a combustion speed high enough to obtain excellent combustion of the air-fuel mixture cannot be obtained in some cases.

Figure 26B:
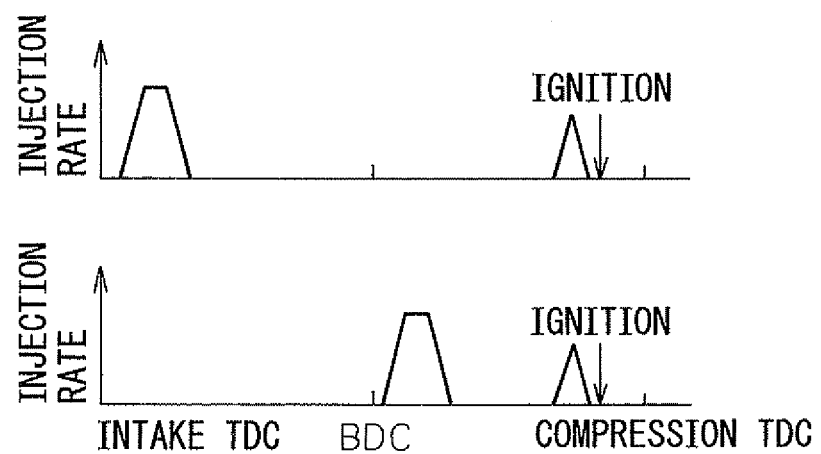

Therefore, in the ammonia burning internal combustion engine of the present fourth embodiment, when performing homogeneous combustion, as shown in FIG. 26B, the ammonia is injected from the ammonia injector 6a as the main injection during the intake stroke or in the first half of the compression stroke, and, immediately before the ignition timing, as the secondary injection, ammonia in a smaller amount than that at the main injection is injected from the ammonia injector 6a. Due to this, by the main injection performed during the intake stroke or in the first half of the compression stroke, homogeneity of the ammonia and intake gas can be kept, and by the secondary injection performed immediately before the ignition timing, large turbulence can be caused in the air-fuel mixture in the combustion chamber 2 even at the ignition timing, so a combustion speed sufficient for excellent combustion of the air-fuel mixture can be obtained.

Note that, in the fourth embodiment, as secondary injection, the injection of ammonia from the ammonia injector 6a is carried out. However, the highly combustible substance injector 6b may be arranged so as to directly inject the highly combustible substance into the combustion chamber 2, and the injection of the highly combustible substance from the highly combustible substance injector 6a may be carried out as the secondary injection as well. Further, in this case, the ammonia injector 6b may be arranged so as to inject the ammonia into the intake port 23, and the ammonia may be injected into the intake port 23 as the main injection as well. Therefore, when expressing these together, in the fourth embodiment, the fuel injector may be configured so as to perform, in addition to the main injection of injecting the fuel by this fuel injector or other fuel injector in or before the first half of the compression stroke, a secondary injection of injecting ammonia or highly combustible substance in a smaller amount than that in the main injection before the ignition by the ignition device in the latter half of the compression stroke.

Figure 27:
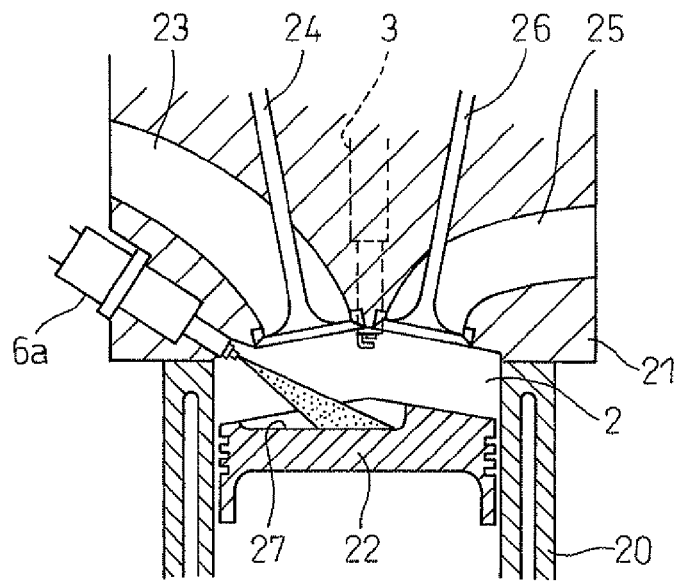
FIG. 27 is a view for explaining a mode of injection of ammonia from an ammonia injector.

Next, a fifth embodiment of the second aspect will be explained. In the fifth embodiment as well, the ammonia burning internal combustion engine is a spark ignition type, and the ammonia injector 6a is configured so as to directly inject the ammonia into the combustion chamber 2. In particular, in the ammonia burning internal combustion engine of the present embodiment, as shown in FIG. 27, the ammonia injector 6a is arranged so that the atomized ammonia injected from the ammonia injector 6a strikes the top surface of the piston 22 (interior of the cavity 27 in the illustrated example) when the piston 22 is relatively near the top dead center. In the thus configured ammonia burning internal combustion engine, when the ammonia injection timing from the ammonia injector 6a is set to the timing closer to the intake top dead center side than the critical timing, most of the atomized ammonia strikes the top surface of the piston 22. When the ammonia injection timing from the ammonia injector 6a is set to the timing closer to the intake bottom dead center side than the critical timing, most of the atomized ammonia no longer strikes the top surface of the piston 22.

In this regard, as explained above, ammonia has very high latent heat of vaporization. Therefore, when the ammonia is injected into the combustion chamber 2, a drop of the temperature of the air-fuel mixture in the combustion chamber 2 is caused. On the other hand, in general, the piston 22 receives heat by the previous combustion of the air-fuel mixture in the combustion chamber 2. Therefore, even during the intake stroke or during the compression stroke, the temperature has become relatively high compared with the intake gas flowing into the combustion chamber 2. Here, when the atomized ammonia injected from the ammonia injector 6a is made to strike the top surface of the piston 22, the ammonia striking the top surface of the piston 22 receives heat mainly from the piston 22 and is vaporized. Therefore, in the fifth embodiment, basically, the injection timing of ammonia from the ammonia injector 6a is made the timing closer to the intake top dead center side than the critical timing, to make the atomized ammonia strike the top surface of the piston 22 at that time. Due to this, a drop of the temperature of the air-fuel mixture along with the vaporization of ammonia can be suppressed, therefore it becomes possible to make the air-fuel mixture containing ammonia suitably burn.

However, if the atomized ammonia is made to strike the top surface of the piston 22 at the time when the temperature of the piston 22 is low, for example the time of cold start of the engine, sometimes, the ammonia striking the piston 22 is not vaporized, but is deposited on the piston 22 as is, so does not burn. Therefore, in the present fifth embodiment, the temperature of the piston 22 is detected or estimated. When the detected or estimated temperature of the piston 22 is lower than the predetermined minimum reference temperature, the injection timing of the ammonia from the ammonia injector 6a is set to a timing closer to the intake bottom dead center than the critical timing so that most of the atomized ammonia is prevented from striking the top surface of the piston 22, while when the detected or estimated temperature of the piston 22 is the predetermined minimum reference temperature or more, the injection timing of ammonia from the ammonia injector 6a is set to a timing closer to the intake top dead center than the critical timing so as to make the atomized ammonia strike the top surface of the piston 22.

Figure 28:
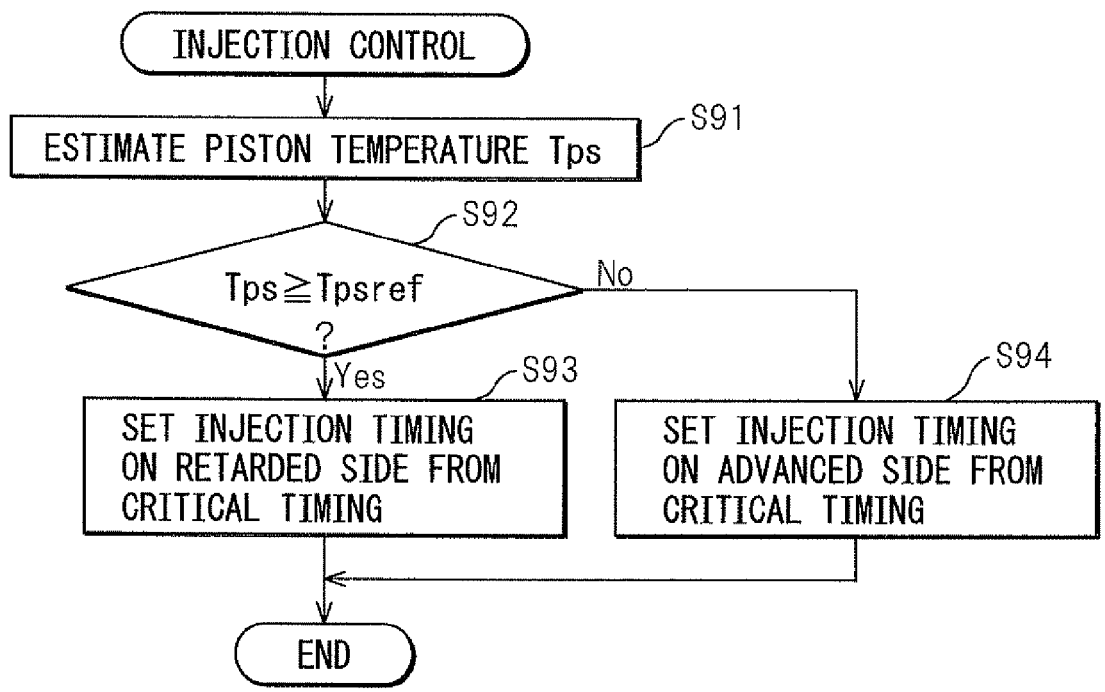
FIG. 28 is a flowchart showing a control routine of control of an ammonia injection timing from an ammonia injector.

FIG. 28 is a flow chart showing a control routine of control of the injection timing of ammonia from the ammonia injector 6a. As shown in FIG. 28, first, at step S91, based on the engine cooling water temperature and added value of injection amounts of the ammonia and the highly combustible substance in a plurality of cycles, etc., a temperature Tps of the piston 22 is estimated. Next, at step S92, it is determined whether the temperature Tps of the piston 22 is the minimum reference temperature Tpsref or more. When it is determined that the temperature Tps is the minimum reference temperature or more, the routine proceeds to step S93 where the injection timing of ammonia is set at a timing more retarded than the critical timing so that most of the atomized ammonia strikes the top surface of the piston 22. On the other hand, when it is determined at step S92 that the temperature Tps of the piston 22 is lower than the minimum reference temperature Tpsref, the routine proceeds to step S94 where the injection timing of ammonia is set at a timing more advanced than the critical timing so that most of the atomized ammonia does not strike the top surface of the piston 22.

Note that, in the fifth embodiment, the minimum reference temperature is made the predetermined constant temperature, but it may also be set to changes according to for example the ammonia injection amount, etc. In this case, the larger the ammonia injection amount, the higher the minimum reference temperature is made. Further, in this embodiment, the atomized ammonia is made to strike the top surface of the piston 22, but the atomized highly combustible substance may be made to strike the top surface of the piston 22 as well. Usually, the highly combustible substance is injected in a liquid state and takes the latent heat of vaporization from the ambient atmosphere at the time of vaporization. Therefore, by making the highly combustible substance strike the top surface of the piston 22, the drop of the temperature of the air-fuel mixture in the combustion chamber 2 can be suppressed as well.

Next, a modification of the fifth embodiment of the second aspect will be explained. In the fifth embodiment, conditional on the temperature of the piston 22 being the minimum reference temperature or more, the atomized ammonia is made to strike the top surface of the piston 22. However, in the present modification, under a condition different from this, particularly under a condition requiring heat transfer from the piston 22 to the ammonia, the atomized ammonia is made to strike the top surface of the piston 22.

Specifically, in the present modification, in a case where the engine load is low, a case where the outside air temperature is low, or other case where the temperature of the intake gas in the combustion chamber 2 is hard to raise, the atomized ammonia is made to strike the top surface of the piston 22.

Further, when using an external EGR mechanism, the atomized ammonia is made to strike the top surface of the piston 22. That is, a delay occurs during a period from when the EGR control valve 37 is driven to when the EGR rate in the intake gas fed into the combustion chamber 2 actually changes. For this reason, when the EGR gas fed into the combustion chamber 2 is decreased, in spite of the opening degree of the EGR control valve 37 being made small, the amount of the EGR gas fed into the combustion chamber 2 is sometimes not decreased. In this case, the amount of the EGR gas actually fed into the combustion chamber 2 becomes larger than the target EGR gas amount, therefore degradation of combustibility of the air-fuel mixture is caused. Therefore, in the present modification, at the time of a transition state for decreasing the EGR gas, the atomized ammonia is made to strike the top surface of the piston 22.

Furthermore, in the present modification, in a case where the engine load is high and the engine speed is high as well, the atomized ammonia is made to strike the top surface of the piston 22. That is, in general, in the engine high load and high speed region, in order to prevent excess elevation of temperature of the piston 22, lubricating oil is injected toward the piston 22 for cooling the piston 22. However, in the present modification, the atomized ammonia is made to strike the top surface of the piston 22 in the engine high load and high speed region, therefore the ammonia robs the vaporization heat of the piston 22, so a temperature rise of the piston 22 can be suppressed. For this reason, an oil jet system injecting lubricating oil toward the piston 22 for cooling the piston 22 becomes unnecessary.

Figure 29:
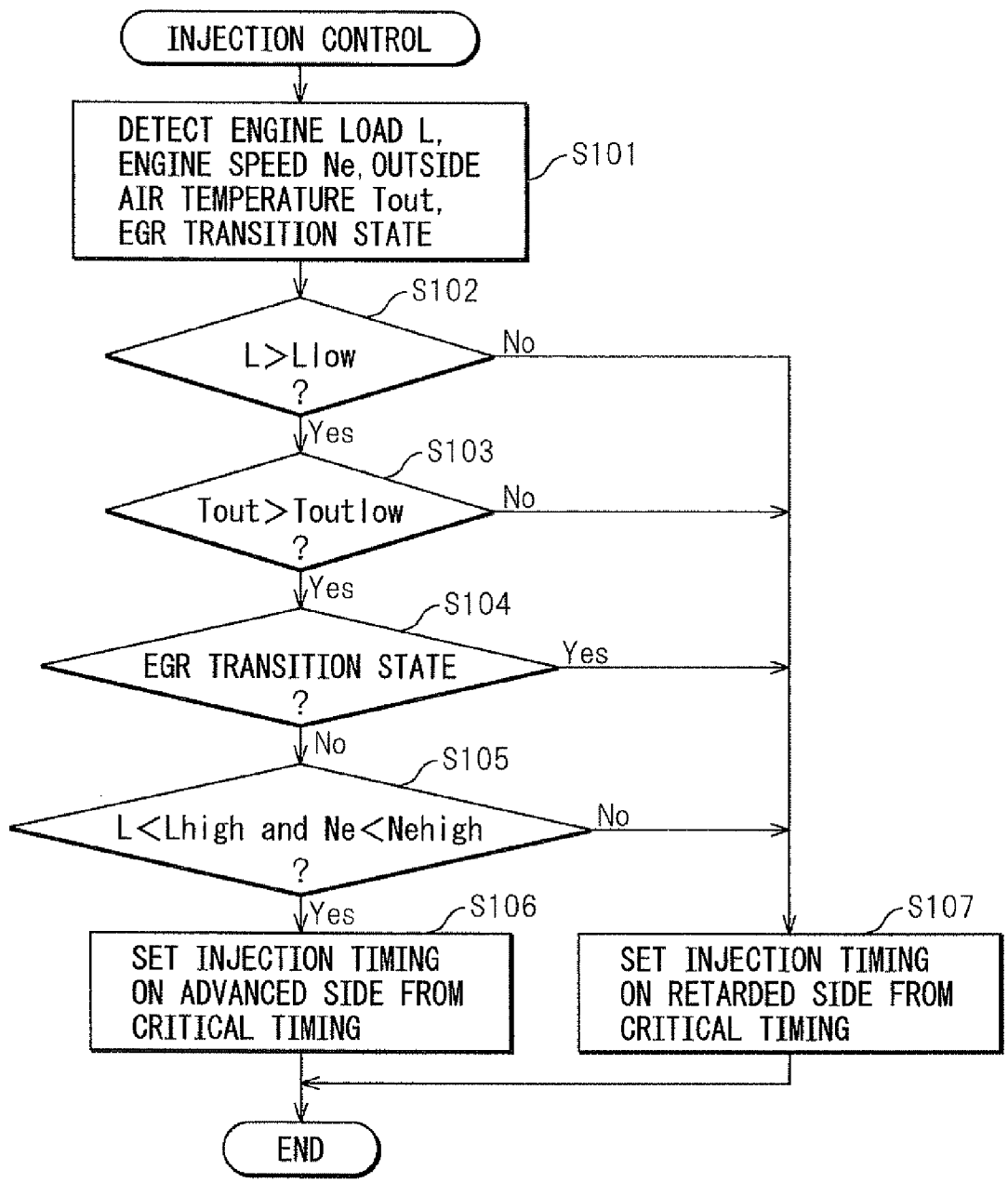
FIG. 29 is a flowchart showing a control routine of control of an ammonia injection timing from an ammonia injector.

FIG. 29 is a flow chart showing a control routine of the control of the injection timing of ammonia from the ammonia injector 6. As shown in FIG. 29, first, at step S101, the engine load L, engine speed Ne, and outside air temperature Tout are detected, and it is detected whether the state is in transition for decreasing the EGR gas.

Next, at steps S102 to 105, it is determined whether the engine load L is larger than a predetermined minimum reference load Llow, whether the outside air temperature Tout is higher than a minimum reference outside air temperature Toutlow, whether the engine operating state is in a transition state of decreasing the EGR gas, and whether the engine load L is smaller than a maximum reference load Lhigh and the engine speed Ne is smaller than a maximum reference rotation speed Nehigh. In these steps S102 to S105, when it is determined that the engine load is larger than the predetermined minimum reference load Llaw, the outside air temperature Tout is higher than the minimum reference outside air temperature Toutlow, the engine operating state is not in the transition state of decreasing the EGR gas, and the engine load L is the maximum reference load Lhigh or more or the engine speed Ne is the maximum reference rotation speed Nehigh or more, the routine proceeds to step S106 where the injection timing from the ammonia injector 6a is set on the advanced side from the critical timing, therefore the atomized ammonia is not made to strike the top surface of the piston 22. On the other hand, in cases other than this, the routine proceeds to step S107 where the injection timing from the ammonia injector 6a is set on the retarded side from the critical timing, and the atomized ammonia is made to strike the top surface of the piston 22.

Note that, by combining the fifth embodiment with the above modification, conditional on the temperature of the piston 22 being not less than the minimum reference temperature in addition to the conditions in the above modification, the atomized ammonia may be made to strike the top surface of the piston 22 as well.

Next, a sixth embodiment of the second aspect will be explained. In the ammonia burning internal combustion engine of the present sixth embodiment, the ammonia injected from the same ammonia injector 6a can be switched between liquid and gas. That is, when the pressure of the ammonia is pressurized by the ammonia feed pump 31 up to the ammonia vapor pressure or more, liquid ammonia is fed to the ammonia injector 6a, therefore the liquid ammonia is injected from the ammonia injector 6a. On the other hand, when the pressure of ammonia is pressurized by the ammonia feed pump 31 to only a pressure lower than the ammonia vapor pressure, gaseous ammonia is fed to the ammonia injector 6a, therefore the gaseous ammonia is fed from the ammonia injector 6a.

In this regard, at the time of startup or a cold state of the internal combustion engine, the temperature of the intake gas fed to the combustion chamber 2 is low. Therefore, if the liquid ammonia is fed into the combustion chamber 2 and the heat of the intake gas is robbed by the latent heat of vaporization of ammonia, the compression end temperature sometimes does not sufficiently rise. Further, there is a case where the liquid ammonia deposited on the wall surface of the combustion chamber 2 will not be vaporized, therefore will not burn. For this reason, when the liquid ammonia is fed into the combustion chamber 2 at the time of startup or a cold state of the internal combustion engine, combustion of the air-fuel mixture is sometimes degraded. For this reason, at the time of a cold state of the internal combustion engine, preferably gaseous ammonia is fed into the combustion chamber 2.

On the other hand, after finishing warmup of the internal combustion engine, the temperature of the intake gas fed into the combustion chamber 2 is high as well. Therefore, even when the liquid ammonia is fed into the combustion chamber 2, the compression end temperature sufficiently rises. Further, the wall surface temperature of the combustion chamber 2 is sufficiently high as well, therefore the liquid ammonia deposited on the wall surface of the combustion chamber 2 is easily vaporized as well. Therefore, even when the ammonia is deposited on the wall surface of the combustion chamber 2, the combustion of the air-fuel mixture is not degraded much at all. Rather feeding ammonia in the liquid state after finishing warmup of the internal combustion engine enables the feed of a large amount of ammonia into the combustion chamber 2, therefore it becomes possible to raise the output of the internal combustion engine.

Therefore, in the present sixth embodiment, at the time of startup or a cold state of the internal combustion engine, the pressure of the ammonia fed to the ammonia injector 6 is raised to only a pressure lower than the ammonia vapor pressure and thereby the gaseous ammonia is fed into the combustion chamber 2. After finishing warmup of the internal combustion engine, the pressure of the ammonia fed to the ammonia injector 6 is raised to the ammonia vapor pressure or more and thereby liquid ammonia is fed into the combustion chamber 2. Due to this, a suitable state of ammonia can be fed into the combustion chamber 2 in accordance with the warmup state of the internal combustion engine, and high output can be obtained while burning the air-fuel mixture well. In particular, in the present sixth embodiment, the injection of ammonia is switched between the liquid state and gas state by just changing the output of the ammonia feed pump 31, therefore the injection state can be switched at a low cost.

Figure 30:
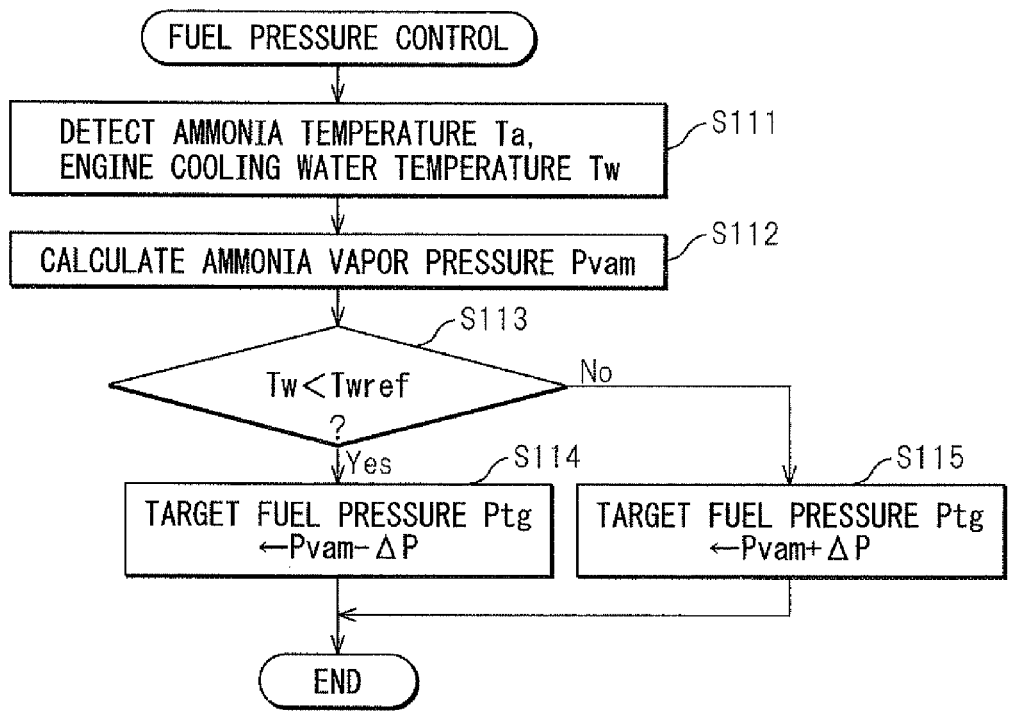
FIG. 30 is a flowchart showing a control routine of control of a fuel pressure of ammonia fed to an ammonia injector.

FIG. 30 is a flow chart showing a control routine of fuel pressure control of the ammonia fed to the ammonia injector 6a. As shown in FIG. 30, first, at step S111, the temperature Ta of the ammonia fed to the ammonia injector 6a is detected by a temperature sensor (not shown) attached to for example the ammonia feed pipe 29, and an engine cooling water temperature Tw is detected. Next, at step S112, an ammonia vapor pressure Pvam is calculated by using a map showing the relationship between the temperature of the ammonia and the ammonia vapor pressure Pvam and based on the temperature Ta of the ammonia detected at step S111.

Next, at step S113, it is determined whether the engine cooling water temperature Tw is lower than the predetermined reference temperature Twref, that is, whether the internal combustion engine is in the cold state. When it is determined that the engine cooling water temperature Tw is lower than the predetermined reference temperature Twref, that is, when it is determined that the internal combustion engine is in the cold state, the routine proceeds to step S114. At step S114, a target fuel pressure Ptg of the ammonia pressurized by the ammonia feed pump 31 is set at a value lower than the ammonia vapor pressure Pvam, in particular, in the present sixth embodiment, a value obtained by subtracting the predetermined value ΔP from the ammonia vapor pressure Pvam. Due to this, the gaseous ammonia is fed from the ammonia injector 6a.

On the other hand, when it is determined at step S113 that the engine cooling water temperature Tw is the predetermined reference temperature Twref or more, that is, when it is determined that the internal combustion engine is in a warmed up state, the routine proceeds to step S115. At step S115, the target fuel pressure Ptg of the ammonia pressurized by the ammonia feed pump 31 is set at a value higher than the ammonia vapor pressure Pvam, in particular, in the present sixth embodiment, a value obtained by adding the predetermined value ΔP to the ammonia vapor pressure Pvam. Due to this, liquid ammonia is fed from the ammonia injector 6a.

Figure 31:
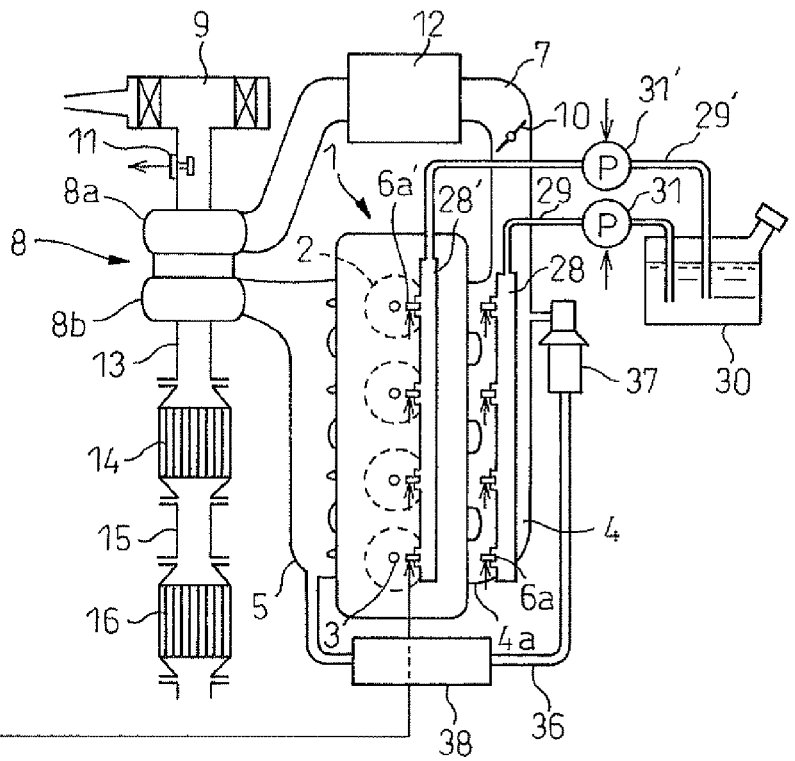
FIG. 31 is an overview of an internal combustion engine in a second embodiment of a second aspect.
Figure 31:
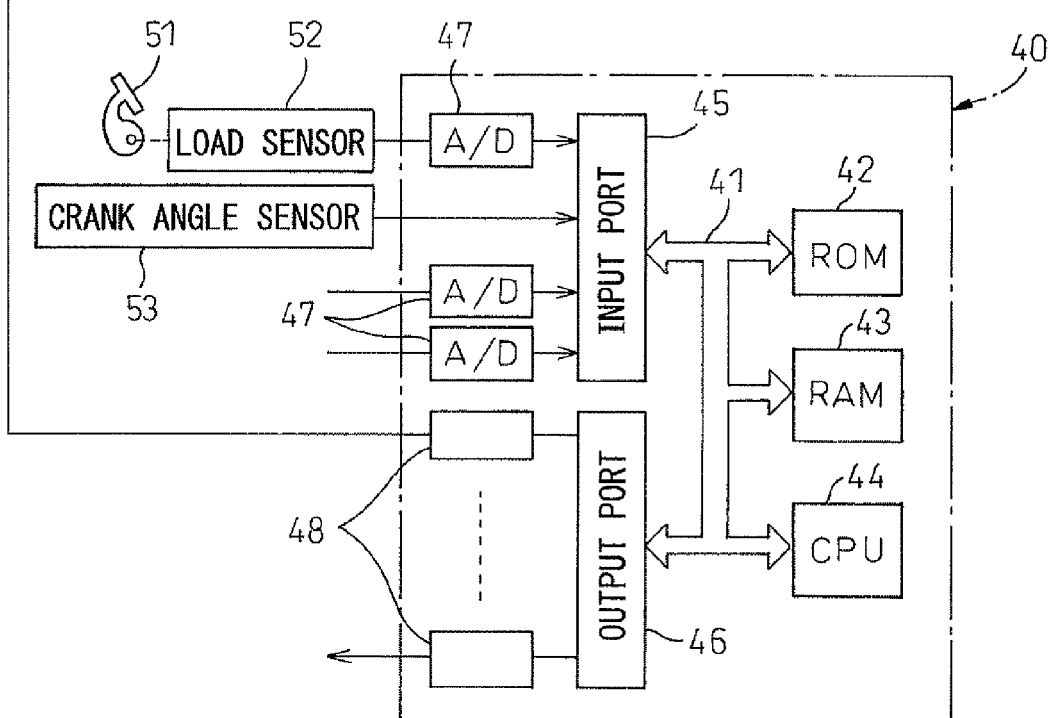

Next, a seventh embodiment of the second aspect will be explained. In the ammonia burning internal combustion engine of the present seventh embodiment, as shown in FIG. 31, each cylinder has two ammonia injectors. One ammonia injector 6a injects gaseous ammonia toward the interior of the intake port 23, and the other ammonia injector 6a' injects liquid ammonia toward the interior of the combustion chamber 2. These gaseous ammonia injector 6a and liquid ammonia injector 6a' are both connected to the same ammonia tank 30. Ammonia is fed to the gaseous ammonia injector 6a and liquid ammonia injector 6a' through different ammonia reservoirs 28 and 28', ammonia feed pipes 29 and 29', and ammonia feed pumps 31 and 31'.

Here, in the ammonia burning internal combustion engine of the sixth embodiment, only one of the liquid ammonia or gaseous ammonia could be selectively fed into the combustion chamber 2. However, in the thus configured ammonia burning internal combustion engine of the seventh embodiment, both of the liquid ammonia and gaseous ammonia can be simultaneously fed into the combustion chamber 2. The ratio of the liquid ammonia and gaseous ammonia fed into the combustion chamber 2 can be changed by regulating the ammonia injection amounts from the gaseous ammonia injector 6a and liquid ammonia injector 6a'.

Figure 32A:
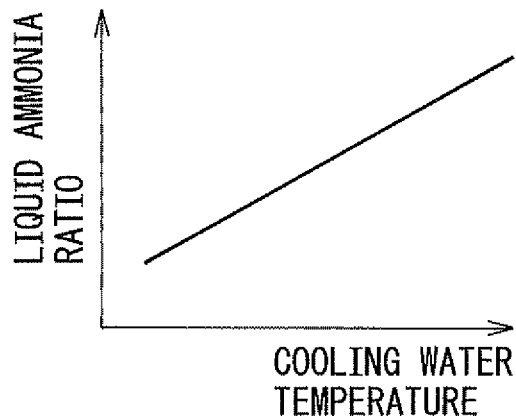
FIGS. 32A to 32C are views showing relationships between a cooling water temperature, engine load and engine speed, and liquid ammonia ratio.

Therefore, in the ammonia burning internal combustion engine of the seventh embodiment, the ratio of feed of the gaseous ammonia is made higher at the time of the cold state of the internal combustion engine, and the ratio of feed of the liquid ammonia is made higher after finishing warmup of the internal combustion engine. More specifically, as shown in FIG. 32A, the higher the temperature of the engine cooling water, the more the ratio of feed of the liquid ammonia is increased.

Figure 32B:
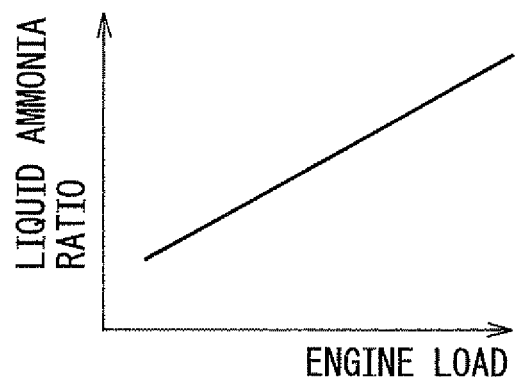

Furthermore, in the ammonia burning internal combustion engine of the seventh embodiment, the ratio of feed of the liquid ammonia and gaseous ammonia is changed in accordance with the engine load, engine speed and the pressure of the ammonia fed to the gaseous ammonia injector 6a. Specifically, as shown in FIG. 32B, the higher the engine load, the more the ratio of feed of the liquid ammonia is increased. This is because, at the time of engine low load operation, by raising the ratio of the gaseous ammonia injected to the intake port 23, the pressure of the air-fuel mixture in the intake port 23 can be raised. Due to this, a pumping loss can be decreased, and the air-fuel mixture can be kept at the high temperature as is without robbing the latent heat of vaporization along with the vaporization of ammonia, therefore degradation of combustibility of the air-fuel mixture can be suppressed. On the other hand, at the time of engine high load operation, by raising the ratio of the liquid ammonia injected into the combustion chamber 2, the amount of air fed into the combustion chamber 2 can be increased, and the temperature of the air-fuel mixture, which easily becomes a high temperature since the engine load is high, can be made to drop by the latent heat of vaporization of ammonia.

Figure 32C:
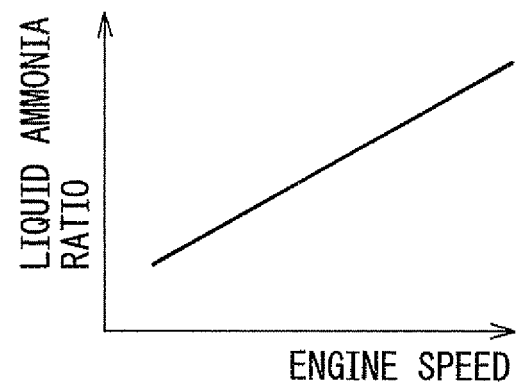

Further, in the present seventh embodiment, as shown in FIG. 32C, the higher the engine speed, the more the ratio of feed of the liquid ammonia is increased. In general, the temperature in the combustion chamber 2 becomes lower in the case where the engine speed is lower compared with the case where the engine speed is higher. In this connection, by raising the ratio of feed of the gaseous ammonia when the engine speed is low, a drop of the temperature in the combustion chamber 2 due to the latent heat of vaporization along with the vaporization of ammonia can be suppressed. Further, when the engine speed is high, the ammonia injectable time becomes shorter. In this connection, in the seventh embodiment, by feeding liquid ammonia, which can be injected in a large amount in a short time, in the case where the engine speed is high, even when the ammonia injectable time becomes short, it becomes possible to feed a sufficient amount of ammonia.

Furthermore, in the present seventh embodiment, when the pressure of the ammonia fed to the gaseous ammonia injector 6a is low, the ammonia is injected from only the liquid ammonia injector 6a'. This is because, when the pressure of the ammonia fed to the gaseous ammonia injector 6a is low, the ammonia is sometimes not vaporized at the point of time when it is fed to the gaseous ammonia injector 6a.

Figure 33:
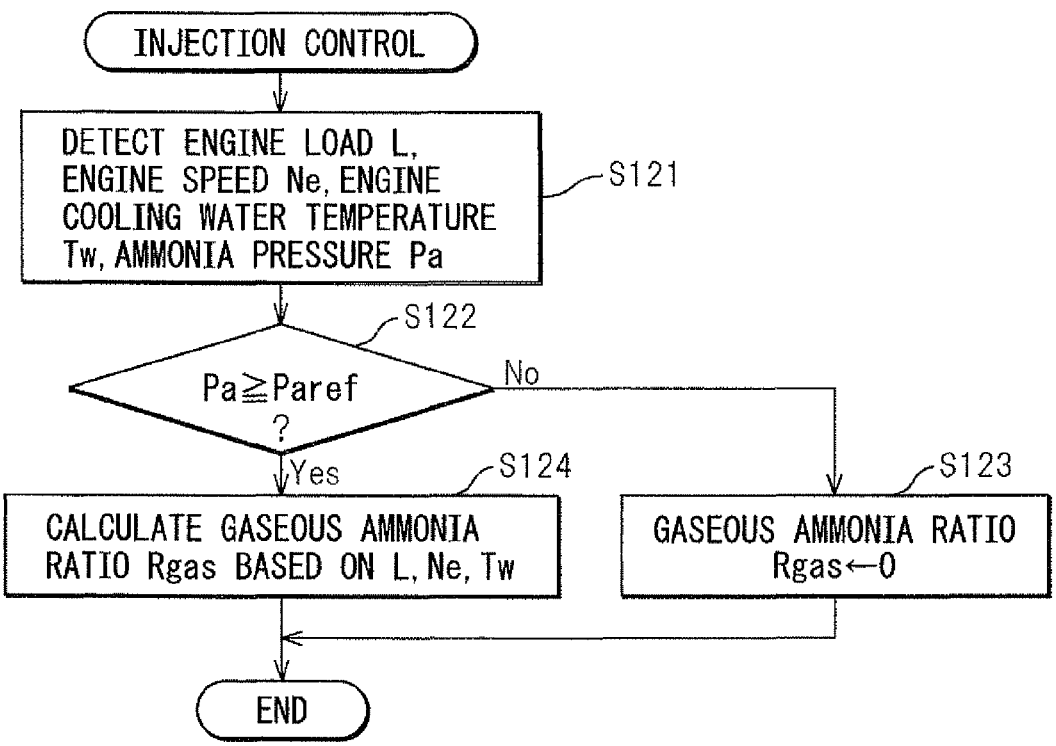
FIG. 33 is a flowchart showing a control routine of control of injection of liquid and gaseous ammonia from an ammonia injector.

FIG. 33 is a flow chart showing a control routine of the injection control of the liquid and gaseous ammonia from the ammonia injectors 6a and 6a'. As shown in FIG. 33, first, at step S121, the engine load L, engine speed Ne, temperature Tw of the engine cooling water, and pressure Pa of the ammonia fed to the gaseous ammonia injector 6a are detected. Next, at step S122, it is determined whether the pressure Pa of ammonia fed to the gaseous ammonia injector 6a is the reference ammonia pressure Paref or more, that is, whether the injection pressure of the gaseous ammonia is sufficient. When it is determined that the pressure Pa of the ammonia is lower than the reference ammonia pressure Paref, the routine proceeds to step S123. At step S123, the feed ratio Rgas of the gaseous ammonia is made 0.

On the other hand, when it is determined, at step S122, that the pressure Pa of the ammonia is the reference ammonia pressure Paref or more, the routine proceeds to step S124. At step S124, based on the engine load L, engine speed Ne, and the temperature Tw of the engine cooling water, the feed ratio Rgas of the gaseous ammonia is calculated by using maps as shown in FIGS. 32A to 32C.

Note that, summarizing the above-mentioned sixth embodiment and seventh embodiment, it can be said that the ammonia feed system feeding ammonia in the gas state and liquid state into the combustion chamber or into the intake port changes the ratio of the liquid ammonia and the gaseous ammonia fed from the ammonia feed system in accordance with the engine operating state.

Next, an eighth embodiment of the second aspect will be explained. In the ammonia burning internal combustion engine of the eighth embodiment, a heating system (not shown) heating ammonia is provided in the ammonia injector 6a. The ammonia injected from the ammonia injector 6a can be heated by this heating system before injection.

In this regard, as explained above, at the time of a cold state of the internal combustion engine, the temperature of the intake gas fed to the combustion chamber 2 is low. Therefore, when the liquid ammonia is fed into the combustion chamber 2, the compression end temperature sometimes does not sufficiently rise due to the latent heat of vaporization of ammonia. In particular, when the temperature of the liquid ammonia fed into the combustion chamber 2 is low, the heat of the intake gas is robbed for raising the temperature of the liquid ammonia up to the boiling point, therefore the compression end temperature ends up becoming a lower temperature.

Therefore, in the ammonia burning internal combustion engine of the eighth embodiment, in order to raise the temperature of the liquid ammonia fed into the combustion chamber 2 at the time of a cold state of the internal combustion engine, the ammonia fed from the ammonia injector 6a is heated by the heating system. Due to this, relatively high temperature ammonia is injected from the ammonia injector 6a. Therefore, even when the heat of the intake gas is robbed by the latent heat of vaporization of ammonia, the compression end temperature can be made a temperature which is high to a certain extent, and therefore degradation of combustibility of the air-fuel mixture can be suppressed.

Note that, in the eighth embodiment, ammonia is heated by the heating system only at the time of a cold state of the internal combustion engine, but the ammonia may also be heated even in a case where the temperature of the ammonia fed to the ammonia injector 6a is low. Further, in the eighth embodiment, the case where liquid ammonia is fed into the combustion chamber 2 is shown, but the ammonia may be heated by the heating system at the time of a cold state of the internal combustion engine in the same way even in the case where gaseous ammonia is fed. Even in a case where gaseous ammonia is fed, the compression end temperature easily drops at the time of cold state. Therefore, by feeding the high temperature gaseous ammonia, the compression end temperature can be made high, therefore degradation of combustibility of the air-fuel mixture can be suppressed.

Figure 34:
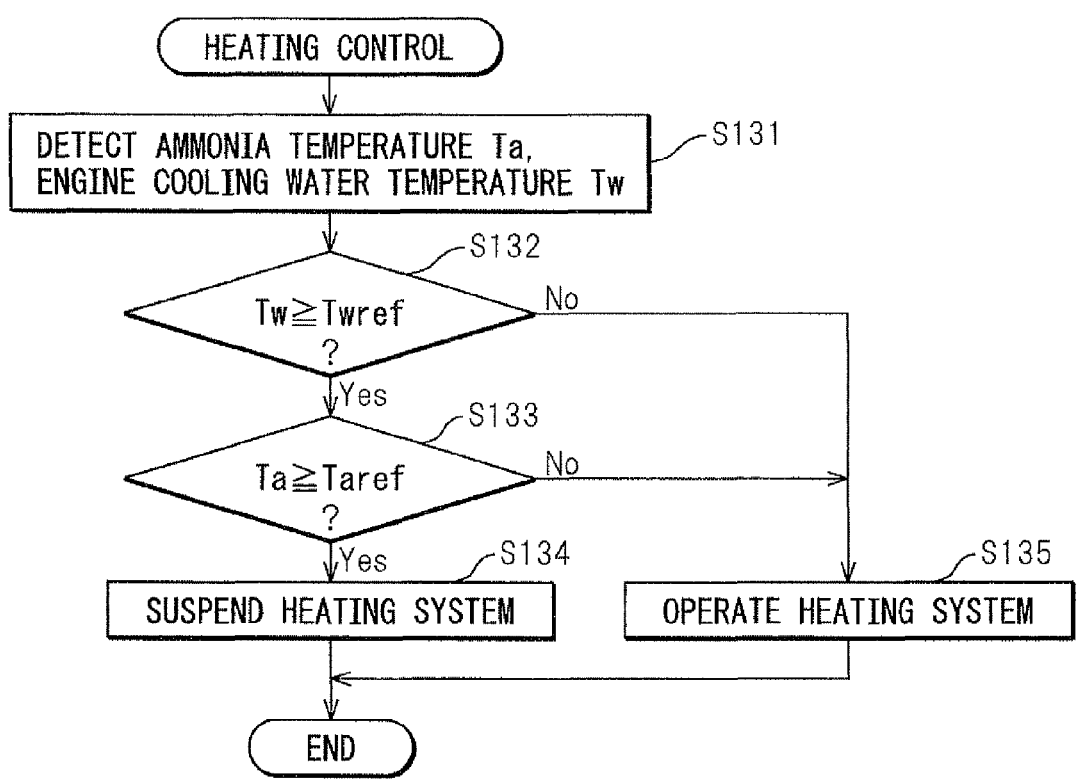
FIG. 34 is a flowchart showing a control routine of control of heating of ammonia by a heating system.

FIG. 34 is a flow chart showing a control routine of control of heating of ammonia by the heating system. As shown in FIG. 34, first, at step S131, the temperature Ta of the ammonia is detected by for example a temperature sensor (not shown) detecting the temperature of the ammonia in the ammonia reservoir 28, while a temperature Tw of the engine cooling water is detected by a temperature sensor (not shown) detecting the temperature of the engine cooling water. Next, at step S132, it is determined whether the temperature Tw of the engine cooling water is the reference cooling water temperature Twref or more, that is, whether the internal combustion engine is in a cold state. When it is determined that the temperature Tw of the engine cooling water is lower than the reference cooling water temperature, the routine proceeds to step S133 where the ammonia is heated by the heating system.

On the other hand, when it is determined at step S132 that the temperature Tw of the engine cooling water is the reference cooling water temperature Twref or more, the routine proceeds to step S133. At step S133, it is determined whether the temperature Ta of the ammonia fed to the ammonia injector 6a is the reference ammonia temperature Taref or more, that is, whether the temperature of the liquid ammonia is near the boiling point. When it is determined that the temperature Ta of the ammonia fed to the ammonia injector 6a is lower than the reference ammonia temperature Taref, the routine proceeds to step S135 where the ammonia is heated by the heating system. On the other hand, when it is determined at step S133 that the temperature Ta of the ammonia fed to the ammonia injector 6a is the reference ammonia temperature Taref or more, the routine proceeds to step S134 where heating of the ammonia by the heating system is suspended.

Next, an ammonia burning internal combustion engine of a third aspect of the present invention will be explained. The configuration of the ammonia burning internal combustion engine of the present aspect is basically the same as the configurations of the ammonia burning internal combustion engines of the first aspect and second aspect. However, in the present aspect, unlike the first aspect and second aspect, the amount of feed of the ammonia is restricted when a drop of the combustibility of the highly combustible substance occurs due to the presence of ammonia.

In this regard, the total fuel feed amount into the combustion chamber 2 changes in accordance with the engine load. The total fuel feed amount is small when the engine load is low, while the total fuel feed amount becomes larger the higher the engine load. Here, when the total fuel feed amount into the combustion chamber 2 is small, the amount of heat obtained by the combustion of the fuel is small. For this reason, if the ratio of highly combustible substance is made small and the ratio of the ammonia is made large in the case where the total fuel feed amount is small, the amount of heat obtained by combustion of the highly combustible substance ignited preceding the ammonia is extremely small. As a result, it becomes impossible to ignite the ammonia. Therefore, in the present aspect, the feed of the ammonia is prohibited in a case where the target total fuel feed amount into the combustion chamber 2 is smaller than the predetermined minimum fuel feed amount.

Further, when the ammonia burning internal combustion engine is a compression ignition type internal combustion engine, at the time when raising the temperature of the exhaust gas discharged from the combustion chamber 2 is necessary such as the time when raising the temperature of the exhaust purification systems 14 and 16, the temperature of the exhaust gas discharged from the combustion chamber 2 is sometimes raised by making the injection timing of the highly combustible substance and ammonia be retarded more than the normal timing. In this case, the fuel injection is carried out at the retarded side from the compression top dead center. However, when the fuel injection is carried out, the temperature in the combustion chamber 2 has become lower than the compression end temperature, therefore the air-fuel mixture is hard to ignite. Therefore, in the present aspect, when the fuel injection timing is later than a predetermined limit timing on the retarded side from the predetermined compression top dead center, the feed of ammonia is prohibited.

Further, when the amount of the air taken into the combustion chamber 2 is small and when the temperature of the intake gas fed into the combustion chamber 2 is low, the compression end temperature drops. Therefore, when the ammonia is fed into the combustion chamber 2, the combustibility of the highly combustible substance and the air-fuel mixture is degraded. Therefore, in the present aspect, in the case where the amount of the air taken into the combustion chamber 2 is smaller than a predetermined minimum reference intake air amount or the case where the temperature of the gas taken into the combustion chamber 2 is lower than a predetermined minimum reference temperature, the feed of ammonia is prohibited. In other words, in the present aspect, it may be said that the feed of the ammonia is prohibited in the case where the compression end temperature estimated based on the amount of the air taken into the combustion chamber 2 and the temperature of the intake gas taken into the combustion chamber 2 is lower than the minimum reference compression end temperature.

Furthermore, in the case where the temperature of the wall surface around the combustion chamber 2 is low such as the time of a cold state of the internal combustion engine, the heat of the intake gas in the combustion chamber 2 is robbed by the wall surface around the combustion chamber 2 and thus the compression end temperature drops, or the heat of the combustion gas is robbed by the wall surface around the combustion chamber 2 during combustion of the air-fuel mixture and thus the temperature of the combustion gas drops. Therefore, when feeding ammonia into the combustion chamber 2, the combustibility of the highly combustible substance is degraded, therefore the combustibility of the air-fuel mixture is degraded. Therefore, in the present aspect, in the case where the temperature of the wall surface around the combustion chamber 2 is low, such as the time of a cold state of the engine, the feed of the ammonia is prohibited.

Figure 35:
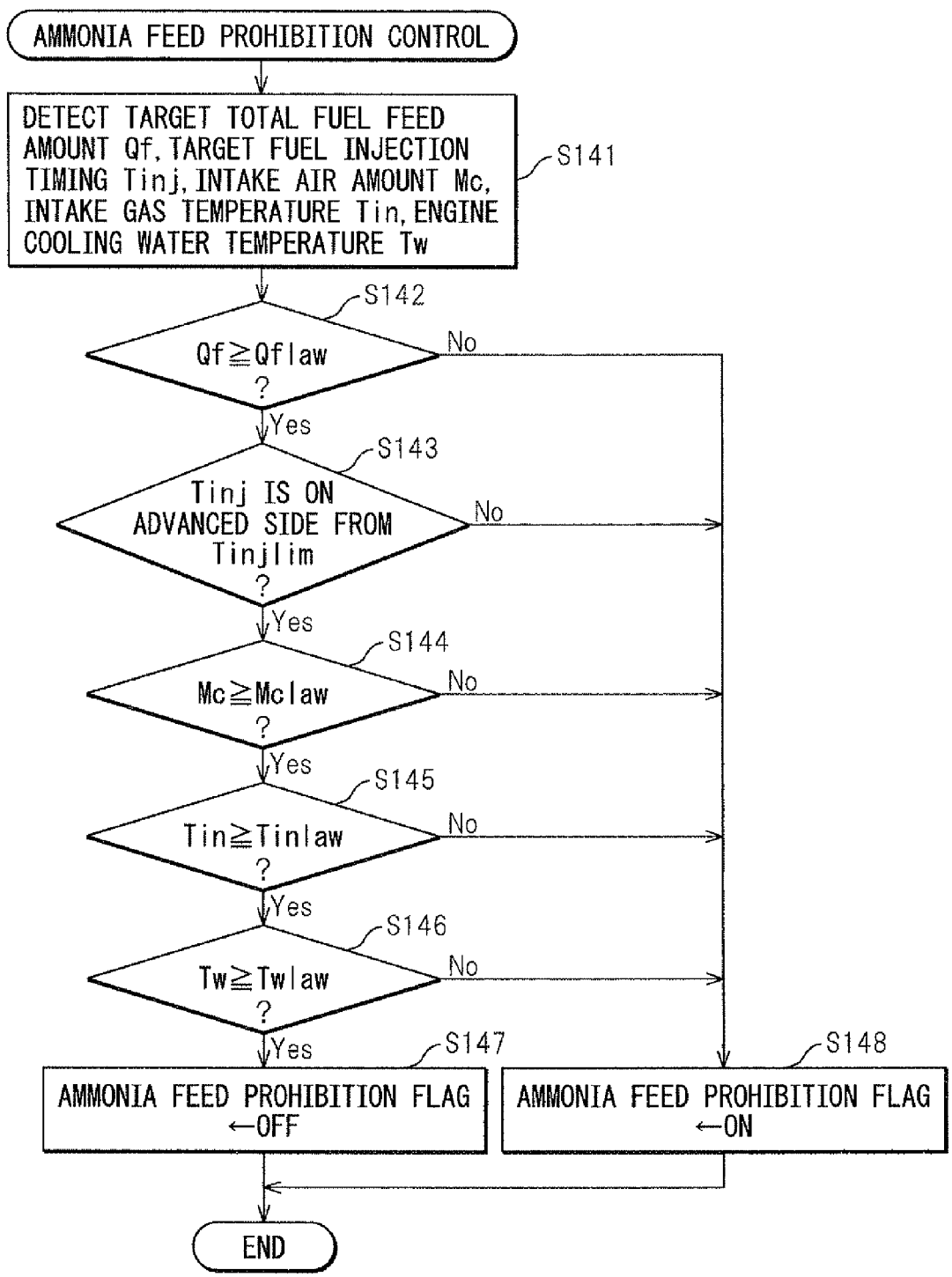
FIG. 35 is a flowchart showing a control routine of control of ammonia feed prohibition.

FIG. 35 is a flow chart showing a control routine of a feed prohibition control of ammonia. As shown in FIG. 35, first, at step S141, the target total fuel feed amount Qf, target fuel injection timing Tinj, intake air amount Mc, intake gas temperature Tin, and engine cooling water temperature Tw are detected. Next, at step S142, it is determined whether the target total fuel feed amount Qf is the minimum reference fuel feed amount Qflaw or more. When it is determined that the target total fuel feed amount Qf is the minimum reference fuel feed amount Qflaw or more, the routine proceeds to step S143. At step S143, it is determined whether the target fuel injection timing Tinj is on the advanced side from the limit timing Tinjlim. When it is determined that the target fuel injection timing Tinj is on the advanced side from the limit timing Tinjlim, the routine proceeds to step S144.

At step S144, it is determined whether the intake air amount Mc is the minimum reference intake air amount Mclaw or more. When it is determined that the intake air amount Mc is the minimum reference intake air amount Mclaw or more, the routine proceeds to step S145. At step S145, it is determined whether the intake gas temperature Tin is the minimum reference temperature Tinlaw or more. When it is determined that the intake gas temperature Tin is the minimum reference temperature Tinlaw or more, the routine proceeds to step S146. At step S146, it is determined whether the engine cooling water temperature Tw is the minimum reference temperature Twlaw or more, that is, whether the wall surface temperature around the combustion chamber 2 is the predetermined minimum temperature or more. When it is determined that the engine cooling water temperature Tw is the minimum reference temperature Twlaw or more, the routine proceeds to step S147. At step S147, an ammonia feed prohibition flag is set to off. Here, when the ammonia feed prohibition flag has become on, the ratio of feed of ammonia is made zero when calculating the ratio of feed of the ammonia and the highly combustible substance. When the flag has become off, the ratio of feed of ammonia is suitably calculated in accordance with the engine operating state.

On the other hand, when it is determined at step S142 that the target total fuel feed amount Qf is smaller than the minimum reference fuel feed amount Qflaw, it is determined at step S143 that the target fuel injection timing Tinj is on the retarded side from the limit timing Tinjlim, it is determined at step S144 that the intake air amount Mc is smaller than the minimum reference intake air amount Mclaw, it is determined at step S145 that the intake gas temperature Tin is lower than the minimum reference temperature Tinlaw, or it is determined at step S146 that the engine cooling water temperature Tw is lower than the minimum reference temperature Twlaw, the routine proceeds to step S148 where the ammonia feed prohibition flag is made on.

Next, an ammonia burning internal combustion engine of a fourth aspect of the present invention will be explained. The configuration of the ammonia burning internal combustion engine of the present aspect is basically the same as the configurations of the ammonia burning internal combustion engines of the first aspect to third aspect. However, in these aspects, as the highly combustible substance, for example, use is made of gasoline, light oil, liquefied natural gas, hydrogen, etc. In contrast, in the present aspect, a substance different from these substances is used as the highly combustible substance. Below, various examples in the case where a substance different from the above-described substances is used as the highly combustible substance will be explained.

First, a first embodiment of the fourth aspect will be explained. In the first embodiment, the ammonia burning internal combustion engine is a compression ignition type, and a GTL light oil (light oil synthesized from hydrocarbon gas by gas-to-liquid technology) is used as the highly combustible substance. The cetane number of the GTL light oil is 75 to 80 and thus is higher than usual light oil with a cetane number of about 40 to 52. Therefore, GTL light oil is easier to be self ignited compared with the usual light oil. For this reason, when feeding GTL light oil into the combustion chamber 2, even when there is ammonia in the combustion chamber 2, the GTL light oil is self ignited relatively well preceding the ammonia. Due to this, a drop of the combustibility of the highly combustible substance due to the presence of ammonia can be suppressed, therefore a drop of the combustibility of the air-fuel mixture can be suppressed.

Note that, in the present first embodiment, the GTL light oil is stored in a tank other than that for ammonia as in the ammonia burning internal combustion engines of the first aspect to third aspect, and is fed into the combustion chamber 2 by a feed system other than that for ammonia. However, as in the later explained fourth aspect, by storing the GTL light oil in the same tank as that for ammonia, or mixing the GLT light oil and ammonia which were stored in different tanks in advance, a mixture of GTL light oil and ammonia may be injected into the combustion chamber 2 or into the intake port 23 by the same fuel injector.

Next, a second embodiment of the fourth aspect will be explained. In the second embodiment, the ammonia burning internal combustion engine is a compression ignition type, and dimethyl ether is used as the highly combustible substance. The cetane number of the dimethyl ether is 55 to 60 and thus is higher than usual light oil with a cetane number of about 40 to 52. Therefore, in the same way as the above-described GTL light oil, it is easier to be self ignited compared with usual light oil, therefore a drop of the combustibility of the air-fuel mixture can be suppressed.

Note that, in the second embodiment as well, dimethyl ether is stored in a tank other than that for ammonia and fed into the combustion chamber 2 by a feed system other than that for ammonia. However, as in the later explained fourth aspect, the dimethyl ether may be stored in the same tank as that for ammonia, or a mixture of dimethyl ether and ammonia may be injected by the same injector as well. In particular, the boiling point of the dimethyl ether is a low −23.6° C. and near the boiling point of ammonia. For this reason, when a mixture of liquid dimethyl ether and liquid ammonia is injected, the liquid dimethyl ether is also vaporized and dispersed in an early period simultaneously with the liquid ammonia, therefore mixing with ammonia becomes better and ignitability of the dimethyl ether becomes better compared with the case where only the liquid ammonia is vaporized and dispersed previously, so degradation of the combustibility of the highly combustible substance can be suppressed.

Next, a third embodiment of the fourth aspect will be explained. In the third embodiment, the ammonia burning internal combustion engine is a compression ignition type, and a sulfate cetane value modifier is used as the highly combustible substance. As the sulfate cetane value modifier, for example, ethyl sulfate, butyl sulfate, amyl sulfate, etc., can be used. The sulfate cetane value modifier is easier to be self ignited compared with usual light oil as well, therefore a drop of the combustibility of the air-fuel mixture can be suppressed. The sulfate cetane value modifier may be fed by a system different from that for ammonia as well or may be fed in a state mixed with ammonia as well.

Next, a fourth embodiment of the fourth aspect will be explained. In the fourth embodiment, the ammonia burning internal combustion engine is a compression ignition type, and an organic hydride is used as the highly combustible substance. As the organic hydride, for example, methyl cyclohexane, cyclohexane, decalin, etc., can be used. An organic hydride is easier to be self ignited compared with usual light oil as well, therefore a drop of the combustibility of the air-fuel mixture can be suppressed. Further, an organic hydride may be fed by a system different from that for ammonia or may be fed in a state mixed with ammonia as well.

Next, a fifth embodiment of the fourth aspect will be explained. In the fifth embodiment, nitromethane is used as the highly combustible substance. Nitromethane is higher in both of the ignitability and flash ignition property than ammonia. Further, nitromethane has a combustion speed of a fast 0.5 m/s, and has a combustion temperature of a high 2400° C. For this reason, in the case where a compression ignition type internal combustion engine is used as the ammonia burning internal combustion engine, if nitromethane is fed into the combustion chamber 2, even when there is ammonia in the combustion chamber 2, the nitromethane is self ignited relatively well preceding the ammonia and the burning is quickly spread. Further, the combustion temperature is high, so it becomes an ignition source of ammonia. On the other hand, when a spark ignition type internal combustion engine is used as the ammonia burning internal combustion engine, if nitromethane is fed into the combustion chamber 2, even when there is ammonia in the combustion chamber 2, the nitromethane catches fire relatively well preceding the ammonia and burning is quickly spread. Further, the combustion temperature is high, and therefore it becomes a flashing source (ignition source) of the ammonia. Due to this, a drop of the combustibility of the highly combustible substance due to the presence of ammonia can be suppressed, therefore a drop of the combustibility of the air-fuel mixture can be suppressed.

Further, nitromethane contains oxygen in its molecule. For this reason, nitromethane can burn even in an environment where there is almost no oxygen. For example, when injecting fuel from a cylinder direct injection type injector, the air-fuel mixture does not become homogeneous until the ignition timing or flaming timing, so unevenness occurs in the air-fuel ratio of the air-fuel mixture. Therefore, for example, even when the target air-fuel ratio of the air-fuel mixture is the stoichiometric air-fuel ratio, in the combustion chamber 2, locally a portion of a rich atmosphere and a portion of a lean atmosphere are formed. Here, since nitromethane can burn even under an environment where there is almost no oxygen, good combustion can be carried out even in the portion of a rich atmosphere.

Note that, in the present fifth embodiment as well, the nitromethane is stored in a tank other than that for ammonia and fed into the combustion chamber 2 by a system different from that for ammonia. However, as in the later explained fourth aspect, the nitromethane may be stored in the same tank as that for ammonia, or a mixture of the nitromethane and ammonia may be injected by the same injector as well. In particular, nitromethane is a liquid having a high polarity, therefore mixes with ammonia well, so the nitromethane and ammonia can be easily stored in one tank and be injected from the same injector. Further, as the highly combustible substance, a nitro compound other than nitromethane, for example, 2,2-dinitropropane, etc., may be used as well.

Next, a sixth embodiment of the fourth aspect will be explained. In the sixth embodiment, the ammonia burning internal combustion engine is a spark ignition type internal combustion engine, and acetone is used as the highly combustible substance. Acetone has an extremely high flash ignition property. Therefore, when feeding acetone into the combustion chamber 2, even when there is ammonia in the combustion chamber 2, acetone catches fire relatively easily preceding the ammonia due to the ignition by the ignition device 3. Due to this, a drop of the combustibility of the highly combustible substance due to the presence of ammonia can be suppressed, therefore a drop of the combustibility of the air-fuel mixture can be suppressed.

Note that, in the present sixth embodiment as well, the acetone is stored in a tank other than that for ammonia and fed into the combustion chamber 2 by a feed system different from that for ammonia. However, the acetone may be stored in the same tank as that for ammonia, or a mixture of the acetone and ammonia may be injected by the same injector as well. In particular, acetone is an amphiphilic liquid, so mixes with ammonia well, therefore acetone and the ammonia can be easily stored in the same tank and injected from the same injector.

Next, a seventh embodiment of the fourth aspect will be explained. In the seventh embodiment, the ammonia burning internal combustion engine is a spark ignition type internal combustion engine, and ethylene is used as the highly combustible substance. Ethylene has strong flash ignition property similarly to acetone, therefore can suppress a drop of combustibility of the air-fuel mixture in the same way as acetone. In particular, the boiling point of ethylene is −104° C., and is lower than the boiling point of the ammonia. For this reason, when ethylene and liquid ammonia are injected, the ethylene is vaporized and dispersed faster than the liquid ammonia, therefore mixing with ammonia becomes better compared with the case where only liquid ammonia is previously vaporized and dispersed.

Next, an eighth embodiment of the fourth aspect will be explained. In the eighth embodiment, the ammonia burning internal combustion engine is a compression ignition type, and hydrazine, particularly hydrazine hydrate, is used as the highly combustible substance. Hydrazine is a substance having a high ignitability, is high in flash ignition property as well, and is wide in combustion range as well. For this reason, when feeding hydrazine into the combustion chamber 2, the hydrazine is self ignited relatively well preceding the ammonia even when there is ammonia in the combustion chamber 2. Further, once the hydrazine is ignited, the combustion quickly spreads into the combustion chamber 2. For this reason, a drop of the combustibility of the highly combustible substance due to the presence of ammonia can be suppressed, therefore a drop of the combustibility of the air-fuel mixture can be suppressed. Furthermore, hydrazine is a substance not containing carbon. Therefore, even when hydrazine is burned, the greenhouse effect gas carbon dioxide is not discharged.

Figure 36:
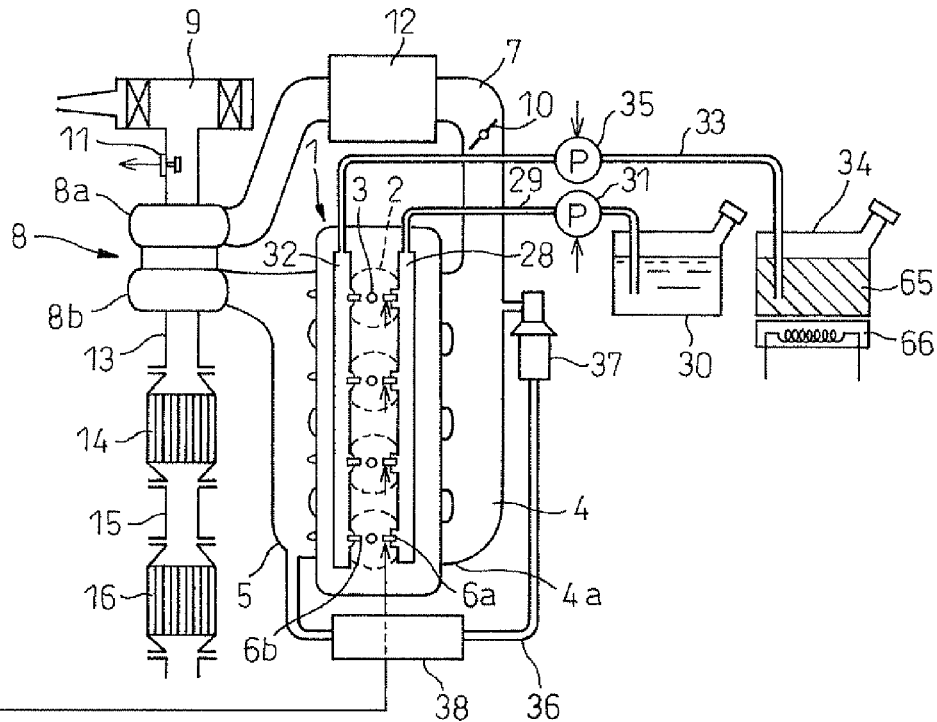
FIG. 36 is an overview of an internal combustion engine in an eighth embodiment of a fourth aspect.
Figure 36:
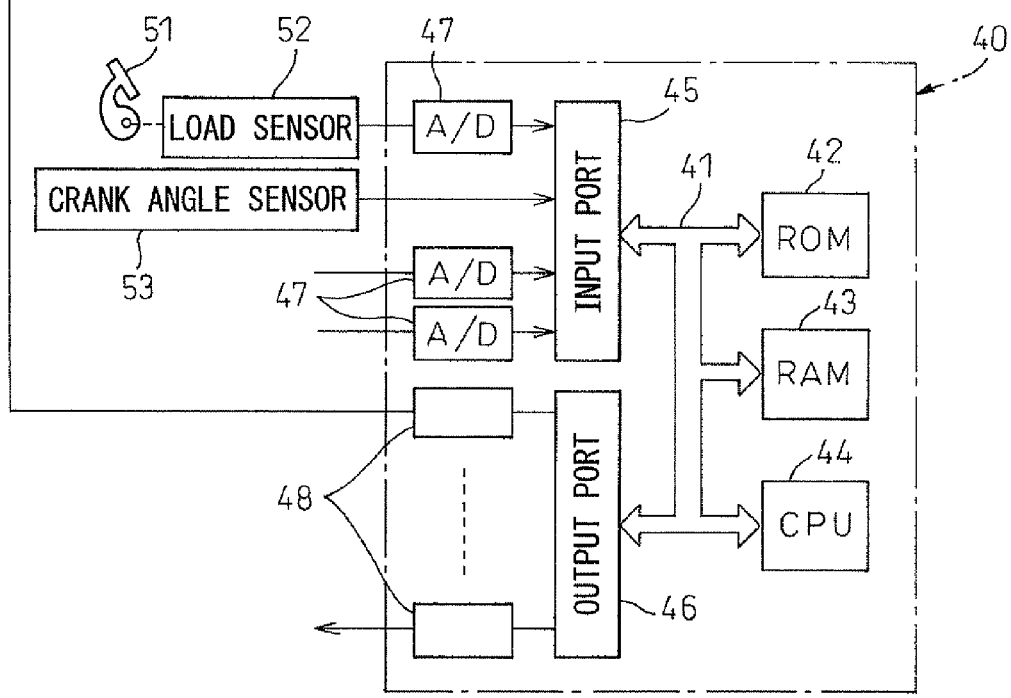

In this regard, hydrazine is a substance having a high combustibility and is wide in combustion range, therefore some measure is necessary for the safety thereof. Therefore, in the present eighth embodiment, as shown in FIG. 36, a polymer 65 having a carbonyl group is housed in the highly combustible substance tank (hydrazine tank) 34, and a heating system 66 heating the hydrazine tank 34 is provided. As the heating system 66, one heating the hydrazine tank 34 by an electric heater may be used, or one heating the hydrazine tank 34 by utilizing heat of the exhaust gas may be used.

Here, the hydrazine reacts with the polymer having a carbonyl group at room temperature and is broken down to water and hydrazone (dehydration condensation). Hydrazone is a solid substance and has a lower combustibility compared with the hydrazine, therefore has a higher safety compared with hydrazine. In the present eighth embodiment, the polymer 65 having a carbonyl group is housed in the hydrazine tank 34, therefore the hydrazine fed into the hydrazine tank 34 reacts with this polymer 65 to become hydrazone. Due to this, the hydrazine can be stored in a safe form.

Further, the hydrazone changes to the hydrazine by adding water and heat (hydrolysis). Therefore, in the present eighth embodiment, when feed of the hydrazine into the combustion chamber 2 is necessary, the hydrazine is generated by heating the hydrazone in the hydrazine tank 34 by the heating system 66. Note that, as the water required at this time, water which is generated at the time of dehydration condensation of hydrazine and stored in the hydrazine tank 34 is utilized.

Note that, unlike the above eighth embodiment, the hydrazine may be stored in the same tank as that for ammonia, or a mixture of the hydrazine and ammonia may be injected from the same injector as well. Further, as explained above, hydrazine has a high flash ignition property, therefore may be used in a spark ignition type internal combustion engine as well.

Next, a first modification of the eighth embodiment of the fourth aspect will be explained. In this regard, hydrazine can be generated by oxidizing the ammonia by hypochlorite, for example, sodium hypochlorite. Therefore, in the present first modification, by utilizing this oxidation reaction, the hydrazine is generated from ammonia.

Figure 37:
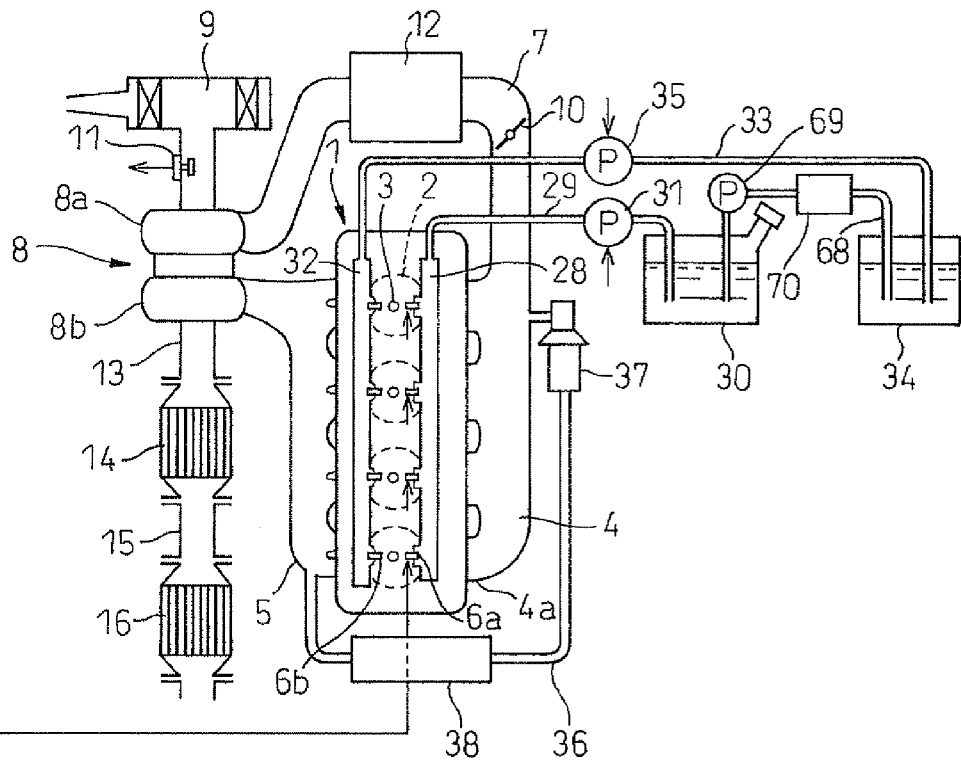
FIG. 37 is an overview of a modification of an internal combustion engine in an eighth embodiment of the fourth aspect.
Figure 37:
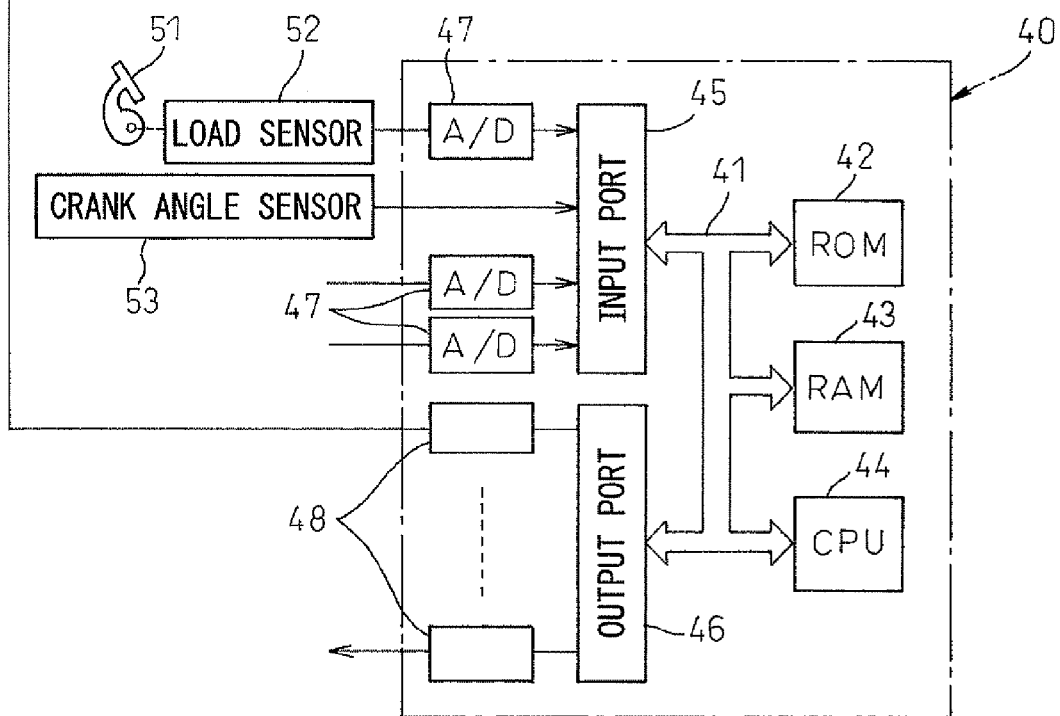

FIG. 37 is a view schematically showing an ammonia burning internal combustion engine of the first modification. As shown in FIG. 37, the hydrazine tank 34 and the ammonia tank 30 are communicated by a communicating passage 68. This communicating passage 68 is provided with an ammonia feed pump 69 for feeding the ammonia in the ammonia tank 30 to the hydrazine tank 34, and a hydrazine generating system 70 generating the hydrazine from the ammonia. A hypochlorite is housed in the hydrazine generating system 70 and is oxidized when the ammonia passes through the hydrazine generating system 70, whereby hydrazine is generated. Note that, when heating is necessary at the time when generating hydrazine from ammonia at the hydrazine generating system 70, the hydrazine generating system 70 is heated by the electric heater or heat of the exhaust gas.

In the thus configured first modification, ammonia is fed to the hydrazine generating system 70 by the ammonia feed pump 69 in exactly an amount of feed from the inside of the hydrazine tank 34 into the combustion chamber 2. Along with this, the hydrazine is made to flow into the hydrazine tank 34 from the hydrazine generating system 70. Due to this, it becomes unnecessary to feed the hydrazine from the outside, and it becomes unnecessary to store a large amount of hydrazine in the hydrazine tank 34, therefore the hydrazine can be stored relatively safely.

Note that, in the first modification, the hydrazine generating system 70 is arranged outside the ammonia tank 30 and hydrazine tank 34, but it may also be provided inside the tank 30 or 34. Further, in the first modification, a hypochlorite is utilized to generate hydrazine from ammonia, but chlorine may also be used to oxidize ammonia and thereby generate hydrazine.

Next, a second modification of the eighth embodiment of the fourth aspect will be explained. In this regard, if comparing hydrazine and hydrogen, hydrazine is better in ignitability, while hydrogen is faster in combustion speed. For this reason, at the time of engine low load operation, by feeding hydrazine in a large amount as the highly combustible substance, the combustion of the ammonia can be improved, and at the time of engine high speed operation, by feeding hydrogen in a large amount as the highly combustible substance, combustibility of the ammonia can be improved. Therefore, in the second modification, hydrogen is generated from hydrazine fed into the hydrazine tank 34, and the feed ratio of hydrazine and hydrogen fed into the combustion chamber 2 is changed in accordance with the engine operating state. Specifically, the lower the engine load, the higher the feed ratio of hydrazine with respect to the hydrogen is made, and the higher the engine speed, the higher the feed ratio of the hydrogen with respect to the hydrazine is made.

Figure 38:
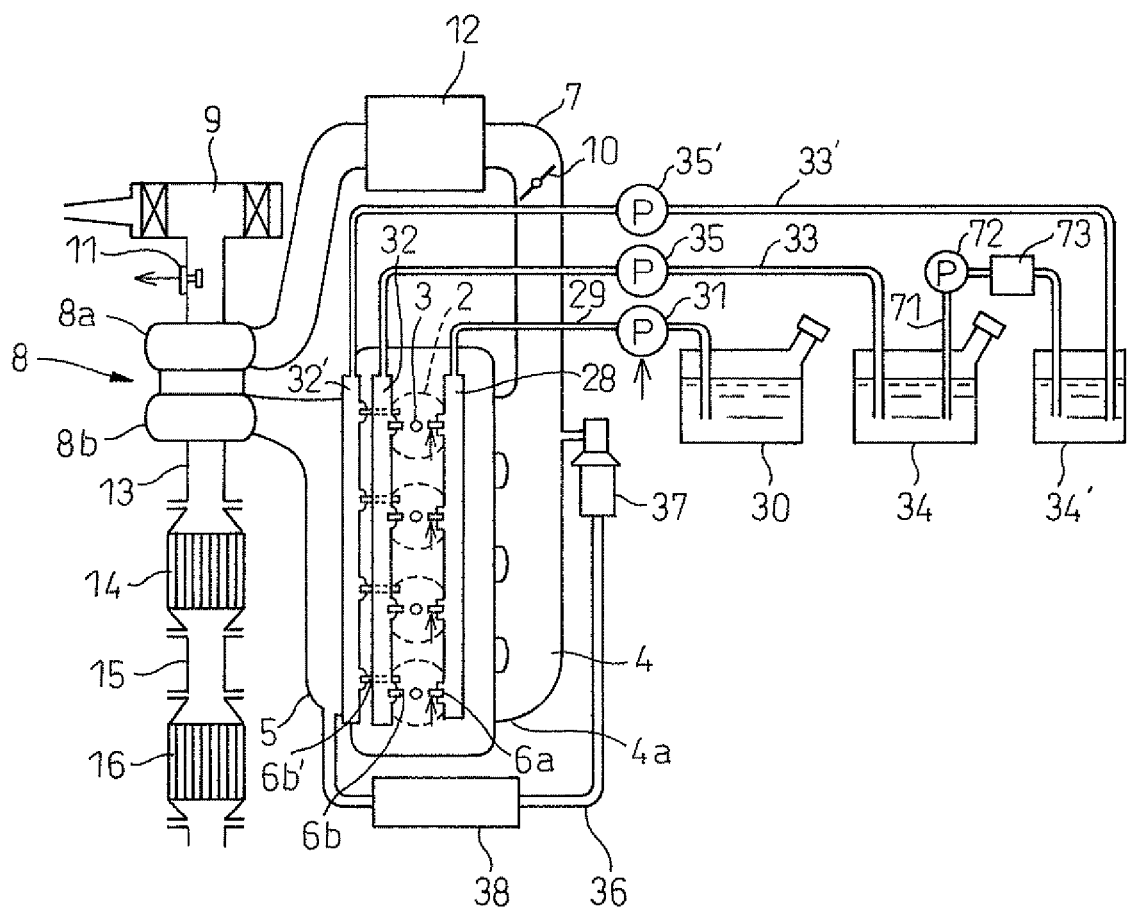
FIG. 38 is an overview of a modification of an internal combustion engine in an eighth embodiment of the fourth aspect.

FIG. 38 is a view schematically showing an ammonia burning internal combustion engine of the present second modification. As shown in FIG. 38, in the present modification, in addition to the hydrazine tank 34, a hydrogen tank 34' for storing hydrogen is provided. This hydrogen tank 34' is connected through a hydrogen feed pipe 33' to a hydrogen reservoir 32'. The hydrogen reservoir 32' is communicated with a hydrogen injector 6b'. At the hydrogen feed pipe 33', a hydrogen feed pump 35' is arranged. By this hydrogen feed pump 35', hydrogen in the hydrogen tank 34' is fed to the hydrogen reservoir 32'.

Further, as shown in FIG. 38, the hydrazine tank 34 and the hydrogen tank 34' are communicated by a communicating passage 71. This communicating passage 71 is provided with a hydrazine feed pump 72 for feeding hydrazine in the hydrazine tank 30 to the inside of the hydrogen tank 34' and a hydrogen generating system 73 generating hydrogen from hydrazine. In the hydrogen generating system 73, a catalyst for generating hydrogen from ammonia is housed. When the hydrazine passes through the hydrogen generating system 70, the hydrogen is generated from the hydrazine. Note that, if heating is necessary when generating the hydrogen from the hydrazine at the hydrogen generating system 73, the hydrogen generating system 73 is heated by an electric heater or heat of the exhaust gas.

In the thus configured second modification, hydrazine is fed to the hydrogen generating system 73 by the hydrazine feed pump 72 in exactly the amount of feed from the inside of the hydrogen tank 34' into the combustion chamber 2. Along with this, the hydrogen is made to flow into the hydrogen tank 34' from the hydrogen generating system 73. Due to this, hydrogen can be fed into the combustion chamber 2 without feeding hydrogen from the outside. Further, hydrazine and hydrogen can be fed into the combustion chamber 2 in accordance with the engine operating state, therefore it becomes possible to more reliably suppress degradation of the combustibility of the air-fuel mixture due to the presence of ammonia.

Next, a ninth embodiment of the fourth aspect will be explained. In the ninth embodiment, the ammonia burning internal combustion engine is a spark ignition type, and acetylene is used as the highly combustible substance. Acetylene is a substance having a high flash ignition property and is extremely wide in combustion range. For this reason, when feeding acetylene into the combustion chamber 2, even if there is ammonia in the combustion chamber 2, if ignition is carried out by the ignition device 3, acetylene catches fire relatively easily preceding the ammonia. Due to this, a drop of the combustibility of the highly combustible substance due to the presence of ammonia can be suppressed, therefore a drop of the combustibility of the air-fuel mixture can be suppressed.

Even in a case where acetylene is used as the highly combustible substance, in the same way as the above embodiment, the acetylene may be fed by a system different from that for ammonia or may be fed in a state mixed with ammonia as well. However, acetylene is a substance having a high combustibility and is extremely wide in combustion range, therefore a measure for safety becomes necessary. Therefore, in the present ninth embodiment, the acetylene is generated by housing a calcium carbide having a high safety in a calcium carbide holder and feeding moisture to this calcium carbide.

Figure 39:
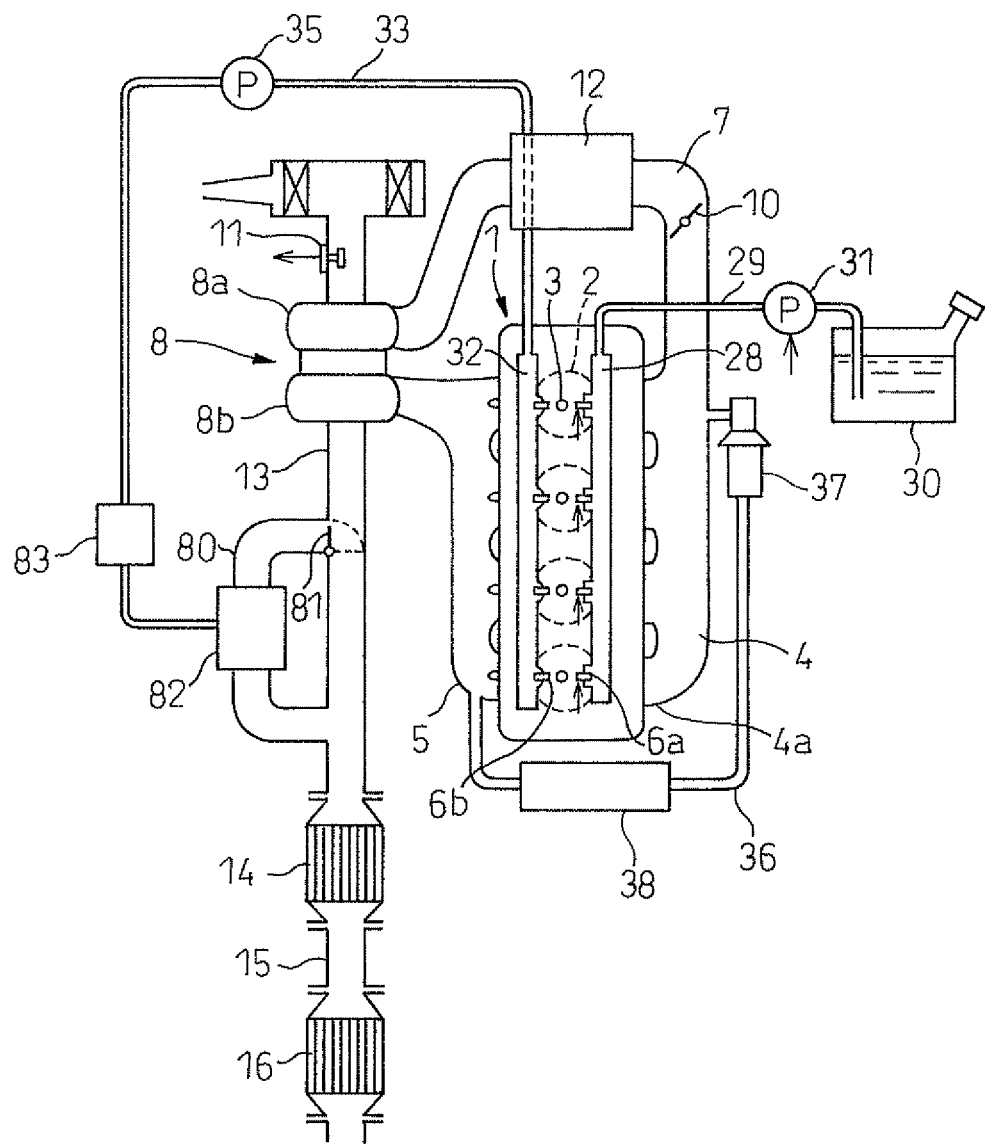
FIG. 39 is an overview of an internal combustion engine in a ninth embodiment of the fourth aspect.

FIG. 39 is a view schematically showing an ammonia burning internal combustion engine of the ninth embodiment. The ammonia burning internal combustion engine of the ninth embodiment is, as shown in FIG. 39, provided with a branch pipe 80 branched from the exhaust pipe 13 and a flow regulator 81 provided in a branch portion from the exhaust pipe 13 to the branch pipe 80. The flow regulator 81 can control the flow rate of the exhaust gas flowing into the branch pipe 80. An acetylene generating system 82 is arranged in the branch pipe 80, and this branch pipe 80 joins with the exhaust pipe 13 at a more upstream side from the upstream side exhaust purification system 14.

The acetylene generating system 82 is connected through an acetylene feed pipe 33 to an acetylene reservoir 32. In the acetylene feed pipe 33, an acetylene tank 83 for storing acetylene generated by the acetylene generating system 82 and an acetylene feed pump 35 for feeding the acetylene stored in the acetylene tank 83 to the acetylene reservoir 32 are arranged.

The acetylene generating system 82 is provided with a calcium carbide holder housing the calcium carbide. Therefore, when moisture is passed through the acetylene generating system 82, acetylene is generated. On the other hand, moisture is contained in the exhaust gas discharged from the combustion chamber 2. Therefore, when making the exhaust gas discharged from the combustion chamber 2 pass through the acetylene generating system 82, acetylene is generated. In particular, the amount of acetylene generated by the acetylene generating system 82 is proportional to the amount of moisture flowing into the acetylene generating system 82. Therefore, when the flow rate of the exhaust gas flowing into the branch pipe 80 is increased by the flow regulator 81, the amount of acetylene generated at the acetylene generating system 82 increases. Conversely, when the flow rate of the exhaust gas flowing into the branch pipe 80 is decreased by the flow regulator 81, the amount of acetylene generated at the acetylene generating system 82 is decreased.

Note that, in the ninth embodiment, the exhaust gas passes directly through the acetylene generating system. However, a condenser for condensing moisture in the exhaust gas may be provided in the engine exhaust passage, and water obtained at the condenser may be fed to the acetylene generating system as well. Further, in the ninth embodiment, the moisture in the exhaust gas is fed to the acetylene generating system, but a water tank storing water may be further provided, and water may be fed from this water tank to the acetylene generating system as well.

Figure 40:
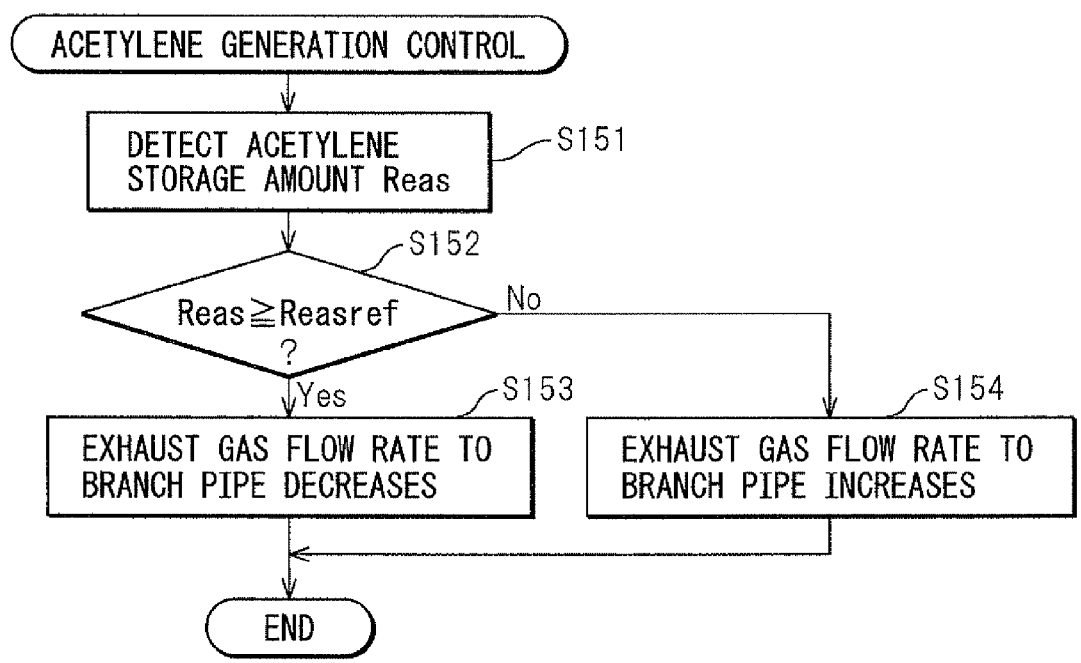
FIG. 40 is a flowchart showing a control routine of control of acetylene production.

FIG. 40 is a flow chart showing a control routine of acetylene generation control. As shown in FIG. 40, first, at step S151, an acetylene storage amount Reas in the acetylene tank 83 is detected by a sensor (not shown) detecting the storage amount of acetylene in the acetylene tank 83. Next, at step S152, it is determined whether the storage amount of acetylene in the acetylene tank 83 is the predetermined reference amount Reasref or more. When it is determined at step S152 that the storage amount Reas of acetylene in the acetylene tank 83 is the predetermined reference amount Reasref or more, the routine proceeds to step S153. At step S153, the flow rate of the exhaust gas flowing into the branch pipe 80 is decreased. Due to this, the amount of generation of acetylene by the acetylene generating system 82 is decreased. On the other hand, when it is determined at step S152 that the storage amount Reas of acetylene in the acetylene tank 83 is smaller than the predetermined reference amount Reasref, the routine proceeds to step S154. At step S154, the flow rate of the exhaust gas flowing into the branch pipe 80 is increased. Due to this, the amount of generation of acetylene by the acetylene generating system 82 is made to increase.

Figure 41:
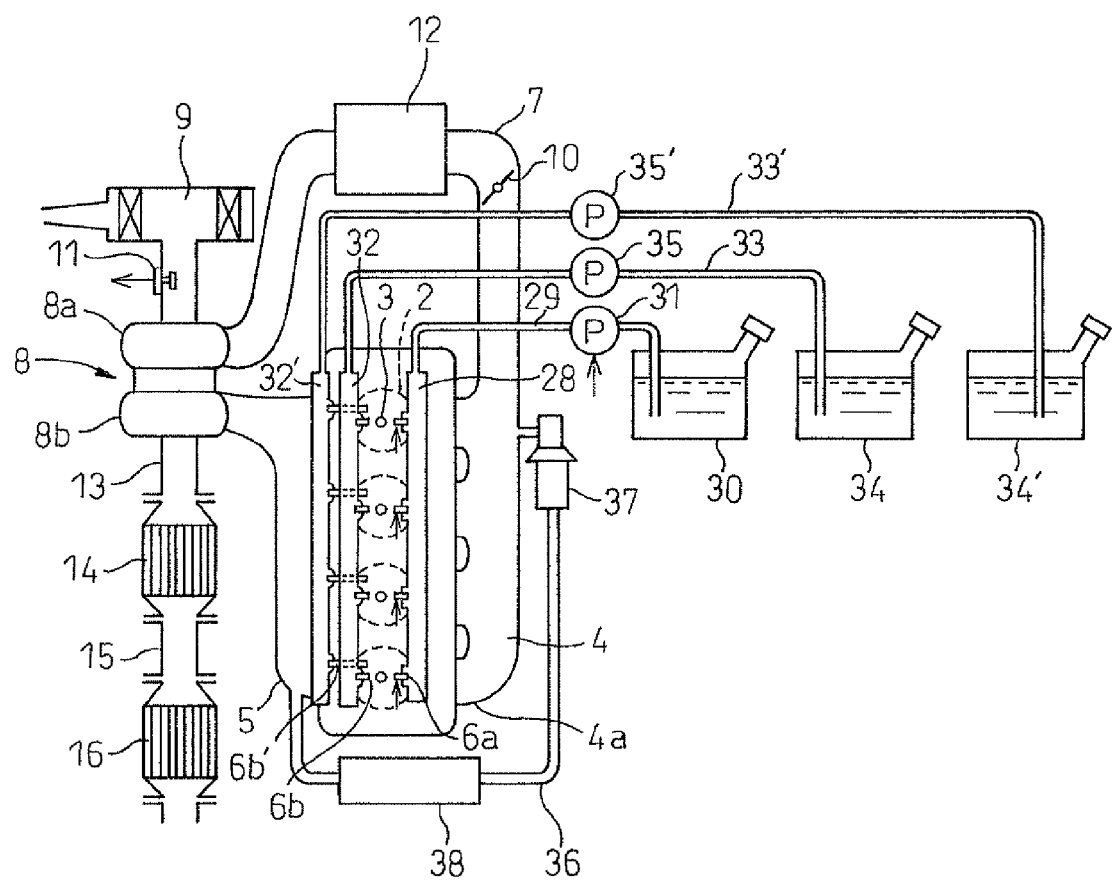
FIG. 41 is an overview of an internal combustion engine in a 10th embodiment of the fourth aspect.

Next, referring to FIG. 41, a 10th embodiment of the fourth aspect will be explained. In the ammonia burning internal combustion engine of the 10th embodiment, as shown in FIG. 41, two highly combustible substance tanks 34 and 34' and two highly combustible substance injectors 6b and 6b' are provided. These are respectively provided with highly combustible substance feed pipes 33 and 33' and highly combustible substance feed pumps 35 and 35'. Two substances are fed into the combustion chamber 2 as the highly combustible substance. Specifically, in the 10th embodiment, as the highly combustible substance, use is made of an ignitability modifier having a higher ignitability than ammonia (for example, light oil, GTL light oil, dimethyl ether, sulfate cetane value modifier, nitro compound, acetylene, etc.) and a flame propagation rate modifier having a higher flame propagation rate than ammonia (for example, gasoline, hydrogen, acetone, ethylene, nitro compound, etc.). Therefore, the ignitability modifier is fed to the highly combustible substance tank 34 and injected from the highly combustible substance injector 6b, and the flame propagation rate modifier is fed to the highly combustible substance tank 34' and injected from the highly combustible substance injector 6b'.

By feeding the ignitability modifier and flame propagation rate modifier into combustion chamber 2 in addition to ammonia, due to the presence of the ignitability modifier, the air-fuel mixture is easily ignited. Due to the presence of the flame propagation rate modifier, combustion of the air-fuel mixture is spread into the combustion chamber 2 at a high speed after the air-fuel mixture is once ignited. For this reason, a drop of the combustibility of the highly combustible substance due to the presence of ammonia can be suppressed, therefore a drop of the combustibility of the air-fuel mixture can be suppressed.

Note that, in the 10th embodiment, two substances are fed into the combustion chamber 2 as the highly combustible substance, but three or more substances may be fed into the combustion chamber 2 as well. Further, in the 10th embodiment, fuel feed is separately carried out through different feed systems without mixing a plurality of highly combustible substances and ammonia, but the fuel feed may be carried out in a state mixing a plurality of highly combustible substances and ammonia as well.

Next, an ammonia burning internal combustion engine of a fifth aspect of the present invention will be explained. The configuration of the ammonia burning internal combustion engine of the present aspect is basically the same as the configurations of the ammonia burning internal combustion engines of the first aspect to fourth aspect.

In this regard, ammonia is a substance having polarity and does not dissolve in the highly combustible substance depending on the type thereof. For this reason, in the aspects explained above, the ammonia and the highly combustible substance are stored in the separate tanks and injected through separate feed paths from separate injectors. However, when feeding the ammonia and the highly combustible substance through separate tanks, feed paths, and injectors in this way, two sets of components become necessary, and the production costs become high. Therefore, in the present aspect, even in a case where a substance not dissolving in ammonia is used as the highly combustible substance, at least one of the tanks, feed paths, and injectors is made common use of to decrease production costs. Below, various examples of the case where a tank, feed path, and injector are made common use of when using a substance, which does not mix with (dissolve in) ammonia, will be explained.

Figure 42:
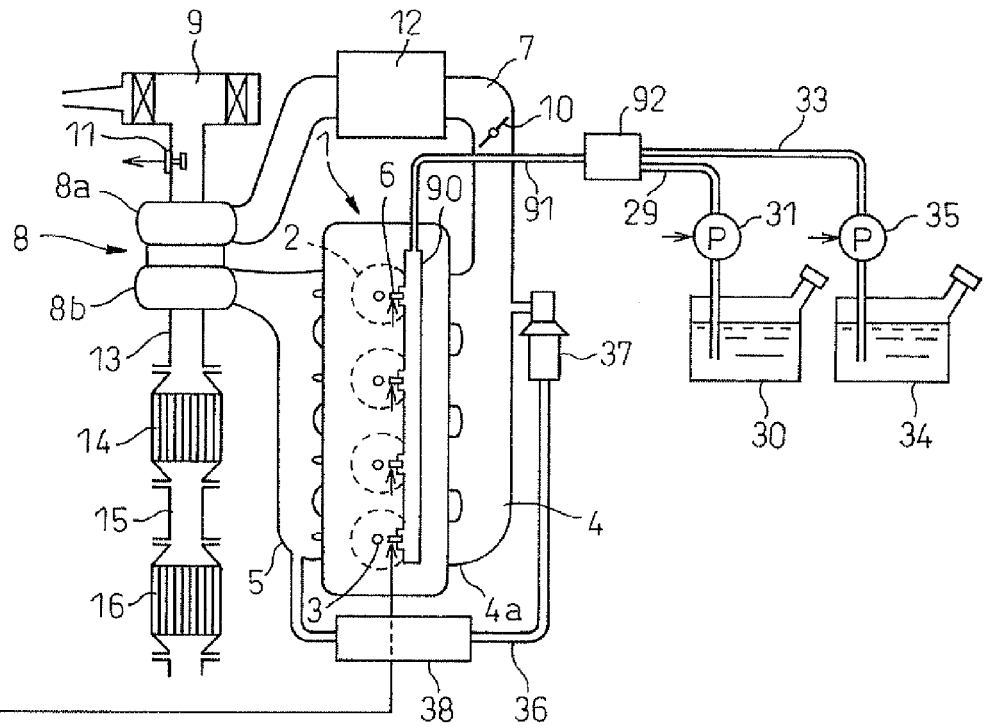
FIG. 42 is an overview of an internal combustion engine in a first embodiment of a fifth aspect.
Figure 42:
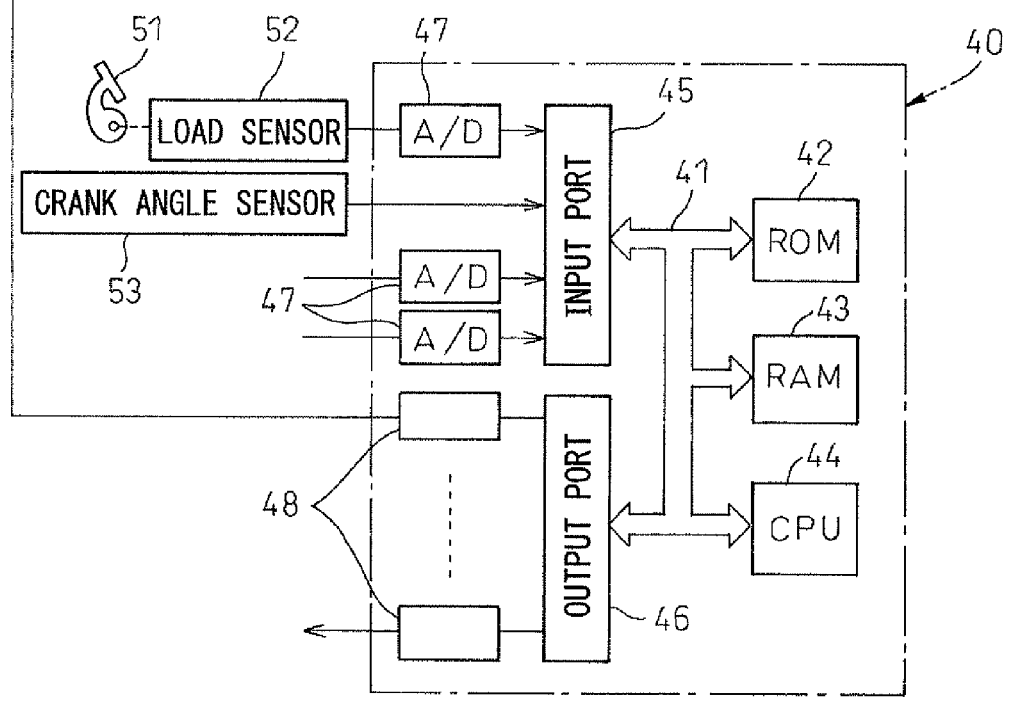

First, a first embodiment of the fifth aspect will be explained. In the first embodiment, as shown in FIG. 42, on the top surface of the combustion chamber 2 of each cylinder, a fuel injector 6 injecting a mixed fuel by mixing the ammonia and the highly combustible substance (in particular, a non-ammonia substance not be able to mix with ammonia) toward the inside of the combustion chamber 2 is arranged. Each fuel injector 6 is coupled with the fuel reservoir 90, and this fuel reservoir 90 is connected through a fuel feed pipe 91 to a mixer 92. The mixer 92 is connected through the ammonia feed pipe 29 to the ammonia tank 30 and is connected through the highly combustible substance feed pipe 33 to the highly combustible substance tank 34. Further, at the ammonia feed pipe 29, an ammonia feed pump 31 is arranged, while at the highly combustible substance feed pipe 33, a highly combustible substance pump 35 is arranged.

Figure 43:
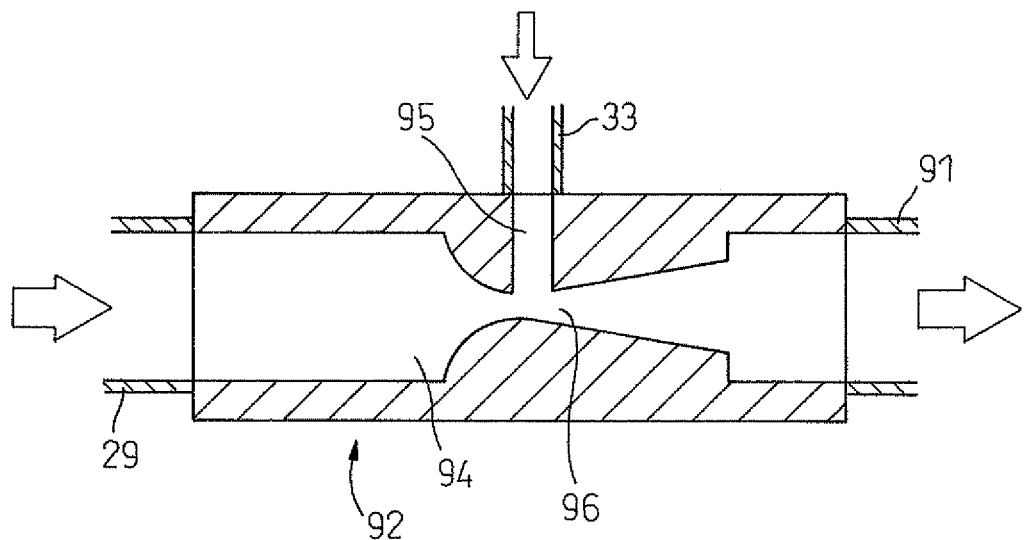
FIG. 43 is a view schematically showing the configuration of an air-fuel mixture.

FIG. 43 is a view schematically showing the configuration of the mixer 92. As shown in FIG. 43, the mixer 92 is provided with an ammonia flow path 94 communicated with the ammonia feed pipe 29 and fuel feed pipe 91, and a highly combustible substance flow path 95 communicated with the highly combustible substance feed pipe 33. The ammonia flow path 94 has an orifice 96 configuring a restrictor of the ammonia flow path 94, and the highly combustible substance flow path 95 is connected to the orifice 96. In the thus configured mixer 92, the flow rate of the ammonia passing through the ammonia flow path 94 becomes faster at the orifice 96. Due to this, the highly combustible substance is sucked from the highly combustible substance passage 95 and released into the ammonia flowing in the orifice 96. The highly combustible substance released to the orifice 96 is dispersed in the ammonia in the orifice 96, thereby the ammonia and the highly combustible substance are mixed. Due to this, the ammonia and the highly combustible substance are mixed well. In this way, in the first embodiment, the fuel injector and part of the fuel feed path are made common, so the production costs can be reduced.

Further, the mixing ratio of the ammonia and the highly combustible substance is regulated by changing the output of the highly combustible substance feed pump 35 with respect to the output of the ammonia feed pump 31, that is, by changing the pressure of the highly combustible substance flowing into the highly combustible substance flow path 95 with respect to the pressure of ammonia flowing into the ammonia flow path 94. Specifically, when the output of the highly combustible substance feed pump 35 with respect to the output of the ammonia feed pump 31 is raised, the mixing ratio of the highly combustible substance increases. Conversely, when the output of the highly combustible substance feed pump 35 with respect to the output of the ammonia feed pump 31 is made to drop, the mixing ratio of the highly combustible substance is decreased.

Next, a second embodiment of the fifth aspect will be explained. In the second embodiment, the ammonia and highly combustible substance are fed into the combustion chamber 2, but only one tank is provided for storing these ammonia and highly combustible substance. Therefore, the ammonia and the highly combustible substance are stored together in the single fuel tank 100.

Figure 44:
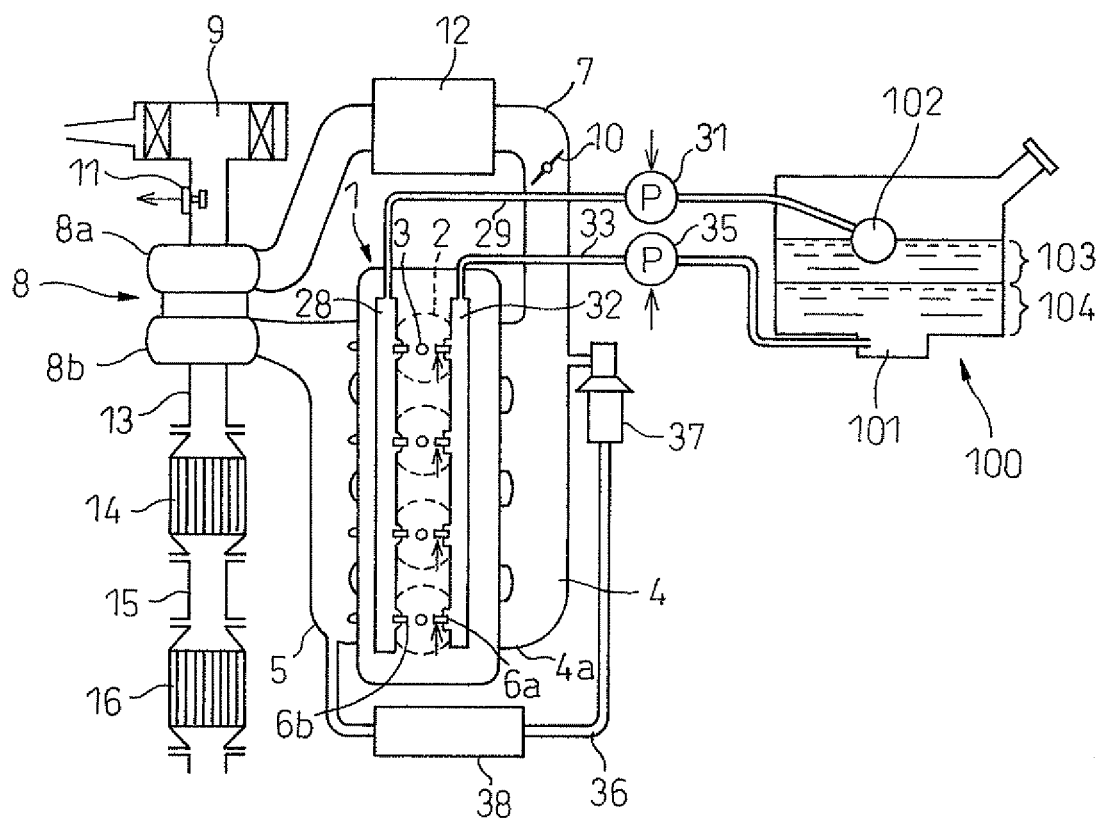
FIG. 44 is an overview of an internal combustion engine in a second embodiment of the fifth aspect.

FIG. 44 is a schematic view of an ammonia burning internal combustion engine of the second embodiment. As shown in FIG. 44, in the ammonia burning internal combustion engine of the second embodiment, only a single fuel tank 100 is provided. At the bottom of the fuel tank 100, a fuel reservoir 101 sticking out downward from the fuel tank 100 is provided. To this fuel reservoir 101, a highly combustible substance feed pipe 33 is connected. On the other hand, inside the fuel tank 100, a float 102 floating on the fuel stored in the fuel tank 100 is provided. To the float 102, the ammonia feed pipe 29 is connected.

In the fuel tank 100, ammonia and a highly combustible substance not being able to mix with ammonia are stored. The ammonia and the highly combustible substance do not mix with each other, so are separated in the fuel tank 100. Here, where the highly combustible substance is made light oil, since the specific gravity of light oil is higher than the specific gravity of ammonia, ammonia is stored in an upper portion of the fuel tank 100 (upper layer 103 in FIG. 44), and the highly combustible substance is stored in a lower portion of fuel tank 100 (lower layer 104 in FIG. 44). The ammonia and the highly combustible substance stored in the fuel tank 100 are separated up and down in this way. Therefore, around the float 102 floating on the fuel, there is ammonia, while the highly combustible substance exists in the fuel reservoir 101. For this reason, the ammonia feed pipe 29 connected to the float 102 sucks the ammonia stored near the liquid surface of the fuel tank 100, while the highly combustible substance feed pipe 33 connected to the fuel reservoir 101 sucks the highly combustible substance stored in the vicinity of the bottom of the fuel tank 100.

By configuring the ammonia burning internal combustion engine in this way, the fuel tank may be made a single tank, so the production costs can be slashed. Also, it is not necessary to supply the fuel by discrimination of each type of fuel, so the user friendliness can be improved.

Figure 45:
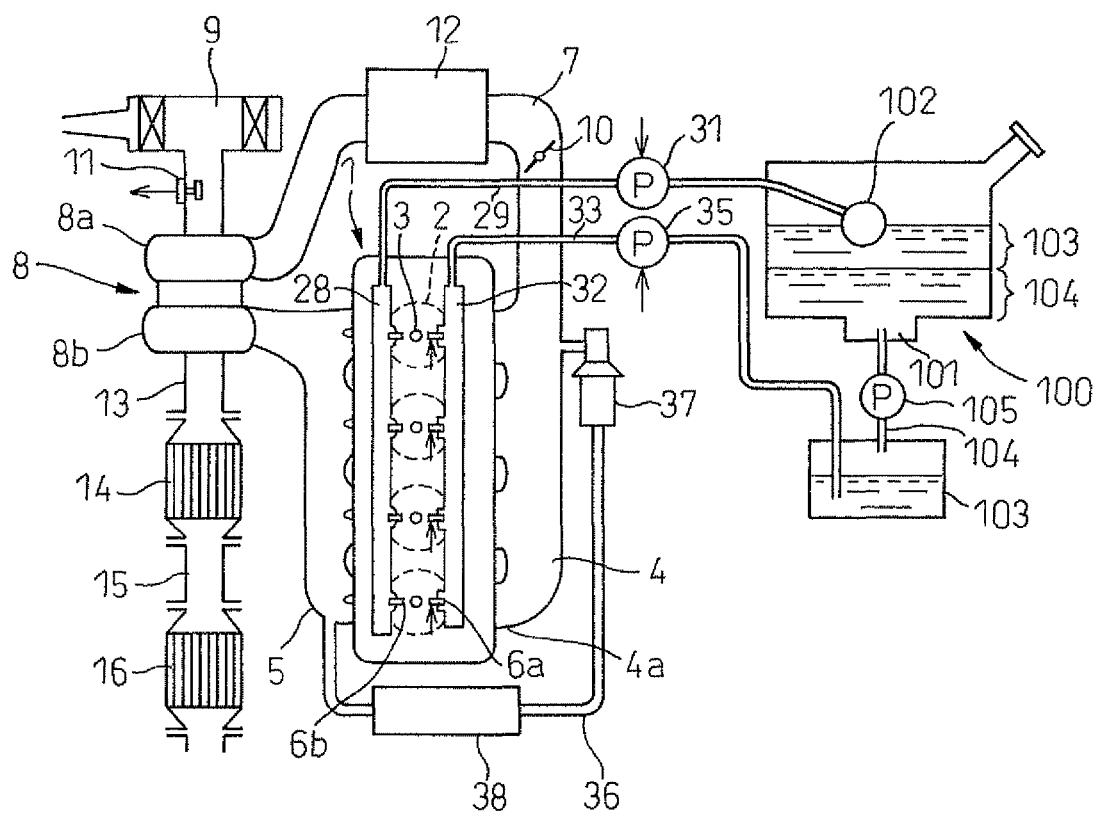
FIG. 45 is an overview of a modification of an internal combustion engine in the second embodiment of the fifth aspect.

Next, referring to FIG. 45, a modification of the second embodiment will be explained. In the present modification, in addition to the fuel tank 100, a highly combustible substance tank 103 for storing the highly combustible substance is provided. The highly combustible substance tank 103 is connected to the fuel reservoir 101 of fuel tank 100 by a highly combustible substance transport pipe 104. At the highly combustible substance transport pipe 104, a transport pump 105 is provided and transports the highly combustible substance in the fuel reservoir 101 to the highly combustible substance tank 103. The highly combustible substance feed pipe 33 is connected to not the fuel reservoir 101, but the highly combustible substance tank 103.

In the thus configured ammonia burning internal combustion engine of the present modification, the highly combustible substance stored in a lower portion in the fuel tank 100 and existing in the fuel reservoir 101 is transported by the transport pump 105 into the highly combustible substance tank 103. For this reason, in the highly combustible substance tank 103, the highly combustible substance is stored.

Summarizing the second embodiment and its modifications, in the second embodiment and modifications, it may be said that the ammonia burning internal combustion engine is configured so as to be provided with a liquid surface fuel feed system feeding the fuel in the vicinity of the liquid surface of the fuel tank 100 among fuels stored in the fuel tank 100 to the combustion chamber 2 and a bottom portion fuel feed system constituting a different system from the above-described liquid surface fuel feed system and feeding the fuel in the vicinity of the bottom portion of the fuel tank 100 to the combustion chamber 2.

Figure 46:
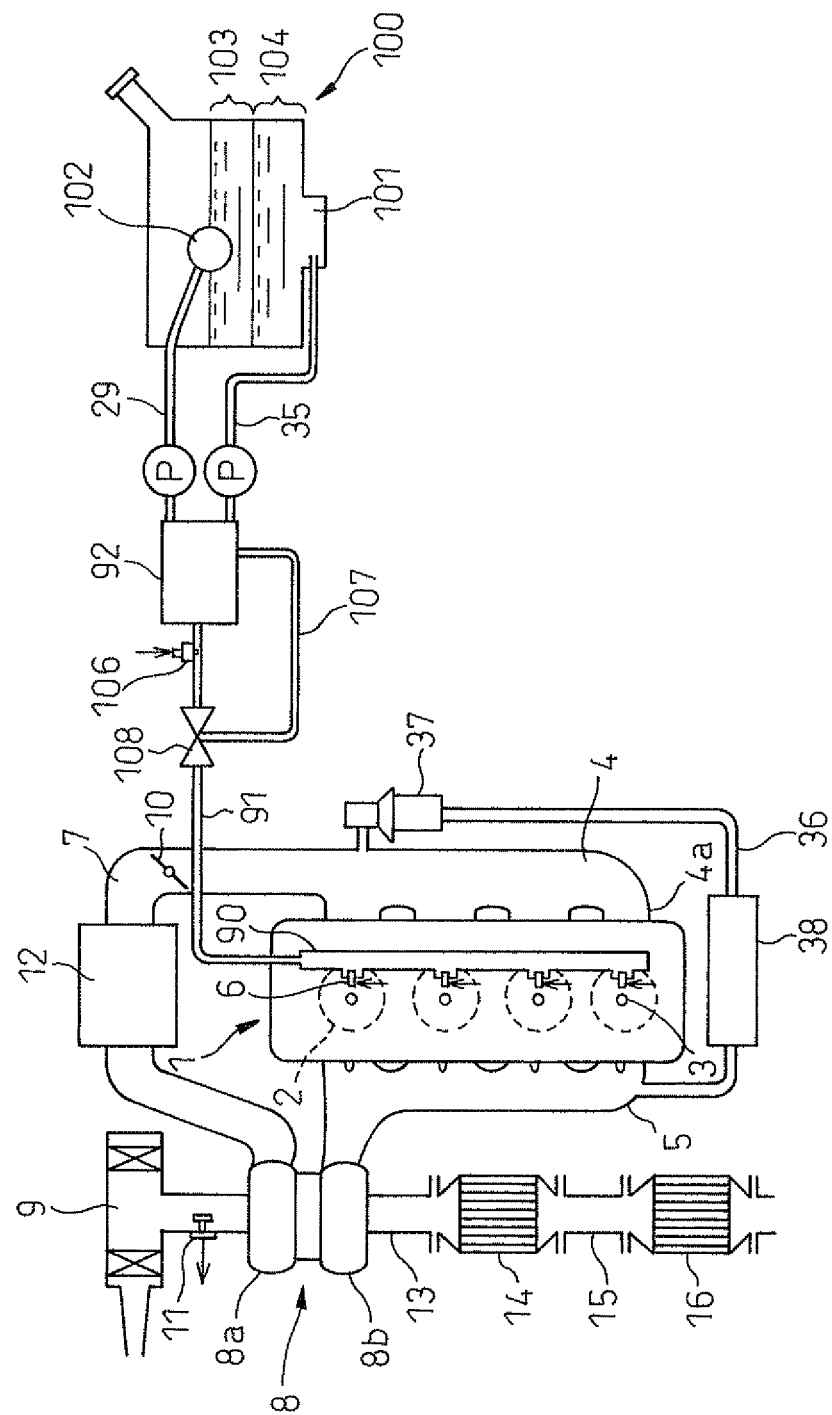
FIG. 46 is an overview of an internal combustion engine in a third embodiment of the fifth aspect.

Next, referring to FIG. 46, a third embodiment of the fifth aspect will be explained. In the third embodiment, in the same way as the example shown in FIG. 42, a fuel injector 6, fuel reservoir 90, fuel feed pipe 91, and mixer 92 are provided. Further, to the mixer 92 is connected the ammonia feed pipe 29 and highly combustible substance feed pipe 33. The ammonia feed pipe 29 is connected to the float 102 floating on the fuel stored in the fuel tank 100, and the highly combustible substance feed pipe 33 is connected to the fuel reservoir 101 of the fuel tank 100.

Furthermore, in the present third embodiment, a mixed state detection sensor 106 detecting the mixed state of the mixed fuel flowing in the fuel feed pipe 91 is provided in the fuel feed pipe 91 at a downstream side from the mixer 92. The mixed state detection sensor 106 detects the mixed state of the mixed fuel according to for example an attenuation amount of light. Furthermore, a return pipe 107 is branched from the fuel feed pipe 91 at a downstream side from the mixed state detection sensor 106. This return pipe 107 is connected to the mixer 92. Further, a return valve 108 is provided at the branch portion from the fuel feed pipe 91 to the return pipe 107. This return valve 108 controls the flow rate of the fuel returned to the mixer 92 through the return pipe 107.

In the thus configured ammonia burning internal combustion engine, when the mixed state of the mixed fuel detected by the mixed state detection sensor 106 is worse than a predetermined reference mixed state, for example, the attenuation amount of light is lower than the predetermined reference attenuation amount, the return valve 108 is controlled so that part of the mixed fuel flowing in the fuel feed pipe 91 is returned through the return pipe 107 to the mixer 92. The mixed fuel returned to the mixer 92 is mixed again at the mixer 92. Alternatively, the return valve 108 may be controlled so that the amount of the mixed fuel returned to the mixer 92 becomes larger as the mixed state of the mixed fuel detected by the mixed state detection sensor 106 becomes worse.

By configuring the ammonia burning internal combustion engine in this way, the fuel tank may be made a single tank, so the production costs can be slashed. Also, it is not necessary to supply the fuel by discrimination of each type of fuel, so the user friendliness can be improved. Furthermore, the ammonia and the highly combustible substance can be mixed well by a mixer.

Figure 47:
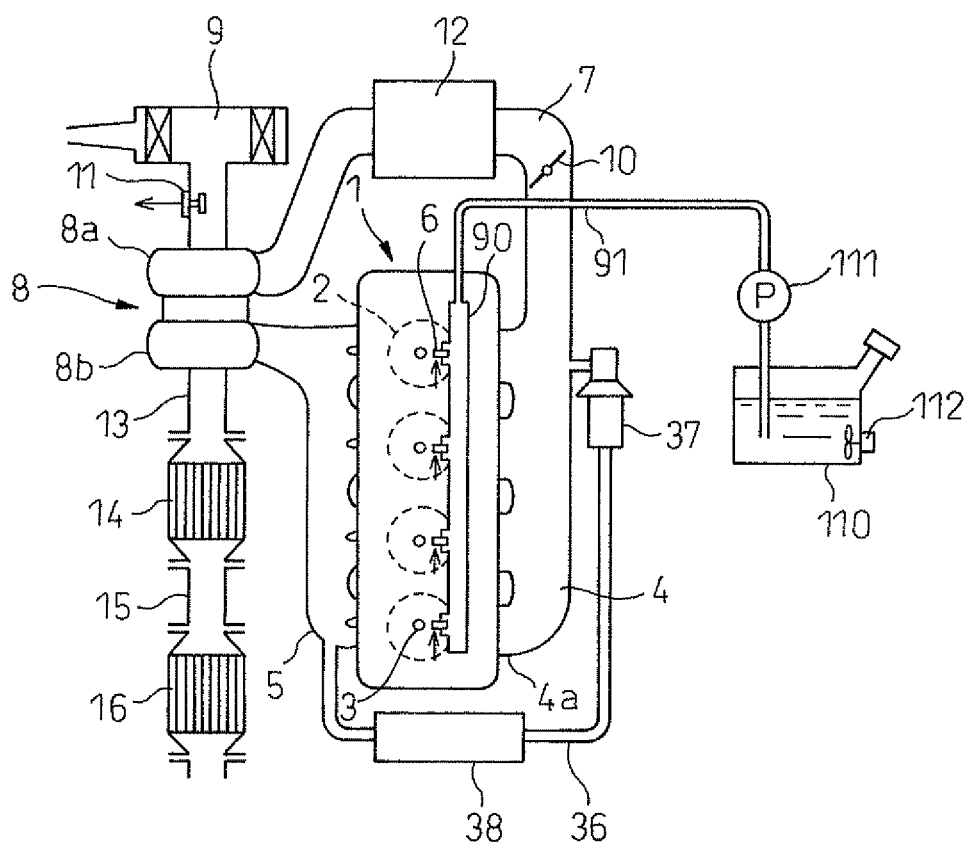
FIG. 47 is an overview of an internal combustion engine in a fourth embodiment of the fifth aspect.

Next, referring to FIG. 47, a fourth embodiment of the fifth aspect will be explained. In the fourth embodiment, the fuel tank, feed path, and fuel injector are all made common parts. Only one fuel tank and only one feed path are provided, and only one fuel injector is provided per each cylinder. That is, in the fourth embodiment, as shown in FIG. 47, one fuel injector 6 injecting fuel into the combustion chamber 2 is arranged for each cylinder. Each fuel injector 6 is coupled with the fuel reservoir 90, and this fuel reservoir 90 is connected through the fuel feed pipe 91 to the fuel tank 110. The fuel feed pipe 91 is provided with the fuel pump 111.

To the fuel tank 110, the ammonia and a highly combustible substance not being able to mix with ammonia are fed. In addition, to the fuel tank 110, a surfactant (emulsifier) mixing a polar substance and a nonpolar substance is fed. Therefore, in the fuel tank 110, the ammonia, highly combustible substance, and surfactant are stored. In this way, by feeding the surfactant into the fuel tank 110, the polar substance of ammonia and the nonpolar substance of the highly combustible substance can be mixed.

In this way, in the present fourth embodiment, by feeding the surfactant into the fuel tank 110, all of the fuel tank, feed path, and fuel injector can be common parts to reduce production costs, while mixing the ammonia and the highly combustible substance well.

Note that, even in the case where the surfactant is mixed into the fuel tank 110, sometimes the mixture of the ammonia and the highly combustible substance cannot be maintained for a long period of time. In this case, an agitation system 112 agitating the fuels in the fuel tank 110 may be provided in the fuel tank 110, and the fuels in the fuel tank 110 may be agitated by the agitation system 112 by a certain time period for which the ammonia and the highly combustible substance in the fuel tank 110 are separated to a certain extent. Alternatively, a mixed state detection system (not shown) detecting the mixed state of the fuels in the fuel tank 110 may be provided in the fuel tank 110, and the fuels in the fuel tank 110 may be agitated by the agitation system 112 where the mixed state of the fuels becomes worse than the predetermined reference mixed state.

Next, an ammonia burning internal combustion engine of a sixth aspect of the present invention will be explained. The configuration of the ammonia burning internal combustion engine of the present aspect is basically the same as the configurations of the ammonia burning internal combustion engines of the first aspect to fifth aspect.

In this regard, in a spark ignition type of internal combustion engine, knocking occurs depending on the engine operating state. In this case, in general, knocking may be eliminated by retarding the ignition timing by the ignition device 3. In this regard, in most cases, when retarding the ignition timing, the combustion of the air-fuel mixture in the combustion chamber 2 is delayed, therefore it becomes impossible to sufficiently propagate the heat energy obtained by combustion to the piston, so a drop of output is caused.

Here, ammonia is a substance having an extremely high octane value, therefore has a high knocking resistance. For this reason, when the ratio of feed of ammonia with respect to the total amount of feed of the ammonia and the highly combustible substance is increased, the knocking resistance is improved. Therefore, in the present aspect, in a case where knocking occurs or a case where possibility of occurrence of knocking is high, the ratio of feed of ammonia with respect to the total amount of feed of the ammonia and the highly combustible substance into the combustion chamber 2 is made high.

Specifically, in the present aspect, a strength of knocking is detected by a knock sensor (not shown) detecting the strength of knocking, and when the strength of knocking becomes higher than the predetermined limit knocking strength, the ratio of feed of ammonia with respect to the total amount of feed of the ammonia and the highly combustible substance into the combustion chamber 2 is made higher. Due to this, knocking can be eliminated without retarding the ignition timing by the ignition device 3.

Figure 48:
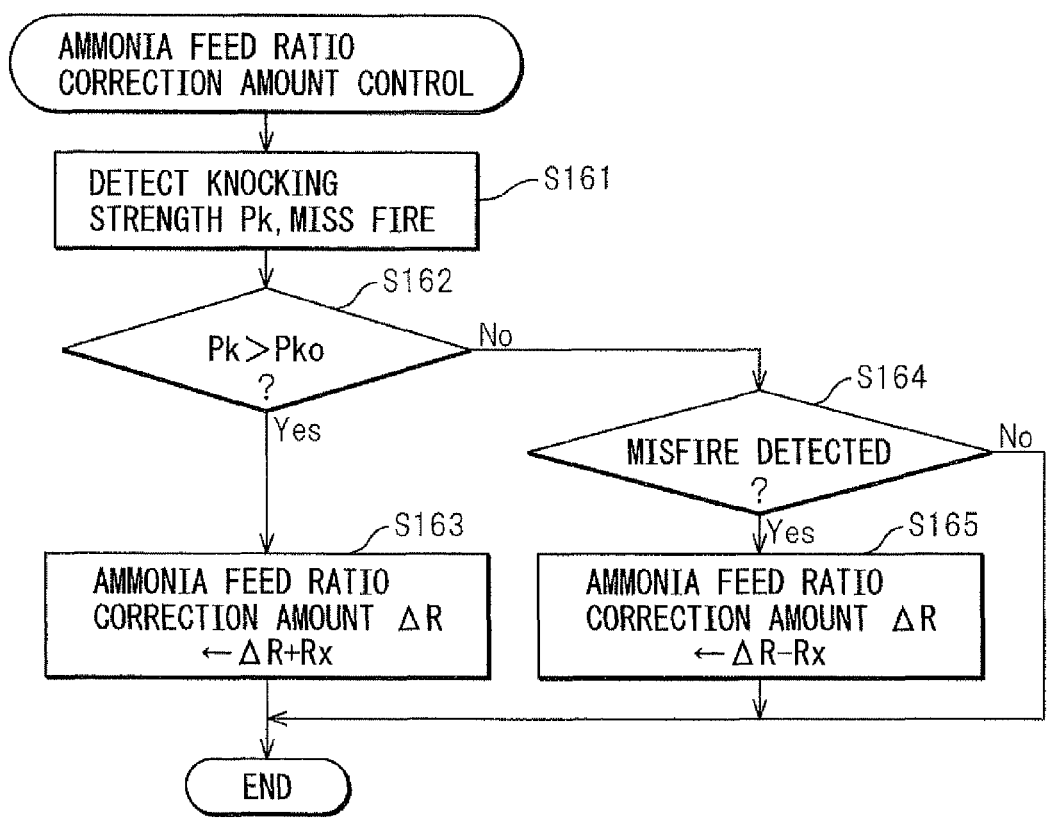
FIG. 48 is a flowchart showing a control routine of control of the ammonia feed ratio correction amount.

FIG. 48 is a flow chart showing a control routine of control of the ammonia feed ratio correction amount of the present aspect. Note that, in the present aspect, by a control routine other than the control routine shown in FIG. 48, the ratio of feed of ammonia with respect to the total amount of feed of the ammonia and the highly combustible substance into the combustion chamber 2 is calculated based on the engine operating state, and the feed ratio of the ammonia calculated by this other control routine is corrected by exactly the amount of the ammonia feed ratio correction amount calculated by the control routine shown in FIG. 48.

As shown in FIG. 48, first, at step S161, a knocking strength Pk is detected by a knock sensor, and the possibility of misfire of the air-fuel mixture is detected by a known means. Next, at step S162, it is determined whether the knocking strength Pk is larger than the limit knocking strength Pko. When it is determined that the knocking strength Pk is larger than the limit knocking strength Pko, the routine proceeds to step S163. At step S163, the ammonia feed ratio correction amount ΔR is increased by the predetermined amount Rx. Due to this, the ammonia feed ratio is increased and knocking can be reliably eliminated.

On the other hand, when it is determined at step S162 that the knocking strength Pk is the limit knocking strength Pko or less, the routine proceeds to step S164. At step S164, it is determined whether the possibility of misfire is detected. When the possibility of misfire is detected, the routine proceeds to step S165. At step S165, the ammonia feed ratio correction amount ΔR is decreased by the predetermined amount Rx. Due to this, the feed ratio of ammonia having a low combustibility is decreased, and a risk of misfire is avoided. On the other hand, when it is determined at step S164 that the possibility of misfire is not detected, the control routine is ended without increasing or decreasing the ammonia feed ratio correction amount ΔR.

Note that the embodiments and modifications of each of the different aspects explained above may be combined with each other. Further, embodiments of different aspects may be combined with each other. For example, the first embodiment of the first aspect and the first embodiment of the fourth aspect may be combined so that GTL light oil is used as the highly combustible substance, and the temperature of the intake gas fed into the combustion chamber 2 is raised when the amount of ammonia fed into the combustion chamber 2 is increased.

While the invention has been described with reference to specific embodiments chosen for purpose of illustration, it should be apparent that numerous modifications could be made thereto by those skilled in the art without departing from the basic concept and scope of the invention.

The invention claimed is:

1. An ammonia burning internal combustion engine able to feed ammonia and a highly combustible substance burning easier than ammonia to a combustion chamber,
   wherein when the amount of ammonia fed into the combustion chamber is increased or when the ratio of the amount of the ammonia to the total amount of the ammonia and the highly combustible substance fed into the combustion chamber is increased, operating parameters of the internal combustion engine are controlled so that the temperature of the intake gas in the combustion chamber when a piston is at compression top dead center becomes higher.

2. An ammonia burning internal combustion engine as set forth in claim 1, wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that the temperature of the intake gas sucked into the combustion chamber rises.

3. An ammonia burning internal combustion engine as set forth in claim 2, further comprising:
   an EGR mechanism feeding part of the exhaust gas as EGR gas to the combustion chamber again,
   wherein when the amount of ammonia fed into the combustion chamber is increased or when the ratio of the amount of the ammonia to the total amount of the ammonia and the highly combustible substance fed into the combustion chamber is increased, the EGR mechanism is controlled so that the amount of heat given to the intake gas sucked into the combustion chamber by the EGR gas is increased.

4. An ammonia burning internal combustion engine as set forth in claim 1, further comprising:
   an actual compression ratio changing mechanism controlling an actual compression ratio of a volume of the combustion chamber at the time when the piston is at compression top dead center with respect to the volume of the combustion chamber at the time of closing the intake valve,
   wherein when the amount of ammonia fed into the combustion chamber is increased or when the ratio of the amount of the ammonia to the total amount of the ammonia and the highly combustible substance fed into the combustion chamber is increased, the actual compression ratio changing mechanism is controlled so that the actual compression ratio becomes higher.

5. An ammonia burning internal combustion engine as set forth in claim 1, wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that at the time of closing the intake valve, the amount of intake gas charged into the combustion chamber is made larger.

6. An ammonia burning internal combustion engine as set forth in claim 5, wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that at the time of closing the intake valve, the amount of air charged into the combustion chamber is made larger.

7. An ammonia burning internal combustion engine as set forth in claim 5, further comprising:
an EGR mechanism feeding part of the exhaust gas as EGR gas to the combustion chamber again,
wherein when the amount of ammonia fed into the combustion chamber is increased or when the ratio of the amount of the ammonia to the total amount of the ammonia and the highly combustible substance fed into the combustion chamber is increased, the operating parameters of the internal combustion engine are controlled so that at the time of closing the intake valve, the amount of EGR gas charged into the combustion chamber is made larger.

8. An ammonia burning internal combustion engine as set forth in claim 1, further comprising:
an impulse valve provided in an intake tube or intake port, said impulse valve being made to open after an intake valve is opened so as to generate negative pressure at an intake port at a downstream side of the impulse valve,
wherein when the amount of ammonia fed into the combustion chamber is increased or when the ratio of the amount of the ammonia feed to the total amount of the ammonia and the highly combustible substance fed into the combustion chamber is increased, the opening timing of the impulse valve is made to be retarded.

9. An ammonia burning internal combustion engine able to feed ammonia and a highly combustible substance burning easier than ammonia to a combustion chamber, comprising:
an EGR mechanism feeding part of the exhaust gas as EGR gas to the combustion chamber again,
wherein when the amount of ammonia fed into the combustion chamber is increased or when the ratio of the amount of the ammonia to the total amount of the ammonia and the highly combustible substance fed into the combustion chamber is increased, the EGR mechanism is controlled so that the ratio of the EGR gas in the intake gas fed into the combustion chamber is decreased.

10. An ammonia burning internal combustion engine able to feed ammonia and a highly combustible substance burning easier than ammonia to a combustion chamber, comprising:
an air flow control system controlling turbulence of the air flow in the combustion chamber,
wherein when the amount of ammonia fed into the combustion chamber is increased or when the ratio of the amount of the ammonia to the total amount of the ammonia and the highly combustible substance fed into the combustion chamber is increased, the air flow control system is controlled so that the turbulence of the air flow occurring in the air-fuel mixture in the combustion chamber is made greater.

11. An ammonia burning internal combustion engine able to feed ammonia and a highly combustible substance burning easier than ammonia to a combustion chamber, comprising:
a highly combustible substance injector injecting the highly combustible substance directly into the combustion chamber,
wherein when the amount of ammonia fed into the combustion chamber is increased or when the ratio of the amount of the ammonia to the total amount of the ammonia and the highly combustible substance fed into the combustion chamber is increased, the injection pressure of the highly combustible substance from the highly combustible substance injector is made higher.

12. An ammonia burning internal combustion engine able to feed ammonia and a highly combustible substance burning easier than ammonia to a combustion chamber, wherein at the time of normal operation of the engine, the air-fuel ratio of the air-fuel mixture fed into the combustion chamber is made lean and, when the amount of ammonia fed into the combustion chamber is increased or when the ratio of the amount of the ammonia to the total amount of the ammonia and the highly combustible substance fed into the combustion chamber is increased, the air amount fed into the combustion chamber is controlled so that the air-fuel ratio of the air-fuel mixture fed into the combustion chamber is made to approach the stoichiometric air-fuel ratio.

13. A compression ignition type ammonia burning internal combustion engine able to feed ammonia and a highly combustible substance burning easier than ammonia, to a combustion chamber, comprising:
an ammonia injector directly injecting ammonia into the combustion chamber and a highly combustible substance injector directly injecting the highly combustible substance into the combustion chamber,
wherein the highly combustible substance is injected before the ammonia, and the ammonia is injected after the highly combustible substance self ignites.

* * * * *